(12) United States Patent
Wright et al.

(10) Patent No.: US 11,614,579 B2
(45) Date of Patent: Mar. 28, 2023

(54) ILLUMINATED APPARATUS CLOSURE

(71) Applicant: Illumina, Inc., San Diego, CA (US)

(72) Inventors: Michael Wright, San Diego, CA (US);
Erik Allegoren, San Diego, CA (US);
Erik Williamson, Carlsbad, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 17/247,132

(22) Filed: Dec. 1, 2020

(65) Prior Publication Data

US 2021/0173140 A1 Jun. 10, 2021

Related U.S. Application Data

(60) Provisional application No. 62/945,080, filed on Dec. 6, 2019.

(51) Int. Cl.
*F21V 8/00* (2006.01)

(52) U.S. Cl.
CPC ......... *G02B 6/0095* (2013.01); *G02B 6/0043* (2013.01); *G02B 6/0051* (2013.01); *G02B 6/0061* (2013.01); *G02B 6/0068* (2013.01)

(58) Field of Classification Search
CPC ... F21V 23/005; G02B 6/0095; G02B 6/0043; G02B 6/0051; G02B 6/0061; G02B 6/0068
See application file for complete search history.

(56) References Cited

U.S. PATENT DOCUMENTS

| | | | |
|---|---|---|---|
| 6,859,145 B2 | 2/2005 | Wilker et al. | |
| 6,865,848 B2 | 3/2005 | Krimmel | |
| 7,416,320 B2 | 8/2008 | Sakiyama et al. | |
| 8,740,437 B2* | 6/2014 | Kim | F21V 5/10 362/633 |
| 9,006,751 B2* | 4/2015 | Kleo | B60Q 3/208 438/31 |
| 9,514,661 B2* | 12/2016 | Riegel | H04N 5/64 |
| 10,029,710 B2 | 7/2018 | Hörlendsberger | |

(Continued)

FOREIGN PATENT DOCUMENTS

| | | |
|---|---|---|
| EP | 2068182 B1 | 4/2013 |
| JP | 2002073215 A | 3/2002 |
| TW | M375890 U | 3/2010 |

OTHER PUBLICATIONS

International Search Report and Written Opinion for PCT Application No. PCT/US2020/070832, dated Apr. 14, 2021, 12 pages.

(Continued)

*Primary Examiner* — Arman B Fallahkhair
(74) *Attorney, Agent, or Firm* — Brake Hughes Bellermann LLP

(57) ABSTRACT

A closure for an apparatus comprises: a plurality of light sources; a lightguide to distribute light from the plurality of light sources, the lightguide having a first primary surface opposite a second primary surface, wherein the first primary surface has a first surface treatment, and wherein light emitted from the lightguide indicates a status of the apparatus; and a frame supporting the plurality of light sources and the lightguide for selective movement of the closure vertically or horizontally relative to the apparatus.

20 Claims, 33 Drawing Sheets
(2 of 33 Drawing Sheet(s) Filed in Color)

(56) References Cited

U.S. PATENT DOCUMENTS

| | | | |
|---|---|---|---|
| 10,877,201 B2* | 12/2020 | Vasylyev | G02B 6/0038 |
| 10,895,353 B2* | 1/2021 | Diana | F21K 9/61 |
| 10,989,370 B2* | 4/2021 | Longarzo | F21V 23/0442 |
| 2008/0129927 A1 | 6/2008 | Hamada et al. | |
| 2010/0277908 A1 | 11/2010 | Hu et al. | |
| 2011/0149551 A1 | 6/2011 | Camarillo et al. | |
| 2013/0063326 A1 | 3/2013 | Riegel | |
| 2017/0205552 A1 | 7/2017 | Gierens et al. | |
| 2018/0003428 A1 | 1/2018 | Kwon | |
| 2018/0003881 A1 | 1/2018 | Tang et al. | |
| 2020/0276891 A1* | 9/2020 | van Doleweerd | B60J 7/043 |
| 2021/0141149 A1* | 5/2021 | Nijkamp | G02B 6/0065 |

OTHER PUBLICATIONS

Office Action for Taiwan Application No. 109139544, dated May 5, 2022, along with English translation, 67 pages.

Extended European Search Report for Application No. 20897080.6, dated Oct. 31, 2022, 8 pages.

* cited by examiner

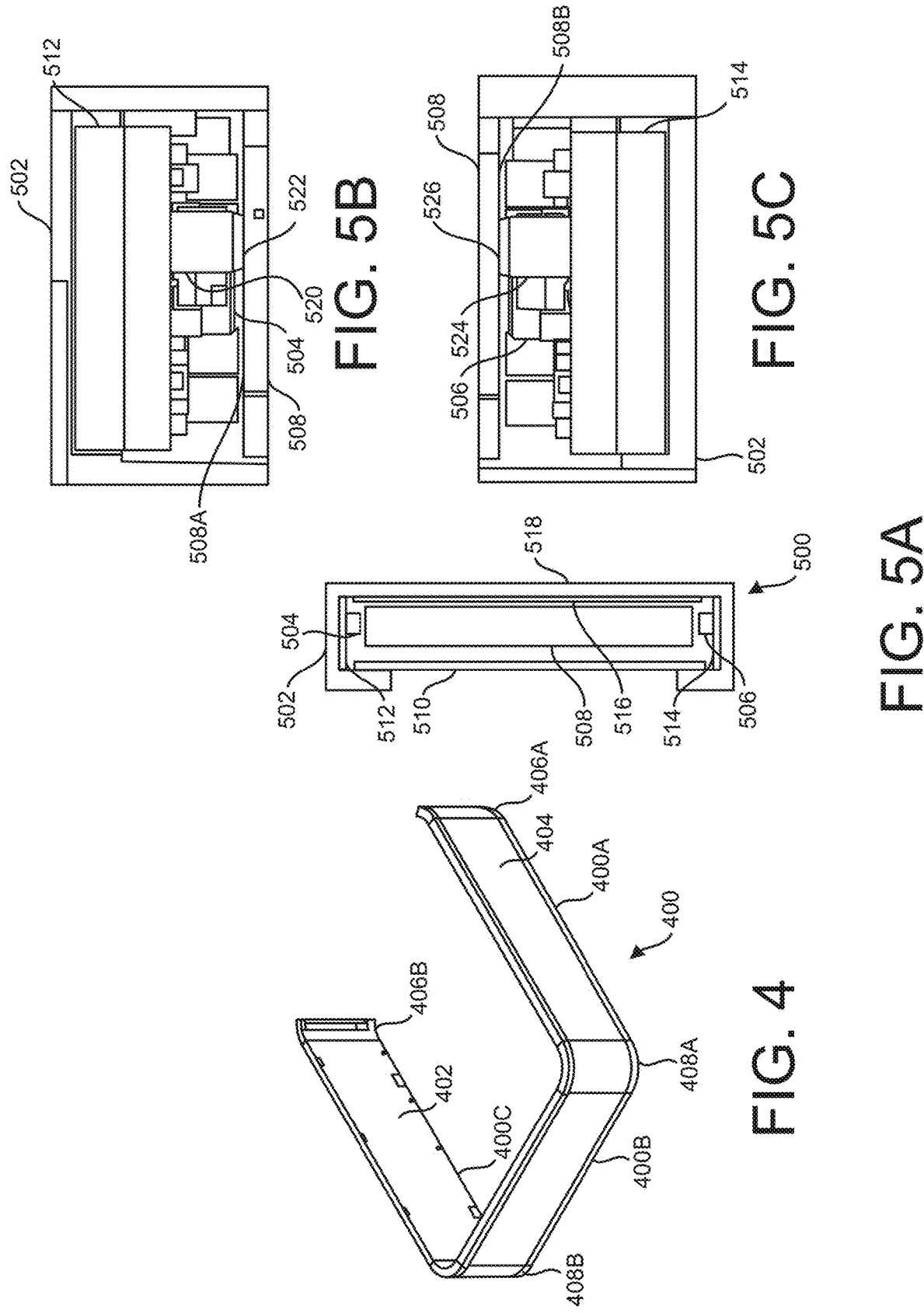

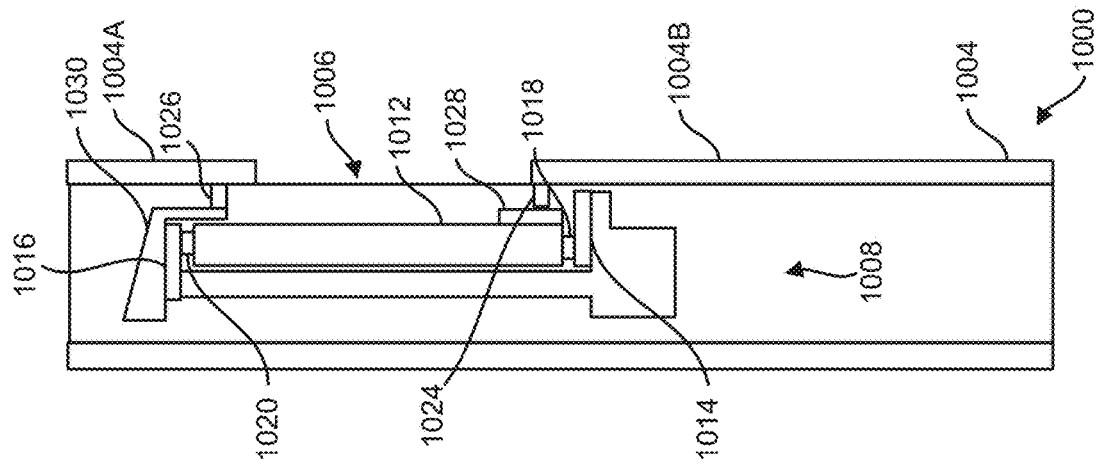
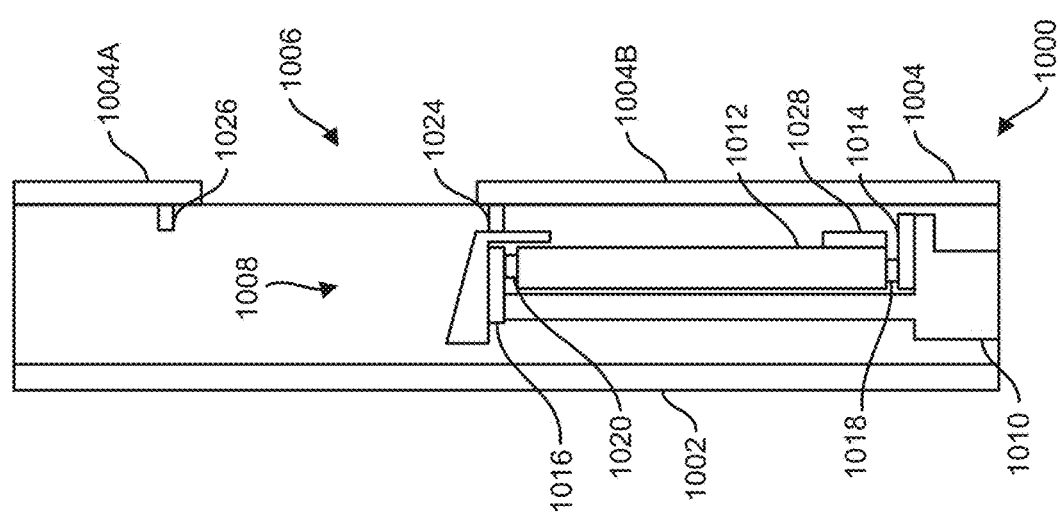

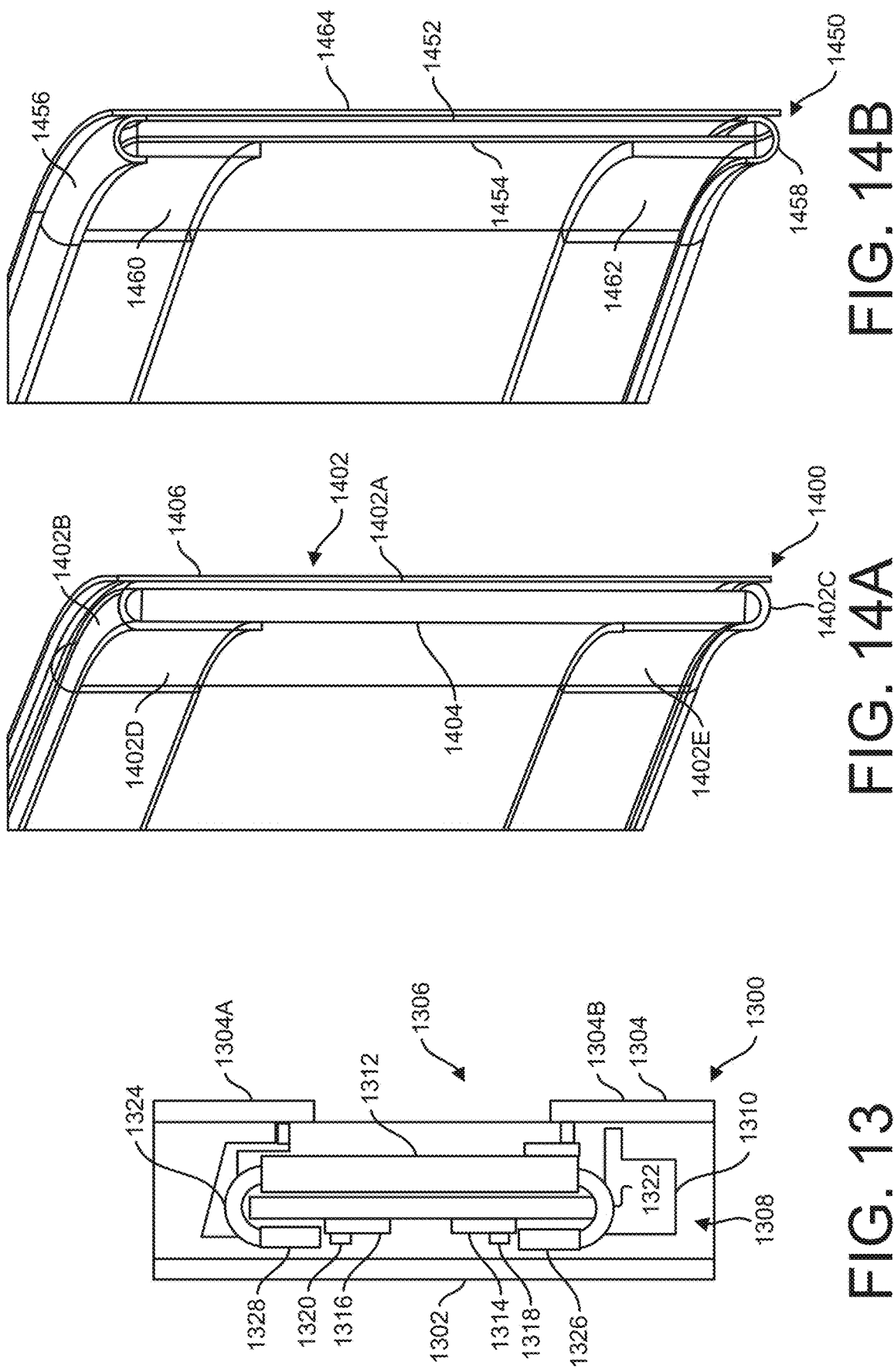

US 11,614,579 B2

ILLUMINATED APPARATUS CLOSURE

CROSS-REFERENCE TO RELATED APPLICATION

This application is a continuation of, and claims priority to, U.S. Provisional Patent Application No. 62/945,080, filed on Dec. 6, 2019, and entitled "ILLUMINATED APPARATUS CLOSURE," the disclosure of which is incorporated by reference herein in its entirety.

BACKGROUND

Many electric or electronic systems or devices have a body or housing that encloses one or more components of the overall apparatus. An immovable (e.g., fixed) part of the housing can serve to protect the enclosed component(s) from outside interference or contamination, and/or can isolate the enclosed component(s) from the surrounding environment or a person (e.g., a user of the apparatus). A moveable part of the housing can be referred to as a closure and can allow for selective access to one or more aspects of the enclosed interior of the apparatus. However, closures such as doors or lids typically only serve the function of providing partial access. For example, doors or lids often do not add further functionality to the system, and/or do not provide a visually pleasing appearance.

SUMMARY

In a first aspect, a closure for an apparatus comprises: a plurality of light sources; a lightguide to distribute light from the plurality of light sources, the lightguide having a first primary surface opposite a second primary surface, wherein the first primary surface has a first surface treatment, and wherein light emitted from the lightguide indicates a status of the apparatus; and a frame supporting the plurality of light sources and the lightguide for selective movement of the closure vertically or horizontally relative to the apparatus.

Implementations can include any or all of the following features. The plurality of light sources comprise light-emitting diodes (LEDs). At least two of the LEDs are mounted in a first row on a first side of a first circuit board. The LEDs include side-emitting LEDs. The LEDs include top-emitting LEDs. The first circuit board includes a flexible circuit board. The first circuit board includes a rigid circuit board. At least two of the LEDs are mounted to a first side of a second circuit board, further comprising an interconnect electrically coupling the first circuit board and the second circuit board at a second side of the first circuit board and a second side of the second circuit board, wherein the first side of the first circuit board and the first side of the second circuit board are opposite the second side of the first circuit board and the second side of the second circuit board. The LEDs comprise: a first set of LEDs positioned to emit light to a first side of the lightguide, the first set of LEDs mounted on the first side of the first circuit board, and a second set of LEDs positioned to emit light to a second side of the lightguide opposite the first side, the second set of LEDs mounted in a second row on a first side of a second circuit board. The closure further comprises a first dowel pin extending from the frame and through the first circuit board and abutting the first side of the lightguide, and a second dowel pin extending from the frame and through the second circuit board and abutting the second side of the lightguide. The first surface treatment comprises the first primary surface being a first abraded surface. The second primary surface has a second surface treatment different from the first surface treatment. The second surface treatment comprises the second primary surface being a glossy surface. The second primary surface has a second surface treatment, wherein the second surface treatment comprises the second primary surface being a second abraded surface. The first surface treatment comprises a light-extracting feature for the first primary surface. The light-extracting feature comprises dots formed at the first primary surface. The dots have different sizes, further comprising a first gradient of dot size extending between an edge of the first primary surface and a center of the first primary surface. The closure further comprises at least one second gradient of dot size oriented in a direction different from a direction of the first gradient of dot size. The closure further comprises a diffuser positioned proximate to the second primary surface of the lightguide, the light from the lightguide visible via the diffuser. The diffuser is positioned at a distance from the second primary surface of the lightguide that is greater than about 10 mm. The diffuser is positioned at a distance from the second primary surface of the lightguide that is less than about 23 mm. The closure has a U-shape.

In a second aspect, an apparatus comprises: a housing having an opening; and a closure for selectively moving between an open position to provide access to the opening and a closed position to block access to the opening, the closure comprising: a plurality of light sources; a lightguide to distribute light from the plurality of light sources, the lightguide having a first primary surface opposite a second primary surface, and wherein light emitted from the lightguide indicates a status of the apparatus; and a frame supporting the plurality of light sources and the lightguide.

Implementations can include any or all of the following features. The plurality of light sources comprise light-emitting diodes (LEDs). The LEDs comprise: a first set of LEDs positioned to emit light to a first side of the lightguide, the first set of LEDs mounted in a first row on a first side of a first circuit board, and a second set of LEDs positioned to emit light to a second side of the lightguide opposite the first side, the second set of LEDs mounted in a second row on a first side of a second circuit board. The first circuit board and the second circuit board are mounted to the frame of the closure. The closure further comprises: a first dowel pin extending from the frame through the first circuit board and abutting the first side of the lightguide, and a second dowel pin extending from the frame through the second circuit board and abutting the second side of the lightguide. The first circuit board is mounted to an inside surface of the housing, wherein the first set of LEDs is proximate to the first side of the lightguide when the closure is in the closed position. The second circuit board is mounted to the frame of the closure. The second circuit board is mounted to the inside surface of the housing, wherein the second circuit board is proximate to the second side of the lightguide when the closure is in the closed position. The closure further comprises a seal between the closure and the housing. The seal comprises an air seal. The seal comprises a dust seal. The seal comprises an electromagnetic interference containment seal. The first primary surface of the lightguide has a first surface treatment. The first surface treatment comprises the first primary surface being a first abraded surface. The second primary surface has a second surface treatment different from the first surface treatment. The second surface treatment comprises the second primary surface being a glossy surface. The second primary surface has a second surface treatment, wherein the second surface treatment comprises the second primary surface being a second abraded surface. The first surface treatment comprises a light-extracting feature for the first primary surface. The light-extracting feature comprises dots formed at the first primary surface. The apparatus further comprises a first gradient of dot size extending between an edge of the first primary surface and a center of the first primary surface. The apparatus further comprises at least one second gradient of dot size oriented in a direction different from a direction of the first gradient of dot size. The apparatus is an instrument for analyzing nucleic material. The apparatus further comprises a diffuser positioned proximate to the second primary surface of the lightguide, the light from the lightguide visible via the diffuser. The diffuser is positioned at a distance from the second primary surface of the lightguide that is greater than about 10 mm. The diffuser is positioned at a distance from the second primary surface of the lightguide that is less than about 23 mm. The closure has a U-shape.

In a third aspect, a closure for an apparatus comprises: a set of first light sources; a substrate having a first primary surface opposite a second primary surface, the set of first light sources positioned proximate to the first primary surface of the substrate; a first lightguide to distribute light from the set of first light sources, the first lightguide having a first primary surface opposite a second primary surface, the first primary surface of the first lightguide positioned proximate to the second primary surface of the substrate; a first curved structure extending between the set of first light sources proximate to the first primary surface of the substrate and the first lightguide proximate to the second primary surface of the substrate, wherein light from the first lightguide indicates a status of the apparatus; and a frame supporting the set of first light sources, the substrate, the first lightguide, and the first curved structure, the frame for selective movement of the closure relative to the apparatus.

Implementations can include any or all of the following features. The first curved structure comprises a second lightguide. The first lightguide and the second lightguide form a continuous lightguide. The first curved structure comprises a curved mirror. The closure further comprises a second lightguide proximate to the first primary surface of the substrate, the second lightguide extending between the set of first light sources and the first curved structure. The closure further comprises: a second set of light sources positioned proximate to the first primary surface of the substrate; and a second curved structure extending between the second set of light sources proximate to the first primary surface of the substrate and the first lightguide proximate to the second primary surface of the substrate. The second curved structure comprises a second lightguide. The first lightguide and the second lightguide form a continuous lightguide. The second curved structure comprises a curved mirror. The closure further comprises a second lightguide proximate to the first primary surface of the substrate, the second lightguide extending between the second set of light sources and the second curved structure. The closure further comprises a diffuser having a first primary surface opposite a second primary surface, the first primary surface of the diffuser positioned proximate to the second primary surface of the first lightguide, wherein the light from the first lightguide is visible via the diffuser. The diffuser is positioned at a distance from the second primary surface of the first lightguide that is greater than about 10 mm. The diffuser is positioned at a distance from the second primary surface of the first lightguide that is less than about 23 mm. The closure has a U-shape.

In a fourth aspect, a closure for an apparatus comprises: a set of light sources; a reflector; a diffuser to distribute light from the set of light sources, wherein light visible via the diffuser indicates a status of the apparatus; and a frame supporting the set of light sources, the reflector, and the diffuser, the frame for selective movement of the closure relative to the apparatus, wherein the frame has a gap between the diffuser and the reflector.

Implementations can include any or all of the following features. The set of light sources comprise light-emitting diodes (LEDs). At least two of the LEDs are mounted in a first row on a first side of a first circuit board. The LEDs include side-emitting LEDs. The LEDs include top-emitting LEDs. The first circuit board includes a flexible circuit board. The first circuit board includes a rigid circuit board. At least two of the LEDs are mounted on a first side of a second circuit board, further comprising an interconnect for electrically coupling a second side of the first circuit board and a second side of the second circuit board, wherein the first side of the first circuit board and the first side of the second circuit board are opposite the second side of the first circuit board and the second side of the second circuit board. The closure further comprises a lightguide positioned in the gap. The LEDs comprise: a first set of LEDs proximate to a first side of the lightguide, and a second set of LEDs proximate to a second side of the lightguide opposite the first side, the second set of LEDs mounted in a second row on a first side of a second circuit board. The closure further comprises a first dowel pin extending from the frame and through the first circuit board and abutting the first side of the lightguide, and a second dowel pin extending from the frame and through the second circuit board and abutting the second side of the lightguide. The lightguide has a first primary surface and a second primary surface, and wherein the first primary surface has a first surface treatment. The first surface treatment comprises the first primary surface being a first abraded surface. The second primary surface has a second surface treatment different from the first surface treatment. The second surface treatment comprises the second primary surface being a glossy surface. The second primary surface has a second surface treatment, wherein the second surface treatment comprises the second primary surface being a second abraded surface. The first surface treatment comprises a light-extracting feature for the first primary surface. The light-extracting feature comprises dots formed at the first primary surface. The dots have different sizes, further comprising a first gradient of dot size extending between an edge of the first primary surface and a center of the first primary surface. The closure further comprises at least one second gradient of dot size oriented in a direction different from a direction of the first gradient of dot size. The diffuser is positioned at a distance from the second primary surface of the lightguide that is greater than about 10 mm. The diffuser is positioned at a distance from the second primary surface of the lightguide that is less than about 23 mm. The closure has a U-shape.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The patent or application file contains at least one drawing executed in color.

Copies of this patent or patent application publication with color drawing(s) will be provided by the Office upon request and payment of the necessary fee.

FIG. 4 shows an implementation of a closure.

FIGS. 5A-5C show implementations of a closure.

FIGS. 10A-10B show cross-section views of an implementation of an apparatus.

FIG. 13 shows a cross-section view of an implementation of a closure.

FIGS. 14A-14B show cross-section views of implementations of closures.

DETAILED DESCRIPTION

Figure 1:
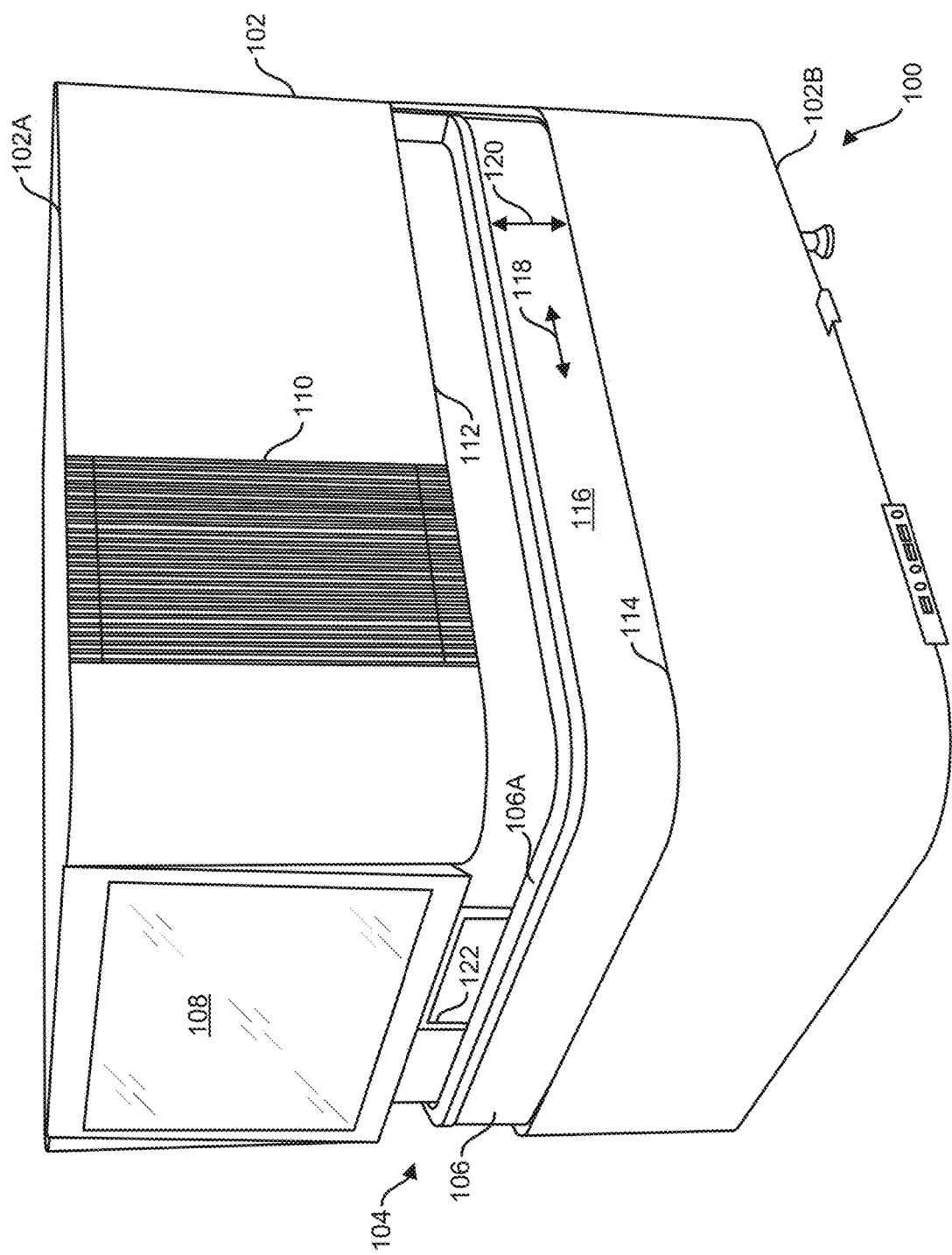
FIG. 1 shows an implementation of a system with a closure that is currently between an open position and a closed position.

The present disclosure describes systems, techniques, and/or articles of manufacture that facilitate improved operation of an apparatus. An improved closure of an apparatus can facilitate multiple functions relative to the apparatus. For example, the closure can be selectively movable between an open position and a closed position to allow selective access to an interior feature of the apparatus. As another example, the closure can provide sealing against one or more substances or occurrences, including, but not limited to, air, electromagnetic interference, or dust. As another example, a closure can provide a controllable illuminated surface that indicates a status or other operational characteristic of the apparatus, for example so that a user can determine the status by glancing at the apparatus from a distance. In some implementations, the closure can include light sources, the lightguide and a diffuser, configured so that the closure provides an illuminated surface that features light of a high degree of uniformity. In some implementations, the closure can be an aesthetically appealing aspect of the apparatus that enhances its visual appeal.

Examples herein refer to substrates. A substrate may refer to any material that provides an at least substantially rigid structure, or to a structure that retains its shape rather than taking on the shape of a vessel to which it is placed in contact. The material can have a surface to which another material can be attached including, for example, smooth supports (e.g., metal, glass, plastic, silicon, and ceramic surfaces), as well as textured and/or porous materials. Possible substrates include, but are not limited to, glass and modified or functionalized glass, plastics (including acrylics, polycarbonate, polystyrene and copolymers of styrene and other materials, polypropylene, polyethylene, polybutylene, polyurethanes, Teflon™, etc.), polysaccharides, nylon or nitrocellulose, resins, silica or silica-based materials including silicon and modified silicon, carbon, metals, inorganic glasses, optical fiber bundles, and a variety of other polymers. In general, the substrates allow optical transmission and do not themselves appreciably fluoresce.

Examples herein refer to lightguides. The term lightguide, sometimes referred to as a waveguide, can mean a structure or material (e.g., a substrate) that confines the propagation of electromagnetic radiation to one or more particular locations, or that facilitates propagation of electromagnetic radiation in one or more directions. For example, a lightguide can guide light to a first location, or in a first direction, while preventing the light from propagating to a second location, or in a second direction. In some implementations, a lightguide is a continuous piece with a controlled surface finish. For example, the lightguide can include clear cast acrylic and/or polycarbonate. Example lightguides are set forth in U.S. Pat. App. Pub. Nos. 2006/0057729 A1 or 2015/0293021 A1, or U.S. Pat. No. 8,241,573, each of which is incorporated herein by reference in its entirety.

Examples herein relate to diffusers. A diffuser can be a semi-opaque material that helps improve uniformity of light (e.g., the light extracted from a lightguide). For example, a diffuser can include a substrate of a translucent material (e.g., glass or plastic). In some implementations, a diffuser includes pigment to diffuse or scatter the light. In some implementations, a diffuser is a continuous piece with a controlled surface finish. For example, the diffuser can include acrylic (e.g., so-called sign-grade acrylic). Different diffuser materials can block different amounts of light, or conversely can transmit different amounts of light. The opacity of a material can be defined as the extent to which a material blocks light. The transmittance of a material can be defined as the percentage of light that passes through the material. Transmittance is a thickness-dependent metric, and a predefined thickness of a given diffuser material can be specified as having a particular transmittance.

Examples herein refer to a light-emitting diode (LED). An LED can be a semiconductor device (e.g., a p-n junction) that emits light in response to electrical current flow through the device. The LED can emit light in one or more wavelength ranges, including, but not limited to, visible, ultraviolet, or infrared wavelengths.

Examples herein refer to rigid circuit boards. A rigid circuit board can include a printed circuit board, including, but not limited to, one or more layers of conductive material (e.g., copper) applied to a non-conductive substrate (e.g., paper, fiberglass, insulated material).

Examples herein refer to flexible circuit boards. A flexible circuit board can refer to a flex circuit, including, but not limited to, electronic devices or components mounted to flexible plastic substrates. In some implementations, a flexible substrate can be flexed to at least about a 90 degree angle without compromising performance of the flexible circuit board.

Examples herein refer to uniformity of presented light, meaning the uniformity of the luminance of the light. A coefficient of variation (CV) is an example of a metric for uniformity that can be applied to the uniformity of luminance in light. Luminance is a measure of the flux emitted from, or reflected by, a relatively flat and uniform surface. Luminance may be defined as luminous intensity per unit area, where luminous intensity is the power of a light source, defined as the quantity of luminous flux emitted in a given direction per solid angle. Luminance can be measured in the unit of candela per square meter ($cd/m^2$). CV is a measure of dispersion of values measured for a characteristic. In some implementations, multiple measurements of luminance can be performed across the surface of an optical element including, but not limited to, a diffuser or a lightguide. In some implementations, an image may be taken of a surface of interest, and the area of that image may be broken down into smaller sub images, or tiles. The standard deviation and the mean of the measured values can be determined. The CV can be defined as a ratio and can be expressed as a percentage. The CV can be the ratio of the standard deviation to the mean. Using this metric, the higher the CV value, the less uniformity in the measured values, and vice versa. The CV may be analyzed for the entire surface of interest, or the CV may be analyzed on various sub-tiles of the surface of interest. At a high level, each situation may involve capturing an image, and using a script to analyze the CV of various tiles in the image. This can have one or more implications. For example, the CV can be affected by the exposure settings on the camera. As another example, the CV can be affected by the image resolution (e.g., pixels per millimeter of a lightguide being tested). As another example, the CV can be affected by what overall luminance the lighting apparatus is commanded at during the image capture. As another example, the CV can be affected by whether tiles or the full image are being analyzed. As another example, the CV can be affected by the aspect ratio of the tile, the size of the tile, and/or whether the tiles overlap in the analysis or they have non-overlapping borders.

FIG. 1 shows an implementation of a system 100 with a closure that is currently between an open position and a closed position. The system 100 can be used with one or more of the closures and apparatuses described herein, such as closure 400 of FIG. 4, closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. 31

The system 100 includes a housing 102 that can be made of any suitable material, including, but not limited to, metal or plastic. The housing 102 can include a portion 102A and a portion 102B. An opening 104 can be provided between the portion 102A and the portion 102B. In some implementations, the portion 102A can be considered an upper portion of the system 100. In some implementations, the portion 102B can be considered a lower portion of the system 100. Other configurations are possible. For example, the portion 102A and the portion 102B can be arranged substantially side by side.

The opening 104 can be selectively opened or closed by controlling the movement and position of a closure 106 so as to either provide access to an interior of the system 100 or prevent such access. The portion 102A can include a display 108, including, but not limited to, a touch screen, an LCD device, an LED device, or another monitor type. In some implementations, the display 108 can be used for controlling one or more aspects of the operation of the system 100. For example, the position and/or movement of the closure 106 can be controlled using the display 108 and/or another input control of the system 100. The portion 102A can include an intake vent 110. For example, the intake vent 110 can facilitate thermal conditioning (e.g., cooling and/or heating) for one or more internal components of the system 100. The closure 106 is currently shown in an intermediate position between an open position and a closed position. In some implementations, in the closed position an edge 106A of the closure 106 can be positioned at least substantially adjacent to an edge 112 of the portion 102A (e.g., a lower edge thereof). For example, in the closed position the closure 106 can at least substantially abut the edge 112 of the portion 102A. This can allow the closure 106 to act as a containment structure against at least one unwanted substance. For example, laser light, air flow, or other contaminants can be blocked by the closure 106. In some implementations, in the open position, the edge 106A of the closure 106 can be positioned at least substantially adjacent to (e.g., at least substantially flush with) an edge 114 of the portion 102B. This can allow the closure 106 to provide access to the interior of the system 100, for example such that a user can engage with one or more components in the interior. Thus, the closure 106 can be moved between the open position and closed position and vice versa repeatedly. In some implementations, the closure 106 includes an illumination surface 116. For example, the illumination surface 116 can be driven by one or more light sources providing light into a lightguide, which can be covered by a diffuser. In some implementations, multiple light sources of the closure 106 are arranged so that color gradients can be blended across the length of the illumination surface 116, as indicated by an arrow 118, and across a height of the illumination surface 116, as indicated by an arrow 120. The illumination at the illumination surface 116 can serve one or more functions regarding the system 100. For example, the illumination can be controlled so as to indicate a current status or other operational characteristic of the system 100.

The system 100 can be used for any of multiple purposes. In some implementations, the system 100 is used in analyzing a sample of one or more materials. For example, the system 100 can be a sequencer used in the analysis of nucleic material. In some implementations, the closure 106 provides access to one or more receptacles 122 for a cartridge or other consumable media utilized by the system 100. For example, when the closure 106 is in the open position a cartridge can be inserted into the receptacle 122 for purposes of performing analysis on a sample contained in the cartridge. Prior to and/or during performance of analysis on the sample contained in the cartridge or other consumable media, the closure 106 may move to the closed position.

Figure 2:
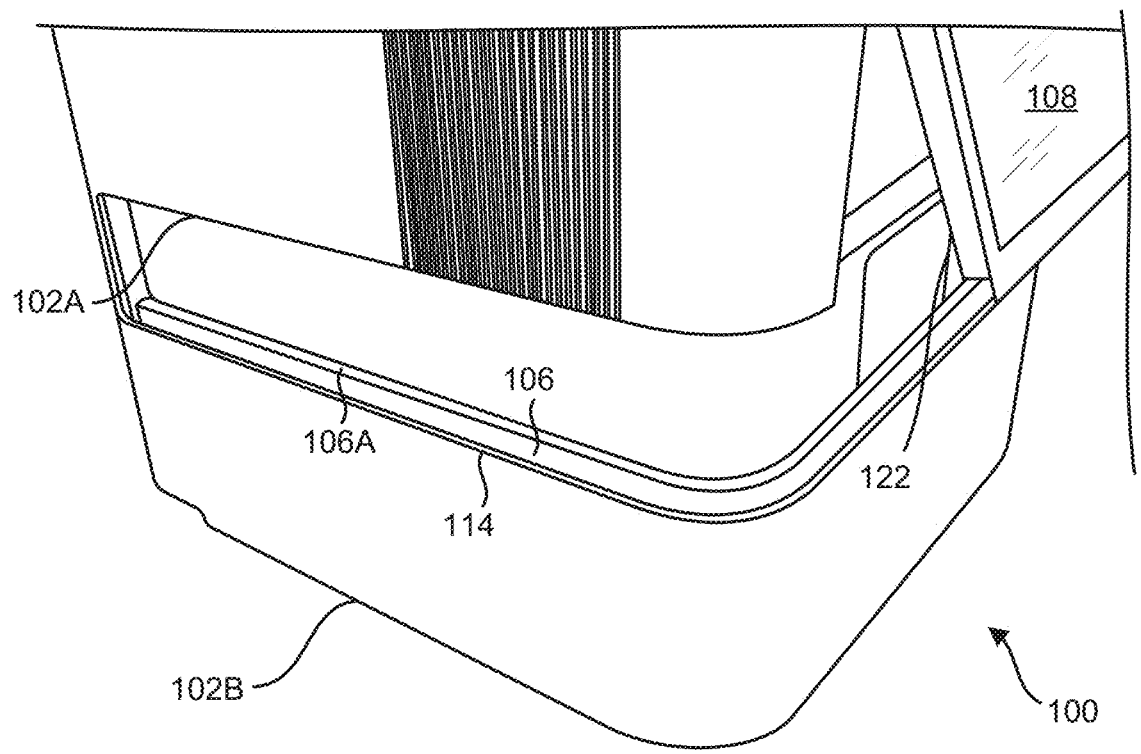
FIG. 2 shows an implementation of the system of FIG. 1 where the closure is currently in the open position.

FIG. 2 shows an implementation of the system 100 of FIG. 1 where the closure 106 is currently in the open position. The edge 106A is currently at least substantially adjacent to the edge 114 of the portion 102B of the system 100. As such, the closure 106 currently provides access to the receptacle 122. The display 108 can be pivotally mounted to the portion 102A. Currently, the display 108 is shown in a position swiveled away from a vertical position. For example, this position of the display 108 can be more comfortable for a user to interact with the display 108.

Figure 3:
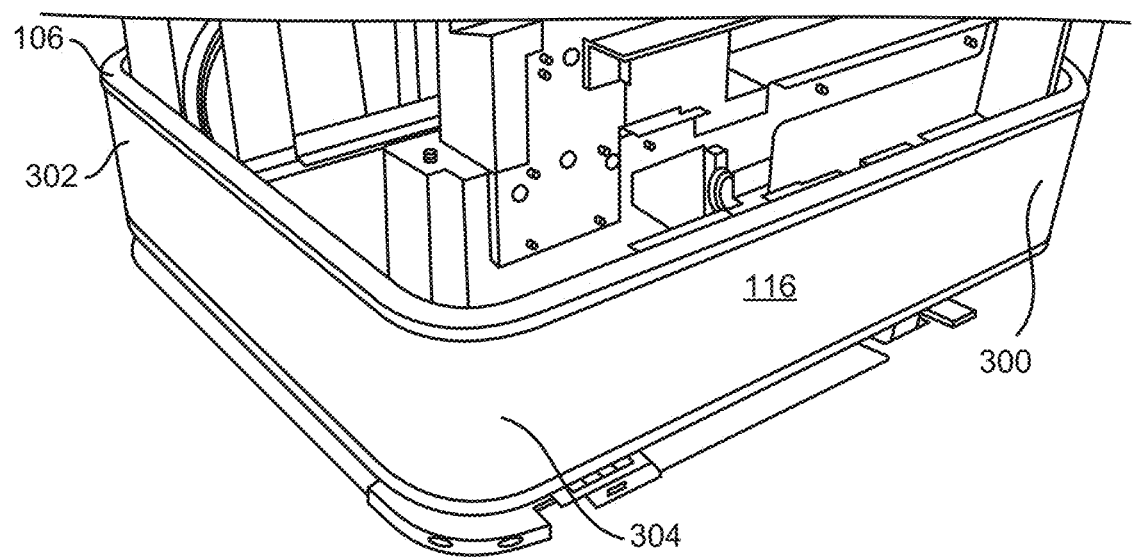
FIG. 3 shows an implementation of the closure of FIG. 1 when the system is in a partially assembled or disassembled state.

FIG. 3 shows an implementation of the closure 106 of FIG. 1 when the system 100 is in a partially assembled or disassembled state. Some portions of the system 100 have here been omitted for purposes of illustration. For example, the portion 102B of the housing 102 has here been omitted. Accordingly, the closure 106, which is currently in its open position, is visible in the present illustration. When the portion 102B of the housing 102 is present, the closure 106 can be largely obscured while in the open state. The illumination surface 116 can provide one or more gradients of the shading of light. Here, for example, an area 300 of the illumination surface 116 may have a first shading, an area 302 of the illumination surface 116 may have a second shading, and an area 304 of the illumination surface 116 may have a third shading. Two or more of the first, second, and third shadings can be different from each other. In some implementations, the first shading of the area 300, and the second shading of the area 302, can be at least substantially the same as each other. For example, the shading of the areas 300 and 302 can be a generally purple color. In some implementations, the third shading of the area 304 can be different from the shading of the areas 300 and 302. For example, the third shading can be a generally pink color. The gradient of the shading between two or more of the areas 300, 302, and 304 can be at least substantially continuous. For example, this can allow a smooth continuous transition between two or more colors presented on the illumination surface 116. In addition to shading between various colors, there can also or instead be shading between various luminances. For example, in some implementations, area 300 can be a generally bright blue color and area 302 can be a generally dark yellow color, with a more or less continuous gradient of shading between the bright blue and the dark yellow. In some implementations, area 300 can be a dim white color and area 302 can be a bright white color, with continuous shading in between.

FIG. 4 shows an implementation of a closure 400. The closure 400 can be used with the system 100 and/or one or more components of the closures and apparatuses described herein, such as closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. The closure 400 includes a frame 402 and a diffuser 404 mounted to the frame 402. The closure 400 can have any of multiple different shapes. In some implementations, the closure 400 has at least substantially a U-shape. For example, a portion 400A can be at least substantially perpendicular to a portion 400B. For example, the portion 400B can be substantially perpendicular to a portion 400C. The closure 400 can be shaped so as to selectively cover or reveal one or more sides of an apparatus (e.g., the system 100 in FIG. 1). For example, an at least substantially U-shaped closure can selectively cover or reveal three sides of the apparatus, such as where the portion 400B is positioned at a front of the apparatus, and the portions 400A and 400C are positioned at respective sides of the apparatus. In such an implementation, the closure 400 may not selectively cover or reveal a back of the apparatus. The closure 400 can have one or more corners. In some implementations, a corner can be more or less rounded. Here, the closure 400 has a turn 406A at the end of the portion 400A distal to the portion 400B. Here, the closure 400 has a turn 406B at the end of the portion 400C that is distal to the portion 400B. In some implementations the turns 406A and 406B can be at least substantially mirror images of each other. Here, the closure 400 has a turn 408A between the portion 400A and the portion 400B. Here, the closure 400 has a turn 408B between the portion 400B and the portion 400C. In some implementations the turns 408A and 408B can be at least substantially mirror images of each other. For example, the turns 408A and 408B can be at least substantially identical to each other.

The closure includes light sources to illuminate the diffuser 404. In some implementations, the light sources include light emitting diodes (LEDs). For example, respective strips of LEDs can be provided along upper and lower regions of the closure 400.

FIGS. 5A-5C show implementations of a closure 500. The closure 500 can be used with the system 100 and/or one or more components of the closures and apparatuses described herein, such as closure 400 of FIG. 4, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. FIG. 5A shows the closure 500 in cross section. Here, the closure 500 includes a mounting frame 502, a set of LEDs 504, a set of LEDs 506, a lightguide 508, a diffuser 510, a circuit board 512 for the set of LEDs 504 (e.g., the set of LEDs 504 can be mounted in a row on one side of the circuit board 512), a circuit board 514 for the set of LEDs 506 (e.g., the set of LEDs 506 can be mounted in a row on one side of the circuit board 514), and a reflector 516. The diffuser 510 is positioned proximate to a primary surface of the lightguide 508. The circuit boards 512 and 514 can contain circuit elements for the sets of LEDs 504 and 506, including, but not limited to, driver chips, connectors, and other components. The sets of LEDs 504 and 506 serve to provide light for the closure 500 that will be visible to a user by way of the diffuser 510. The lightguide 508 serves to guide light from the sets of LEDs 504 and 506. For example, the lightguide 508 can have one or more glossy faces. For example, a glossy face can facilitate total internal reflection of light inside the lightguide 508. In some implementations, a face of the lightguide 508 proximate to the diffuser 510 can be a glossy face. The lightguide 508 can have one or more abraded or otherwise matte faces. For example, a matte face can allow light of the lightguide 508 to be extracted so as to become visible to a user. In some implementations, a face of the lightguide 508 opposite a face proximate to the diffuser 510 can be a matte face. The diffuser 510 can serve to even out light intensity, reduce appearance of local bright or dim areas, and/or can otherwise improve uniformity of the presented light. For example, it may be useful to have a relatively high level of uniformity in the presented light, so as to avoid that one or more individual light sources is visible or otherwise indicated by the light at the illumination surface and instead to provide a substantially visually smooth transition between differential or identical colors from different LEDs of sets of LEDs 504 or sets of LEDs 506. The reflector 516 can serve to reflect light extracted from the lightguide toward the diffuser where it can be visible to an operator of the apparatus. In some implementations, the reflector 516 includes a white surface. For example, having a white surface positioned between the lightguide 508 and a wall 518 of the mounting frame 502 can increase the luminance of the illumination surface of the closure 500. When the reflector 516 includes a white surface, this can increase a luminance by about 50 percent compared to a metallic surface. The mounting frame 502 can provide a mounting surface for the circuit board 512 and 514. The wall 518 can provide structure and can serve to contain light from inside the apparatus, for example the system 100 in FIG. 1. The mounting frame 502 can provide one or more cosmetic trims. For example, a cosmetic trim can serve as a termination of the lighting provided by the closure 500.

One or more components of the closure 500 can be involved in ensuring that the closure 500 as assembled conforms to the particulars of design specifications and has a specified size in one or more dimensions. In some implementations, the lightguide 508 is involved in ensuring a proper stack up of the closure 500. For example, this can ensure that the sets of LEDs 504 and 506 are positioned relatively close to their respective edges of the lightguide 508. FIG. 5B shows an example close-up view of the part of the closure 500 that includes the sets of LEDs 504. Here, only an edge 508A of the lightguide 508 is visible, and the rest of the lightguide 508 is omitted in this illustration for clarity. For example, the set of LEDs 504 can be positioned to emit light to at least one side of the lightguide 508 (e.g., to the edge 508A). The circuit board 512 is mounted at the mounting frame 502. A dowel pin 520 extends from the frame 502, through the circuit board 512, toward the lightguide 508. In some implementations, a distal surface 522 of the dowel pin 520 can at least substantially abut the edge 508A of the lightguide 508. FIG. 5C shows an example close-up of the part of the closure 500 that includes the sets of LEDs 506. Here only an edge 508B of the lightguide 508 is visible, and the rest of the lightguide 508 is omitted in this illustration for clarity. For example, the set of LEDs 506 can be positioned to emit light to at least another side of the lightguide 508 than the LEDs 504 (e.g., to the edge 508B). The circuit board 514 is mounted at the mounting frame 502. A dowel pin 524 extends from the frame 502, through the circuit board 514, toward the lightguide 508. In some implementations, a distal surface 526 of the dowel pin 524 can at least substantially abut the edge 508B of the lightguide 508. For example, this arrangement can ensure that the dimension of the closure 500 in the Z direction is controlled by the mounting frame 502 the circuit boards 512 and 514, the dowel pins 520 and 524, and the lightguide 508. As another example, this arrangement can help ensure that the distance between the lightguide 508 and the respective sets of LEDs 504 and 506 is minimized or reduced. The dowel pins 520 and 524 can be manufactured from any suitable material, including, but not limited to, metal or plastic.

The closure 500 illustrates that a closure for an apparatus (e.g., the system 100 in FIG. 1) can include a plurality of light sources (e.g., the sets of LEDs 504 and 506); a lightguide (e.g., the lightguide 508) to distribute light from the plurality of light sources, the lightguide having a first primary surface (e.g., the surface toward the wall 518) opposite a second primary surface (e.g., the surface toward the diffuser 510), wherein the first primary surface has a first surface treatment (e.g., an abraded or otherwise matte surface) and the second primary surface has a second surface treatment (e.g., a gloss surface); a diffuser (e.g., the diffuser 510) extending along the second primary surface of the lightguide, wherein light emitted from the lightguide visible at the diffuser and indicating a status of the apparatus; and a frame (e.g., the mounting frame 502) supporting the plurality of light sources, the lightguide, and the diffuser for selective movement of the closure vertically or horizontally relative to the apparatus.

The closure 500 illustrates that LEDs of an enclosure can include a first set of LEDs (e.g., the set of LEDs 504) at a first side (e.g., the edge 508A) of the lightguide (e.g., the lightguide 508), the first set of LEDs mounted to the first circuit board (e.g., the circuit board 512), and a second set of LEDs (e.g., the set of LEDs 506) at a second side (e.g., the edge 508B) of the lightguide opposite the first side, the second set of LEDs mounted in a second row at a second circuit board (e.g., the circuit board 514). The closure can further include a first dowel pin (e.g., the dowel pin 520) extending from frame 502, through the first circuit board and abutting the first side of the lightguide, and a second dowel pin (e.g., the dowel pin 524) extending from frame 502, through the second circuit board and abutting the second side of the lightguide.

Figure 6:
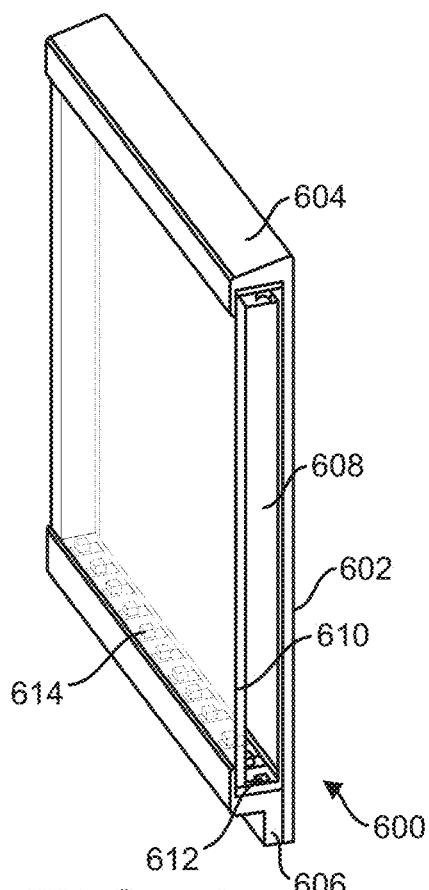
FIG. 6 shows a cross-section view of an implementation of a closure.

FIG. 6 shows a cross-section view of an implementation of a closure 600. The closure 600 can be used with the system 100 and/or one or more components of the closures and apparatuses described herein, such as closure 400 of FIG. 4, closure 500 of FIGS. 5A-5C, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. The closure 600 includes a frame wall 602, a top trim 604, a bottom frame 606, a lightguide 608, a diffuser 610, a circuit board 612, and LEDs 614 (e.g., the LEDs 614 can be mounted in a row on one side of the circuit board 612). The diffuser 610 is positioned proximate to a primary surface of the lightguide 608. One or more of the components of the closure 600 can be at least substantially the same as a corresponding component described elsewhere herein. The LEDs 614 are partially obscured by the lightguide 608 and the diffuser 610 and are therefore partially shown in phantom. The LEDs 614 can be arranged in a row at the circuit board 612. The closure 600 can provide improved illumination at the diffuser 610. In some implementations, the light has increased uniformity due to the arrangement of the LEDs 614, the lightguide 608, and the diffuser 610.

Figure 7:
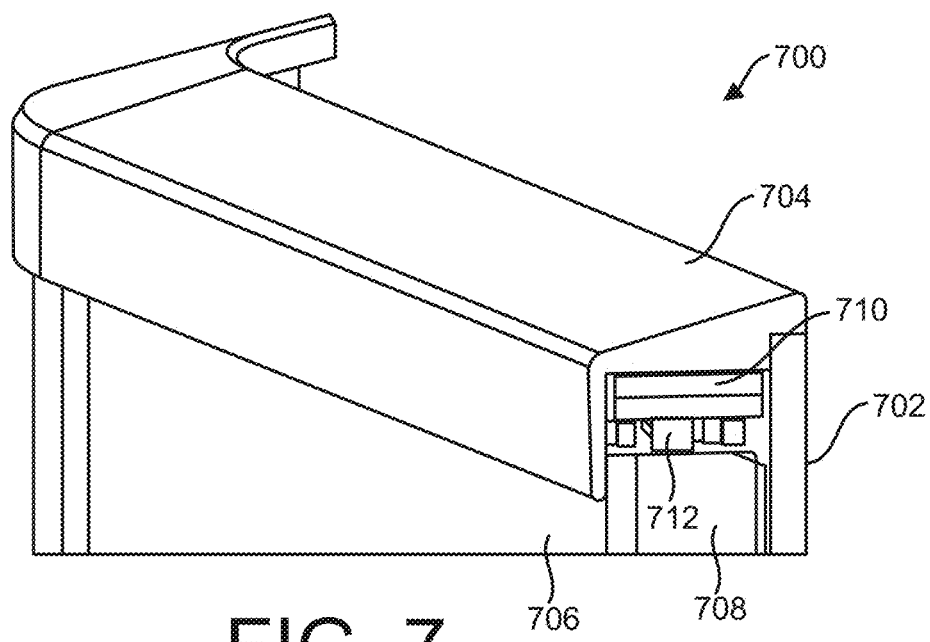
FIG. 7 shows a cross-section view of an implementation of a closure.

FIG. 7 shows a cross-section view of an implementation of a closure 700. The closure 700 can be used with the system 100 and/or one or more components of the closures and apparatuses described herein, such as closure 400 of FIG. 4, closure 500 of FIGS. 5A-5C, closure 600 of FIG. 6, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. The closure 700 includes a frame wall 702, trim 704, a diffuser 706, a lightguide 708, a circuit board 710, and a set of LEDs 712 (e.g., the set of LEDs 712 can be mounted in a row on one side of the circuit board 710). The diffuser 706 is positioned proximate to a primary surface of the lightguide 708. One or more of the components of the closure 700 can be at least substantially the same as a corresponding component described elsewhere herein. In some implementations, the trim 704 can be considered a top trim of the closure 700. In some implementations, the trim 704 can be welded onto the frame wall 702. In some implementations, the trim 704 can be integrally formed with frame wall 702, such as via a single casting or through machining. In some implementations, the frame wall 702 can be considered a rear frame of the closure 700. In some implementations, the trim 704 can be a cast piece. For example, the trim 704 can be made from aluminum or an aluminum alloy.

Figure 8B:
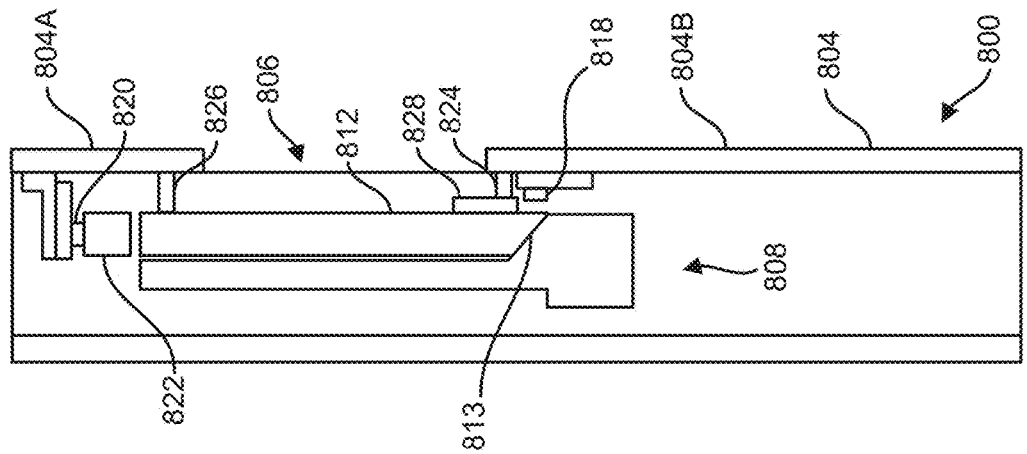
FIGS. 8A-8B show cross-section views of an implementation of an apparatus.
Figure 8A:
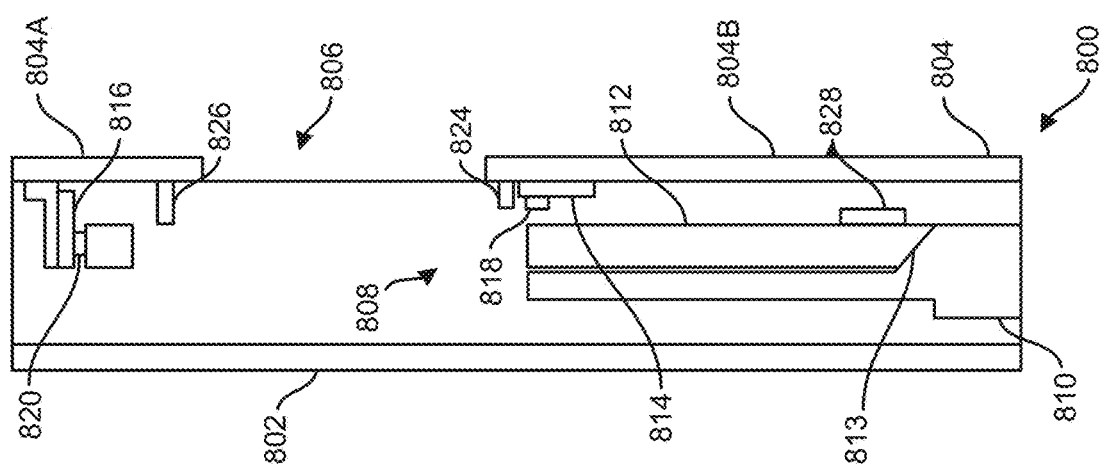

FIGS. 8A-8B show cross-section views of an implementation of an apparatus 800. For clarity, only a portion of the apparatus 800 is shown in the illustrations. The apparatus 800 can be used with the system 100 and/or one or more components of the closures and apparatuses described herein, such as closure 400 of FIG. 4, closure 500 of FIGS. 5A-5C, closure 600 of FIG. 6, closure 700 of FIG. 7, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. The apparatus 800 includes an inner wall 802, an outer wall 804 including a portion 804A and a portion 804B, an opening 806 formed between the portions 804A and 804B of the outer wall 804, and a closure 808. The closure 808 can be used with one or more other examples described elsewhere herein. The closure 808 includes a lift 810 and a lightguide 812 mounted to the lift 810. The closure 808 can be moved between two or more different positions by the lift 810, such as an open position (e.g., FIG. 8A) and a closed position (e.g., FIG. 8B). That is, in the open position the closure 808 can allow a user access to an interior of the apparatus 800 through the opening 806. In the closed position, the closure 808 can prevent access to the interior of the apparatus 800. In the closed position, the closure 808 can also serve one or more other functions. For example, the closure 808 can serve as a containment shield in the closed position. For example, the closure 808 can provide a status indication by way of illumination at the lightguide 812 in the closed position.

One or more circuit boards can be included in the apparatus 800. In some implementations, a circuit board 814 and a circuit board 816 are mounted on an inside of the outer wall 804. In some implementations, the inside can be defined by way of the direction that a person operating the apparatus 800 is expected to view the closure 808 through the opening 806, or to use an inner component of the apparatus 800 by way of access through the opening 806. For example, the circuit board 814 can be mounted at least substantially parallel to the portion 804B of the outer wall 804. For example, the circuit board 816 can be mounted at least substantially perpendicular to the portion 804A of the outer wall 804. A set of LEDs 818 can be mounted to the circuit board 814 (e.g., the set of LEDs 818 can be mounted in a row on one side of the circuit board 814). A set of LEDs 820 can be mounted to the circuit board 816 (e.g., the set of LEDs 820 can be mounted in a row on one side of the circuit board 816). In some implementations, each of the sets of LEDs 818 and 820 can be a top-emitting type of LEDs. In some implementations, the top emitting light from the LEDs 818 can be redirected into the vertical lightguide through the use of a redirection feature 813. The redirection feature 813 can be a curved feature in the lightguide 812 such that total internal reflection is maintained around the right angle curve, or it can be a right angle mirror, or the like. Each of the sets of LEDs 818 and 820 can be configured to provide light into the lightguide 812, at least when the closure 808 is in the closed position. FIG. 8B shows the closure 808 in the closed position where it covers the opening 806. Here, the set of LEDs 818 is positioned proximate the lightguide 812, and light from the LEDs 818 can therefore enter the lightguide 812. One or more additional lightguides can be used. Here, a lightguide 822 is positioned adjacent the set of LEDs 820. In some implementations, the lightguide 822 is not mounted to the closure 808. For example, the lightguide 822 may not be movable but rather can remain stationary with the rest of the apparatus 800. In the closed position, light from the set of LEDs 820 can be conveyed, optionally by way of the lightguide 822, into the lightguide 812. Light that enters the lightguide 812 can be extracted in one or more locations. In some implementations, the light of the lightguide 812 is extracted from the lightguide 812 so as to pass through the opening 806 toward an outside of the apparatus 800. For example, this can allow a user of the apparatus 800 to view the illumination at the lightguide 812, which may indicate a status or other operational characteristic of the apparatus 800.

One or more seals can be provided regarding the closure 808. In some implementations, a seal 824 and seal 826 are mounted to the outer wall 804. The seal 824 is here mounted to the portion 804B, and the seal 826 is here mounted to the portion 804A. In some implementations, a seal 828 can be provided at the lightguide 812. For example, in the closed position the seal 826 can at least substantially abut a surface of the lightguide 812. As another example, in the closed position the seal 824 can at least substantially abut the seal 828. The seals 824, 826 and 828 can contain against one or more occurrences, including, but not limited to, laser light, fluids, LED light, or EMI. For example, the seal 828 can hide hot spots coming from the LEDs 820. One or more of the seals 824, 826 and 828 can be at least one of an air seal, a dust seal, LED light seal, or an electromagnetic interference containment seal.

In the current example of the apparatus 800, the sets of LEDs 818 and 820 can be considered non-moving. That is, the sets of LEDs 818 and 820 are not mounted to the closure 808 but are rather positioned at another part of the apparatus 800, such as the outer wall 804. Having non-moving LEDs can provide one or more advantages. For example, non-moving LEDs can provide improved EMI containment. The apparatus 800 can be modified in one or more ways. For example, positioning of the set of LEDs 820 can be modified to reduce lighting loss concerning the set of LEDs 820 which are positioned at the top of the opening 806. As another example, the type of LEDs of the set of LEDs 820 can be modified to reduce robustness challenges regarding the set of LEDs 820. As another example, the set of LEDs 818 is configured to transmit light into the lightguide 812 through a gap, and the light should thereafter propagate at an angle inside the lightguide 812 which is at least substantially perpendicular to the direction of entry into the lightguide 812, and the size of the gap and/or material of the lightguide 812 can be modified to uniformly transmit light in such a configuration. As another example, the shape of the closure 808, such as the U-shape illustrated with the closure 400 in FIG. 4, can be modified based on the type of circuitry used, such as flex circuitry or rigid circuitry. As another example, the control of lighting when the closure 808 is in the process of traveling between the open position and the closed position can be modified, such as having the set of LEDs 818 active while opening and/or closing the closure 808 or having the set of LEDs 818 inactive. As another example, the set of LEDs 820 and the circuit board 816 may be visible through the opening 806 when the closure 808 is in the open position or may be obscured by the seals 824, 826.

Figure 9A:
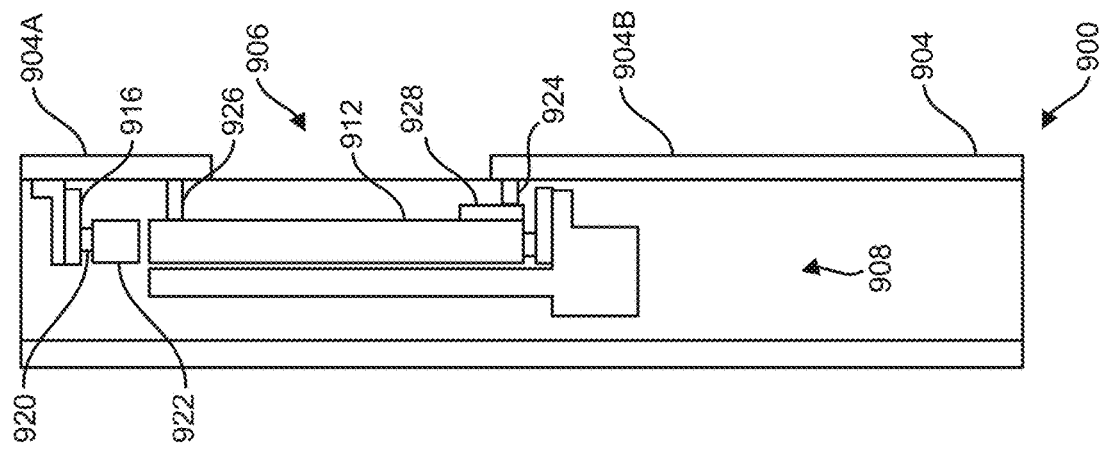
FIGS. 9A-9B show cross-section views of an implementation of an apparatus.
Figure 9B:
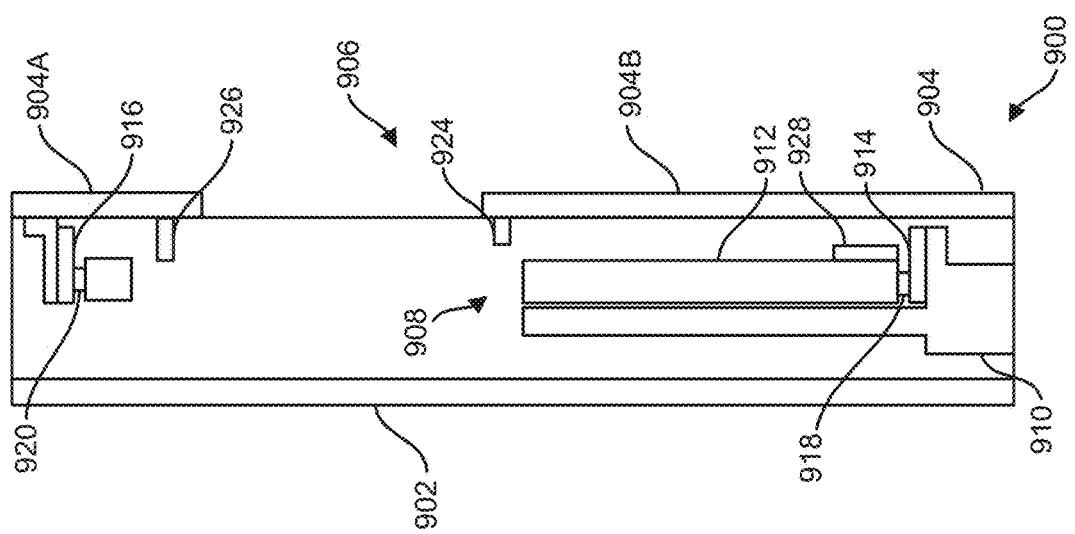

FIGS. 9A-9B show cross-section views of an implementation of an apparatus 900. For clarity, only a portion of the apparatus 900 is shown in the illustrations. The apparatus 900 can be used with the system 100 and/or one or more components of the closures and apparatuses described herein, such as closure 400 of FIG. 4, closure 500 of FIGS. 5A-5C, closure 600 of FIG. 6, closure 700 of FIG. 7, apparatus 800 of FIGS. 8A-8B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. The apparatus 900 includes an inner wall 902, an outer wall 904 including a portion 904A and a portion 904B, an opening 906 formed between the portions 904A and 904B of the outer wall 904, and a closure 908. The closure 908 can be used with one or more other examples described elsewhere herein. The closure 908 includes a lift 910 and a lightguide 912 mounted to the lift 910. The closure 908 can be moved between two or more different positions by the lift 910, such as an open position (e.g., FIG. 9A) and a closed position (e.g., FIG. 9B). That is, in the open position the closure 908 can allow a user access to an interior of the apparatus 900 through the opening 906. In the closed position, the closure 908 can prevent access to the interior of the apparatus 900. In the closed position, the closure 908 can also serve one or more other functions. For example, the closure 908 can serve as a containment shield in the closed position. For example, the closure 908 can provide a status indication by way of illumination at the lightguide 912 in the closed position.

One or more circuit boards can be included in the apparatus 900. In some implementations, a circuit board 914 is mounted to the lift 910, and a circuit board 916 is mounted on an inside of the outer wall 904. In some implementations, the inside can be defined by way of the direction that a person operating the apparatus 900 is expected to view the closure 908 through the opening 906, or to use an inner component of the apparatus 900 by way of access through the opening 906. For example, the circuit board 914 can be mounted at least substantially perpendicular to at least one of the portions 904A or 904B of the outer wall 904. For example, the circuit board 916 can be mounted at least substantially perpendicular to the portion 904A of the outer wall 904. A set of LEDs 918 can be mounted to the circuit board 914 (e.g., the set of LEDs 918 can be mounted in a row on one side of the circuit board 914). A set of LEDs 920 can be mounted to the circuit board 916 (e.g., the set of LEDs 920 can be mounted in a row on one side of the circuit board 916). In some implementations, each of the sets of LEDs 918 and 920 can be a top-emitting type of LEDs. Each of the sets of LEDs 918 and 920 can be configured to provide light into the lightguide 912. For example, the set of LEDs 918 can be configured to provide light into the lightguide 912 both when the closure 908 is in the closed position and in the open position. For example, the set of LEDs 920 can be configured to provide light into the lightguide 912 at least when the closure 908 is in the closed position. FIG. 9B shows the closure 908 in the closed position where it covers the opening 906. One or more additional lightguides can be used. Here, a lightguide 922 is positioned adjacent the set of LEDs 920. In some implementations, the lightguide 922 is not mounted to the closure 908. For example, the lightguide 922 may not be movable but rather can remain stationary with the rest of the apparatus 900. In the closed position, light from the set of LEDs 920 can be conveyed, optionally by way of the lightguide 922, into the lightguide 912. Light that enters the lightguide 912 can be extracted in one or more locations. In some implementations, the light of the lightguide 912 is extracted from the lightguide 912 so as to pass through the opening 906 toward an outside of the apparatus 900. For example, this can allow a user of the apparatus 900 to view the illumination at the lightguide 912, which may indicate a status or other operational characteristic of the apparatus 900.

One or more seals can be provided regarding the closure 908. In some implementations, a seal 924 and seal 926 are mounted to the outer wall 904. The seal 924 is here mounted to the portion 904B, and the seal 926 is here mounted to the portion 904A. In some implementations, a seal 928 can be provided at the lightguide 912. For example, in the closed position the seal 926 can at least substantially abut a surface of the lightguide 912. As another example, in the closed position the seal 924 can at least substantially abut the seal 928. The seals 924, 926 and 928 can contain against one or more occurrences, including, but not limited to, laser light, fluids, LED light, or EMI.

In the current example of the apparatus 900, the sets of LEDs 918 can be considered moving and the set of LEDs 920 can be considered non-moving. That is, the set of LEDs 918 is mounted to the closure 908 and the set of LEDs 920 is not mounted to the closure 908 but are rather positioned at another part of the apparatus 900, such as the outer wall 904. Having moving LEDs at least at the bottom of the closure 908 can provide one or more advantages. For example, the set of LEDs 918 can illuminate the lightguide 912 also when the closure 908 is in motion between the open position and the closed position. The apparatus 900 can be modified in one or more ways. For example, positioning of the set of LEDs 920 can be modified to reduce lighting loss concerning the set of LEDs 920 which are positioned at the top of the opening 906. As another example, the type of LEDs of the set of LEDs 820 can be chosen to reduce robustness challenges regarding the set of LEDs 920. As another example, positioning of the set of LEDs 920 can be modified to reduce the effect that light from the set of LEDs 920 may be substantially interrupted when the closure 908 moves away from the closed position. As another example, positioning of the set of LEDs 918 and/or the circuit board 914 can be modified to reduce visibility of the set of LEDs 918 and/or the circuit board 914 through the opening 906 when the closure 908 is in the open position.

FIGS. 10A-10B show cross-section views of an implementation of an apparatus 1000. For clarity, only a portion of the apparatus 1000 is shown in the illustrations. The apparatus 1000 can be used with the system 100 and/or one or more components of the closures and apparatuses described herein, such as closure 400 of FIG. 4, closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. The apparatus 1000 includes an inner wall 1002, an outer wall 1004 including a portion 1004A and a portion 1004B, an opening 1006 formed between the portions 1004A and 1004B of the outer wall 1004, and a closure 1008. The closure 1008 can be used with one or more other examples described elsewhere herein. The closure 1008 includes a lift 1010 and a lightguide 1012 mounted to the lift 1010. The closure 1008 can be moved between two or more different positions by the lift 1010, such as an open position (e.g., FIG. 10A) and a closed position (e.g., FIG. 10B). That is, in the open position the closure 1008 can allow a user access to an interior of the apparatus 1000 through the opening 1006. In the closed position, the closure 1008 can prevent access to the interior of the apparatus 1000. In the closed position, the closure 1008 can also serve one or more other functions. For example, the closure 1008 can serve as a containment shield in the closed position. For example, the closure 1008 can provide a status indication by way of illumination at the lightguide 1012 in the closed position.

One or more circuit boards can be included in the apparatus 1000. In some implementations, a circuit board 1014 and a circuit board 1016 are mounted to the lift 1010. For example, each of the circuit board 1014 and the circuit board 1016 can be mounted at least substantially perpendicular to at least one of the portions 1004A or 1004B of the outer wall 1004. A set of LEDs 1018 can be mounted to the circuit board 1014 (e.g., the set of LEDs 1018 can be mounted in a row on one side of the circuit board 1014). A set of LEDs 1020 can be mounted to the circuit board 1016 (e.g., the set of LEDs 1020 can be mounted in a row on one side of the circuit board 1016). In some implementations, each of the sets of LEDs 1018 and 1020 can be a top-emitting type of LEDs. Each of the sets of LEDs 1018 and 1020 can be configured to provide light into the lightguide 1012. For example, each of the sets of LEDs 1018 and 1020 can be configured to provide light into the lightguide 1012 both when the closure 1008 is in the closed position and in the open position.

FIG. 10B shows the closure 1008 in the closed position where it covers the opening 1006. Light from each of the sets of LEDs 1018 and 1020 can enter the lightguide 1012. Light that enters the lightguide 1012 can be extracted in one or more locations. In some implementations, the light of the lightguide 1012 is extracted from the lightguide 1012 so as to pass through the opening 1006 toward an outside of the apparatus 1000. For example, this can allow a user of the apparatus 1000 to view the illumination at the lightguide 1012, which may indicate a status or other operational characteristic of the apparatus 1000.

One or more seals can be provided regarding the closure 1008. In some implementations, a seal 1024 and seal 1026 are mounted to the outer wall 1004. The seal 1024 is here mounted to the portion 1004B, and the seal 1026 is here mounted to the portion 1004A. In some implementations, a seal 1028 can be provided at the lightguide 1012. For example, in the closed position the seal 1026 can at least substantially abut a surface of a trim 1030 of the closure 1008. As another example, in the closed position the seal 1024 can at least substantially abut the seal 1028. The seals 1024, 1026 and 1028 can contain against one or more occurrences, including, but not limited to, laser light, fluids, LED light from the LEDs 1020 or 1018, or EMI.

In the current example of the apparatus 1000, the sets of LEDs 1018 and 1020 can be considered moving. That is, each of the sets of LEDs 1018 and 1020 is mounted to the closure 1008. Having moving LEDs can provide one or more advantages. For example, each of the set of LEDs 1018 and 1020 can illuminate the lightguide 1012 when the closure 1008 is in motion between the open position and the closed position. Having LEDs coupled to the closure 1008 can provide improved illumination uniformity and reliability. Having LEDs coupled to the closure 1008 can allow the closure 1008 to be built as a single field-replaceable unit, which can provide advantages for serviceability. For example, during a field service event, having all LEDs coupled to closure 1008 as a single replaceable unit can help to ensure all LEDs on the apparatus 1000 utilize LEDs with similar light output by selecting LEDs with substantially similar color profiles when constructing the single replaceable unit. Such a single replaceable unit may result in more uniform coloring for the unit without having to match the light output between a first set of LEDs (e.g., if previously attached to the portion 1004A or 1004B thereof) and a second set of LEDs.

Figure 11A:
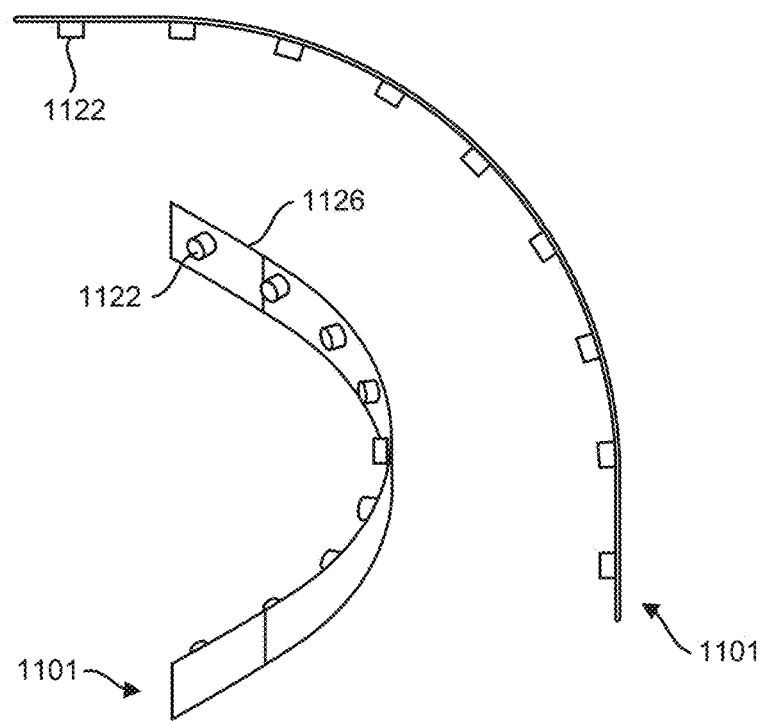
FIGS. 11A-11C show implementations relating to an apparatus.
Figure 11B:
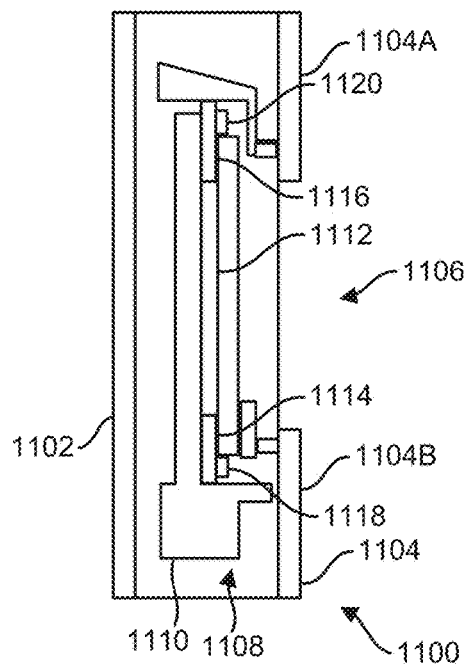
Figure 11C:
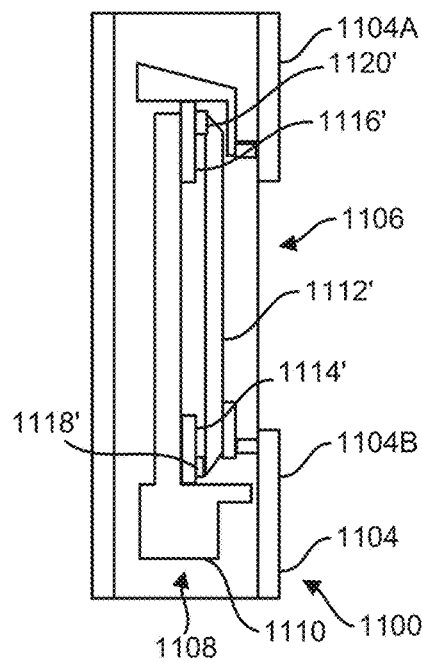

FIGS. 11A-11C show implementations relating to an apparatus 1100. FIG. 11A shows examples of a flex circuit 1101 (e.g., a flexible circuit board) that can be used with the apparatus 1100. FIG. 11B shows a cross-section view of the apparatus 1100 with side-emitting LEDs. FIG. 11C shows a cross-section view of the apparatus 1100 with top-emitting LEDs. For clarity, only a portion of the apparatus 1100 is shown in the illustrations. The apparatus 1100 can be used with the system 100 and/or one or more components of the closures and apparatuses described herein, such as closure 400 of FIG. 4, closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. The apparatus 1100 includes an inner wall 1102, an outer wall 1104 including a portion 1104A and a portion 1104B, an opening 1106 formed between the portions 1104A and 1104B of the outer wall 1104, and a closure 1108. The closure 1108 can be used with one or more other examples described elsewhere herein. The closure 1108 includes a lift 1110 and a lightguide 1112 mounted to the lift 1110 (FIG. 11B) or a lightguide 1112' mounted to the lift 1110 (FIG. 11C). Here, the lightguide 1112 has end surfaces that are at least substantially perpendicular to its primary surfaces, and the lightguide 1112' has end surfaces that are non-perpendicular to its primary surfaces. The closure 1108 can be moved between two or more different positions by the lift 1110, such as an open position (not shown) where the closure 1108 is away from the opening 1106, and a closed position (FIGS.

11B-11C) where the closure 1108 at least substantially covers the opening 1106. That is, in the open position the closure 1108 can allow a user access to an interior of the apparatus 1100 through the opening 1106. In the closed position, the closure 1108 can prevent access to the interior of the apparatus 1100. In the closed position, the closure 1108 can also serve one or more other functions. For example, the closure 1108 can serve as a containment shield in the closed position. For example, the closure 1108 can provide a status indication by way of illumination at the lightguide 1112 or 1112' in the closed position.

One or more circuit boards can be included in the apparatus 1100. In some implementations, a circuit board 1114 and a circuit board 1116 are mounted to the lift 1110. For example, the circuit boards 1114 and 1116 can be used with the lightguide 1112. For example, each of the circuit board 1114 and the circuit board 1116 can be mounted at least substantially parallel to the lightguide 1112. A set of LEDs 1118 can be mounted to the circuit board 1114 (e.g., the set of LEDs 1118 can be mounted in a row on one side of the circuit board 1114). A set of LEDs 1120 can be mounted to the circuit board 1116 (e.g., the set of LEDs 1120 can be mounted in a row on one side of the circuit board 1116). The sets of LEDs 1118 and 1120 can be used with the lightguide 1112, for example. In some implementations, each of the sets of LEDs 1118 and 1120 can be a side-emitting type of LEDs. Each of the sets of LEDs 1118 and 1120 can be configured to provide light into the lightguide 1112. For example, each of the sets of LEDs 1118 and 1120 can be configured to provide light into the lightguide 1112 both when the closure 1108 is in the closed position and in the open position. The circuit boards 1114 and/or 1116 can be a rigid circuit board or a flexible circuit board, such as flex circuit 1101.

In some implementations, a circuit board 1114' and a circuit board 1116' are mounted to the lift 1110. The circuit boards 1114' and 1116' can be used with the lightguide 1112', for example. For example, each of the circuit board 1114' and the circuit board 1116' can be mounted at least substantially parallel to the lightguide 1112'. A set of LEDs 1118' can be mounted to the circuit board 1114' (e.g., the set of LEDs 1118' can be mounted in a row on one side of the circuit board 1114'). A set of LEDs 1120' can be mounted to the circuit board 1116' (e.g., the set of LEDs 1120' can be mounted in a row on one side of the circuit board 1116'). The sets of LEDs 1118' and 1120' can be used with the lightguide 1112', for example. In some implementations, each of the sets of LEDs 1118' and 1120' can be a top-emitting type of LEDs. Each of the sets of LEDs 1118' and 1120' can be configured to provide light into the lightguide 1112'. For example, each of the sets of LEDs 1118' and 1120' can be configured to provide light into the lightguide 1112' both when the closure 1108 is in the closed position and in the open position. The circuit boards 1114' and/or 1116' can be a rigid circuit board or a flexible circuit board, such as flex circuit 1101.

Light that enters the lightguide 1112 or 1112' can be extracted in one or more locations. In some implementations, the light of the lightguide 1112 or 1112' is extracted from the lightguide 1112 or 1112' so as to pass through the opening 1106 toward an outside of the apparatus 1100. For example, this can allow a user of the apparatus 1100 to view the illumination at the lightguide 1112 or 1112', which may indicate a status or other operational characteristic of the apparatus 1100.

The flex circuit 1101 can be used for implementing one or more of the circuit boards 1114, 1114', 1116, or 1116'. For example, LEDs 1122 of the flex circuit 1101 can be mounted in a row on one side of flex circuit 1101 and serve as the sets of LEDs 1118, 1118', 1120, or 1120'. The flex circuit 1101 can include a flexible substrate 1126 on which the LEDs 1122 are mounted.

Using side-emitting LEDs (e.g., the sets of LEDs 1118 or 1120) can provide advantages. For example, the flex circuit 1101 can be mounted on either the lift 1110 or the lightguide 1112. As another example, the flex circuit 1101 can achieve a relatively high density of the LEDs 1122, such as due to a hot bar solder connection method. As another example, the flex circuit 1101 can accommodate curved implementations, including, but not limited to, the closure 400 in FIG. 4 (e.g., a U-shape).

Figure 12A:
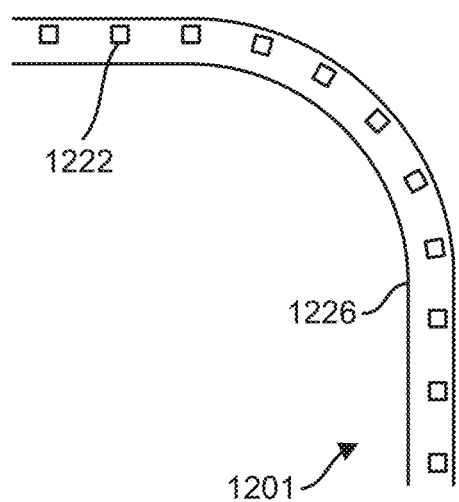
FIGS. 12A-12B show implementations relating to an apparatus.
Figure 12B:
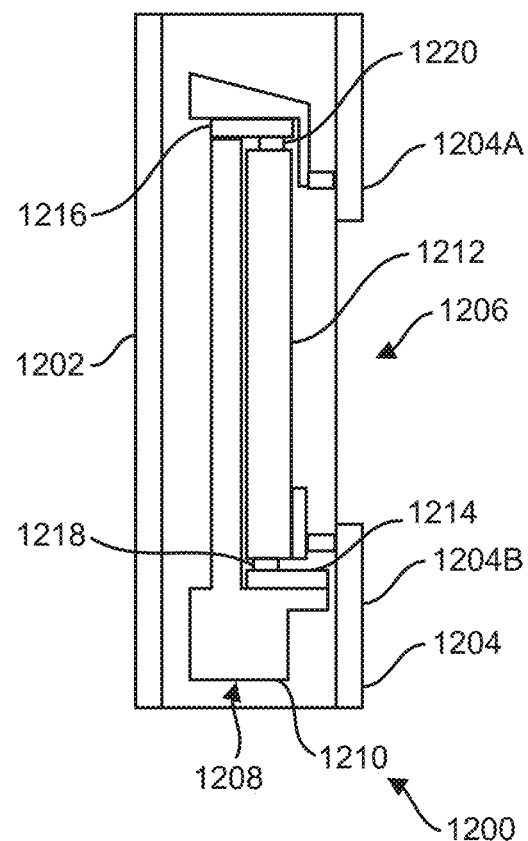

FIGS. 12A-12B show implementations relating to an apparatus 1200. FIG. 12A shows an example of a rigid circuit board 1201 that can be used with the apparatus 1200. FIG. 12B shows a cross-section view of the apparatus 1200 with top-emitting LEDs. For clarity, only a portion of the apparatus 1200 is shown in the illustrations. The apparatus 1200 can be used with the system 100 and/or one or more components of the closures and apparatuses described herein, such as closure 400 of FIG. 4, closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. The apparatus 1200 includes an inner wall 1202, an outer wall 1204 including a portion 1204A and a portion 1204B, an opening 1206 formed between the portions 1204A and 1204B of the outer wall 1204, and a closure 1208. The closure 1208 can be used with one or more other examples described elsewhere herein. The closure 1208 includes a lift 1210 and a lightguide 1212 mounted to the lift 1210. Here, the lightguide 1212 has end surfaces that are at least substantially perpendicular to its primary surfaces. The closure 1208 can be moved between two or more different positions by the lift 1210, such as an open position (not shown) where the closure 1208 is away from the opening 1206, and a closed position (FIG. 12B) where the closure 1208 at least substantially covers the opening 1206. That is, in the open position the closure 1208 can allow a user access to an interior of the apparatus 1200 through the opening 1206. In the closed position, the closure 1208 can prevent access to the interior of the apparatus 1200. In the closed position, the closure 1208 can also serve one or more other functions. For example, the closure 1208 can serve as a containment shield in the closed position. For example, the closure 1208 can provide a status indication by way of illumination at the lightguide 1212 in the closed position.

One or more circuit boards can be included in the apparatus 1200. In some implementations, a circuit board 1214 and a circuit board 1216 are mounted to the lift 1210. For example, each of the circuit board 1214 and the circuit board 1216 can be mounted at least substantially perpendicular to the lightguide 1212. A set of LEDs 1218 can be mounted to the circuit board 1214 (e.g., the set of LEDs 1218 can be mounted in a row on one side of the circuit board 1214). A set of LEDs 1220 can be mounted to the circuit board 1216 (e.g., the set of LEDs 1220 can be mounted in a row on one side of the circuit board 1216). In some implementations, each of the sets of LEDs 1218 and 1220 can be a top-emitting type of LEDs. Each of the sets of LEDs 1218 and 1220 can be configured to provide light into the lightguide

1212. For example, each of the sets of LEDs 1218 and 1220 can be configured to provide light into the lightguide 1212 both when the closure 1208 is in the closed position and in the open position.

Light that enters the lightguide 1212 can be extracted in one or more locations. In some implementations, the light of the lightguide 1212 is extracted from the lightguide 1212 so as to pass through the opening 1206 toward an outside of the apparatus 1200. For example, this can allow a user of the apparatus 1200 to view the illumination at the lightguide 1212, which may indicate a status or other operational characteristic of the apparatus 1200.

The rigid circuit board 1201 can be used for implementing one or more of the circuit boards 1214 and 1216. For example, LEDs 1222 of the rigid circuit board 1201 can serve as the sets of LEDs 1218 or 1220. The rigid circuit board 1201 can include a rigid substrate 1226 on which the LEDs 1222 are mounted. In the current example, the circuit board 1216 is positioned with a bias towards the inner wall 1202, and the circuit board 1214 is positioned with a bias away from the inner wall 1202. In some implementations, one or more of the circuit boards 1214 and 1216 can have a position with a different bias or can have a non-biased position. For example, each of the circuit boards 1214 and 1216 can be biased toward the inner wall 1202.

Using top-emitting LEDs (e.g., the sets of LEDs 1218 or 1220) can provide advantages. For example, the LEDs can emit light into the main direction of travel within the lightguide 1212 (e.g., along its main length as defined by opposing primary surfaces). As another example, the design may be more tolerant of geometric misalignment between the sets of LEDs 1218 or 1220 and the lightguide 1212. As another example, top-emitting LEDs are more common among manufacturers, such that they can be cheaper. As another example, top-emitting LEDs can be more efficient than side-emitting LEDs.

Using rigid circuit boards (e.g., the rigid circuit board 1201) can provide advantages. For example, the rigid circuit board can facilitate a more robust attachment to the lift 1210, such as by not requiring any adhesive which may be used with a flexible circuit board. As another example, the design may be less limited in current carrying capabilities than a flex circuit design.

FIG. 13 shows a cross-section view of an implementation of an apparatus 1300. For clarity, only a portion of the apparatus 1300 is shown in the illustrations. The apparatus 1300 can be used with the system 100 and/or one or more components of the closures and apparatuses described herein, such as closure 400 of FIG. 4, closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. The apparatus 1300 includes an inner wall 1302, an outer wall 1304 including a portion 1304A and a portion 1304B, an opening 1306 formed between the portions 1304A and 1304B of the outer wall 1304, and a closure 1308. The closure 1308 can be used with one or more other examples described elsewhere herein. The closure 1308 includes a lift 1310 and a lightguide 1312 mounted to the lift 1310. Here, the lightguide 1312 has end surfaces that are at least substantially perpendicular to its primary surfaces. The closure 1308 can be moved between two or more different positions by the lift 1310, such as an open position (not shown) where the closure 1308 is away from the opening 1306, and a closed position (e.g., as shown) where the closure 1308 at least substantially covers the opening 1306. That is, in the open position the closure 1308 can allow a user access to an interior of the apparatus 1300 through the opening 1306. In the closed position, the closure 1308 can prevent access to the interior of the apparatus 1300. In the closed position, the closure 1308 can also serve one or more other functions. For example, the closure 1308 can serve as a containment shield in the closed position. For example, the closure 1308 can provide a status indication by way of illumination at the lightguide 1312 in the closed position.

One or more circuit boards can be included in the apparatus 1300. In some implementations, a circuit board 1314 and a circuit board 1316 are mounted to the lift 1310. For example, each of the circuit board 1314 and the circuit board 1316 can be mounted at least substantially parallel to the lightguide 1312. A set of LEDs 1318 can be mounted to the circuit board 1314 (e.g., the set of LEDs 1318 can be mounted in a row on one side of the circuit board 1314). A set of LEDs 1320 can be mounted to the circuit board 1316 (e.g., the set of LEDs 1320 can be mounted in a row on one side of the circuit board 1316). In some implementations, each of the sets of LEDs 1318 and 1320 can be a side-emitting type of LEDs. In other implementations, each of the sets of LEDs 1318 and 1320 can be a top-emitting type of LEDs. Each of the sets of LEDs 1318 and 1320 can be configured to provide light into the lightguide 1312. For example, each of the sets of LEDs 1318 and 1320 can be configured to provide light into the lightguide 1312 both when the closure 1308 is in the closed position and in the open position.

Here, a curved structure 1322 is configured to convey light between the set of LEDs 1318 and the lightguide 1312, and a curved structure 1324 is configured to convey light between the set of LEDs 1320 and the lightguide 1312. Each of the curved structures 1322 and 1324 can include a substrate capable of conveying electromagnetic radiation, including, but not limited do, a lightguide or a mirror. In some implementations, one or more additional lightguides can be used. Here, a lightguide 1326 is configured to convey light between the set of LEDs 1318 and one end of the curved structure 1322, and another end of the curved structure 1322 meets with the lightguide 1312. Here, a lightguide 1328 is configured to convey light between the set of LEDs 1320 and one end of the curved structure 1324, and another end of the curved structure 1324 meets with the lightguide 1312. In some implementations, the lightguide 1312, curved structures 1322, 1324, and lightguides 1326, 1328 may be a single, continuous lightguide. In some implementations, the lightguide 1312 and curved structures 1322, 1324 may be a single, continuous lightguide.

Light that enters the lightguide 1312 can be extracted in one or more locations. In some implementations, the light of the lightguide 1312 is extracted from the lightguide 1312 so as to pass through the opening 1306 toward an outside of the apparatus 1300. For example, this can allow a user of the apparatus 1300 to view the illumination at the lightguide 1312, which may indicate a status or other operational characteristic of the apparatus 1300.

FIGS. 14A-14B show cross-section views of implementations of closures 1400 and 1450. Each of the closures 1400 and 1450 can be used with the system 100 and/or one or more components of the closures and apparatuses described herein, such as closure 400 of FIG. 4, closure 500 of FIGS.

Figure 21A:
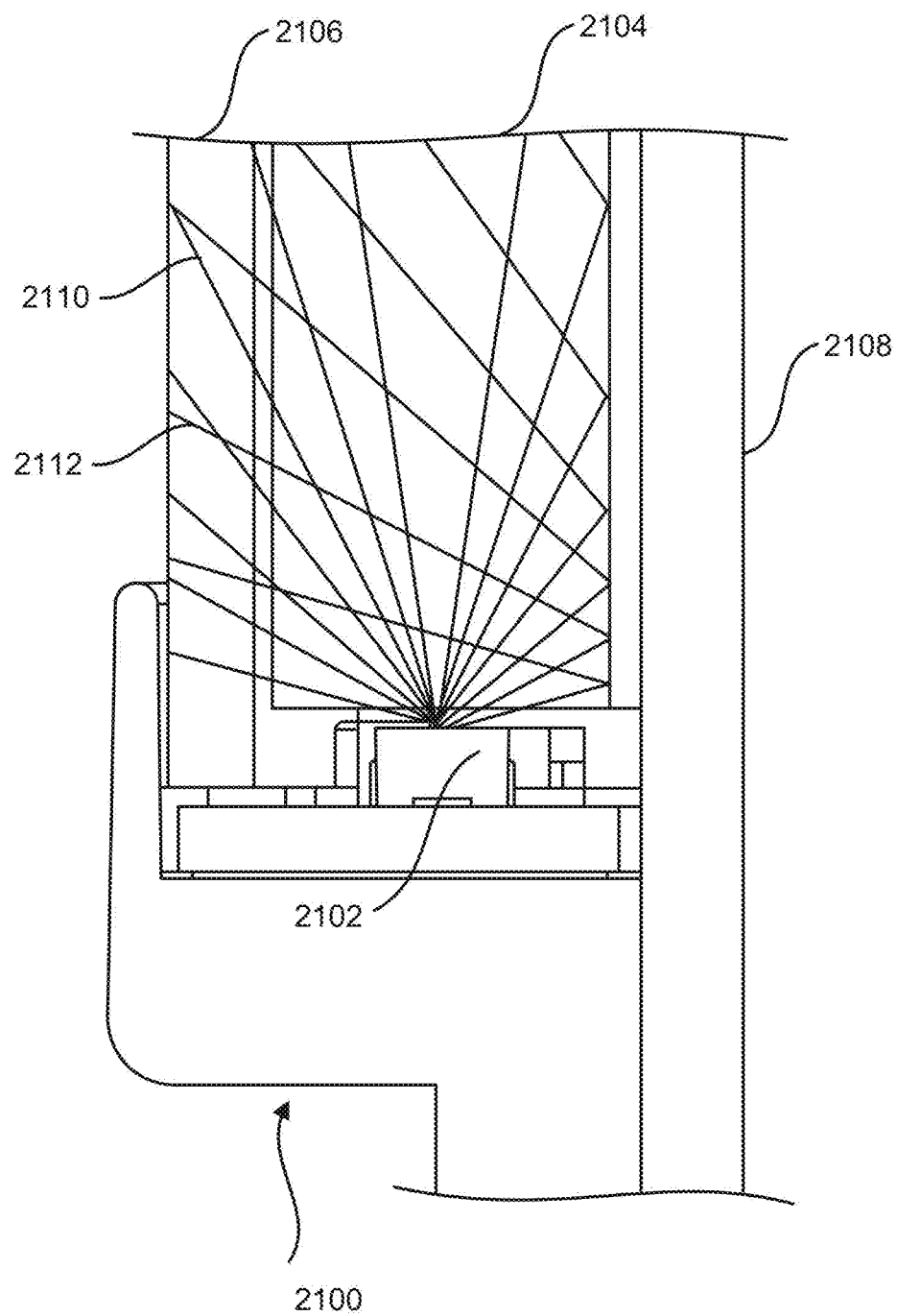
FIGS. 21A-21C show cross-section views of implementations of closures.
Figure 21B:
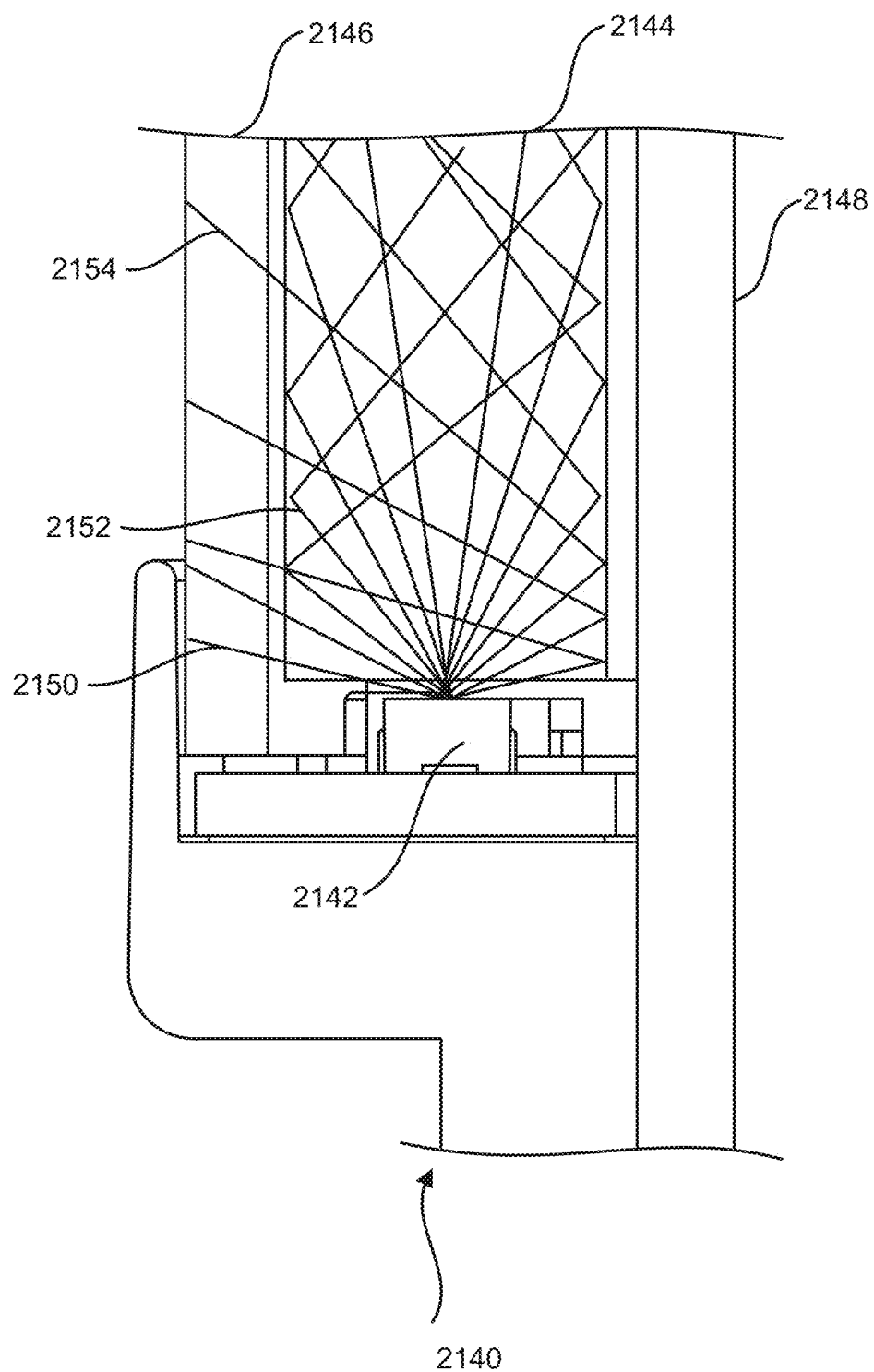
Figure 21C:
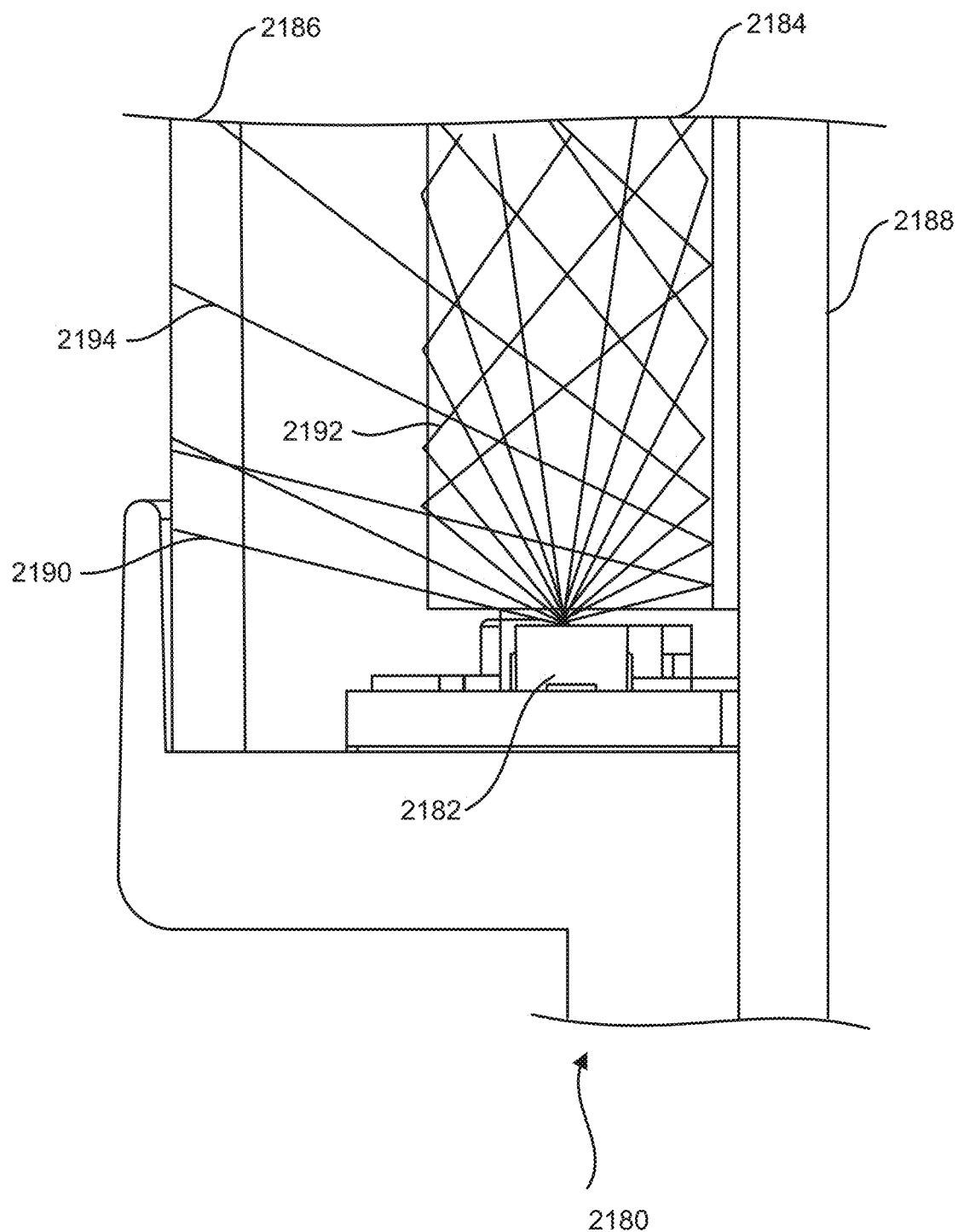
Figure 25:
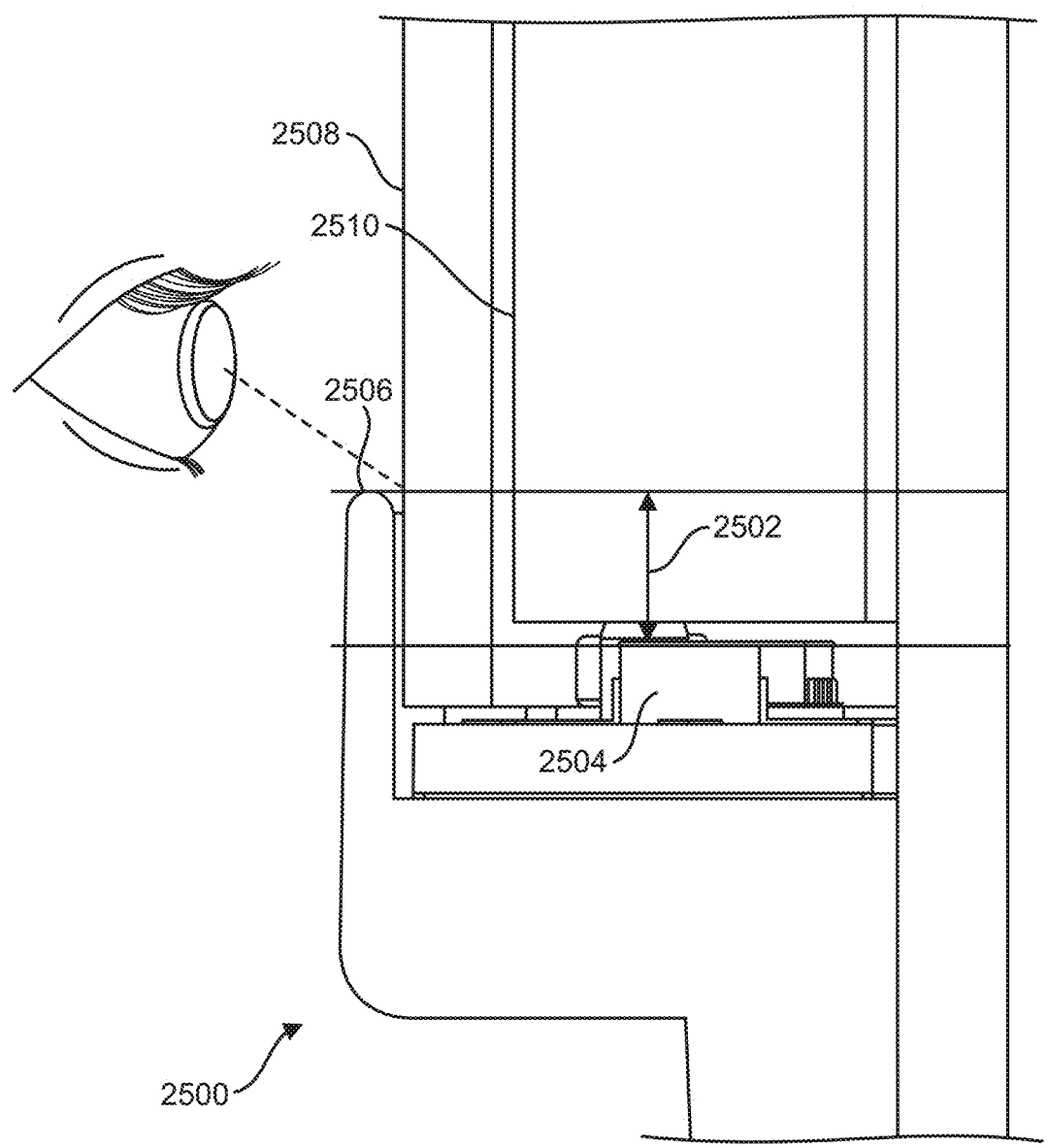
FIG. 25 shows a cross-section view of an implementation of a closure.
Figure 30:
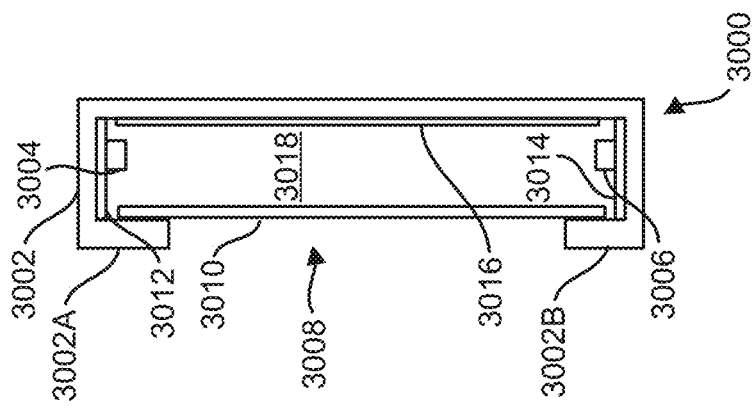
FIG. 30 shows an implementation of a closure.
Figure 29:
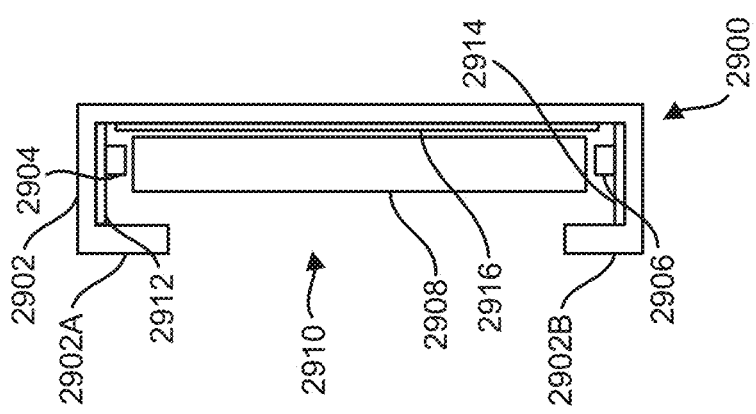
FIG. 29 shows an implementation of a closure.

5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. The closure 1400 includes a lightguide 1402 that can be wrapped about edges of a substrate 1404. That is, the lightguide 1402 comprises a main portion 1402A that includes the primary surfaces of the lightguide 1402, curved portions 1402B and 1402C where the lightguide 1402 wraps about the substrate 1404, and end portions 1402D and 1402E at an opposite side of the substrate 1404 than the main portion 1402A. That is, the end portion 1402D can terminate the curved portion 1402B, and the end portion 1402E can terminate the curved portion 1402C.

One or more circuit boards (not shown) can be included in the closure 1400. The circuit board can include one or more light sources (e.g., LEDs), such as top-emitting LEDs or side-emitting LEDs. In some implementations, light from the light sources can be conveyed into the end portion 1402D, then into the curved portion 1402B, and then into the main portion 1402A. In some implementations, light from the light sources can be conveyed into the end portion 1402E, then into the curved portion 1402C, and then into the main portion 1402A. At the main portion 1402A, light can be extracted for ultimately being observed by a user. For example, a diffuser 1406 can be positioned between the user and the main portion 1402A of the lightguide 1402. The diffuser 1406 is positioned proximate to a primary surface of the lightguide 1402.

The closure 1450 includes a lightguide 1452 and a substrate 1454. The lightguide 1452 has primary surfaces, one of which (e.g., an outer one) can be designated to be viewed by an observer during use. The closure 1450 includes curved portions 1456 and 1458 that wrap about edges of the substrate 1454. For example, each of the curved portions 1456 and 1458 can include a mirror or other substrate that conveys and/or redirects light. The closure 1450 includes lightguides 1460 and 1462 at an opposite side of the substrate 1454 than the lightguide 1452. The lightguide 1460 can at least substantially abut one end of the curved portion 1456, with another end of the curved portion 1456 at least substantially abutting one edge of the lightguide 1452. The lightguide 1462 can at least substantially abut one end of the curved portion 1458, with another end of the curved portion 1458 at least substantially abutting one edge of the lightguide 1452.

One or more circuit boards (not shown) can be included in the closure 1450. The circuit board can include one or more light sources (e.g., LEDs), such as top-emitting LEDs or side-emitting LEDs. In some implementations, light from the light sources can be conveyed into the lightguide 1460, then into the curved portion 1456, and then into the lightguide 1452. In some implementations, light from the light sources can be conveyed into the lightguide 1462, then into the curved portion 1458, and then into the lightguide 1452. At the lightguide 1452, light can be extracted for ultimately being observed by a user. For example, a diffuser 1464 can be positioned between the user and the lightguide 1452. The diffuser 1464 is positioned proximate to a primary surface of the lightguide 1452.

Providing light using either of the closure 1308 (FIG. 13), the closure 1400 (FIG. 14A), or the closure 1450 (FIG. 14B) can provide advantages. For example, the light can be initially generated (e.g., by LEDs) on a non-visible (e.g., rear) side of the closure, which can provide a clean design where the light sources are not apparent to the user. As another example, due to the distance between the light source and the lightguide, the light has a relatively long distance over which to spread out, which can increase uniformity of the light and thereby provide an improved appearance at the visible illumination surface (e.g., a diffuser). As another example, the approaches described in these examples can be particularly advantageous when the closure does not have any bends or curves.

Figure 15A:
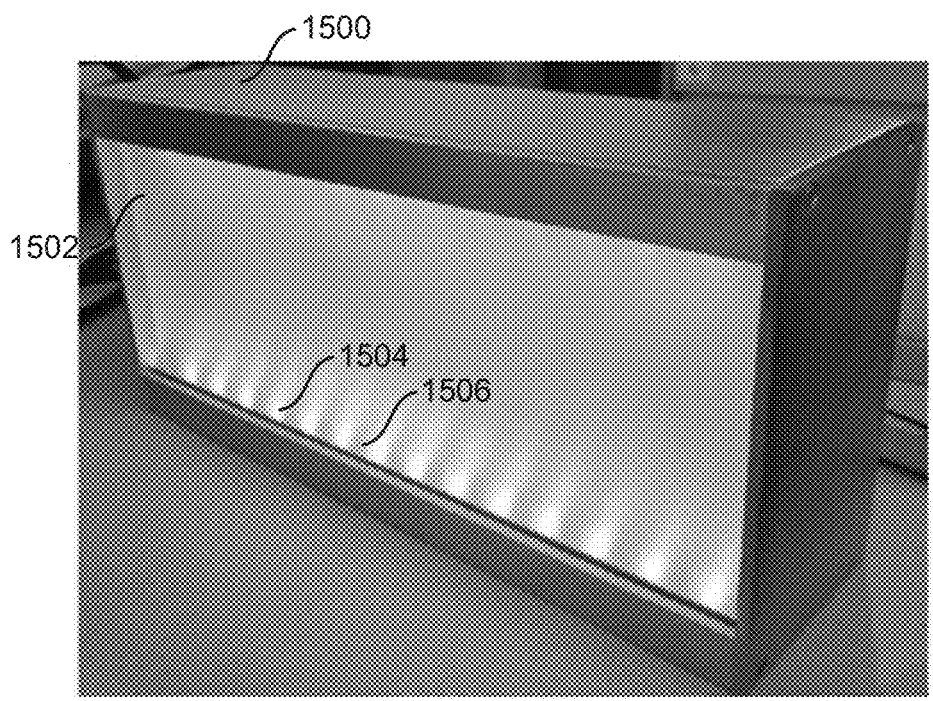
FIGS. 15A-15B show implementations relating to light uniformity.
Figure 15B:
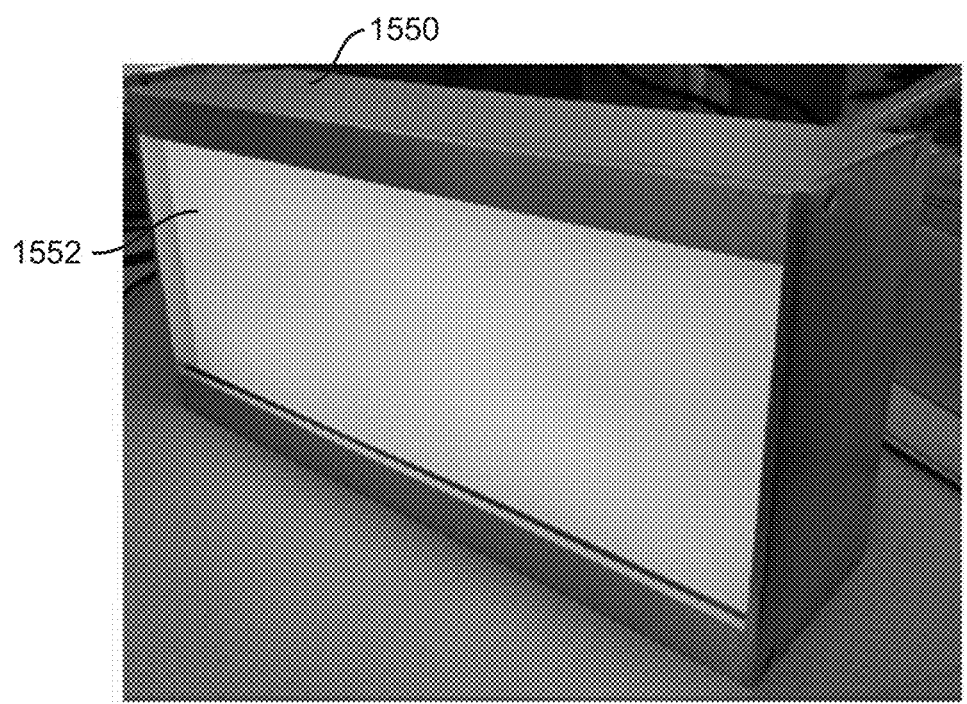

FIGS. 15A-15B show implementations relating to light uniformity. In FIG. 15A, a housing 1500 includes an illumination surface 1502. The uniformity of the light at the illumination surface 1502 depends on one or more factors, including, but not limited to, the thickness of a diffuser, a spacing of light sources (e.g., LEDs), a distance between a diffuser and a light extraction surface on a lightguide, a surface treatment of the lightguide, or a distance between light sources and the lightguide. Here, the illumination surface 1502 provides a relatively low uniformity of light having a relatively high coefficient of variation (CV) for the luminance of the light in different areas of the illumination surface 1502. For example, multiple brighter spots 1504 are visible, interspersed with respective darker spots 1506. Due to the brighter spots 1504 and the darker spots 1506, the light at the illumination surface 1502 is considered to have low uniformity which is likely to be detectable or noticed by a user.

In FIG. 15B, a housing 1550 includes an illumination surface 1552. The uniformity of the light at the illumination surface 1552 depends on one or more factors, including, but not limited to, the thickness of a diffuser, a spacing of light sources (e.g., LEDs), a distance between a diffuser and a light extraction surface on a lightguide, surface treatment of the lightguide, or a distance between light sources and the lightguide. Here, the illumination surface 1552 provides a relatively high uniformity of light having a relatively low CV for the luminance of the light in different areas of the illumination surface 1552. For example, no brighter spots or darker spots are visible at the illumination surface 1552. Due to the absence of brighter spots and darker spots or any other visible variations or shading gradations, the light at the illumination surface 1552 is considered to have high uniformity.

Figure 16A:
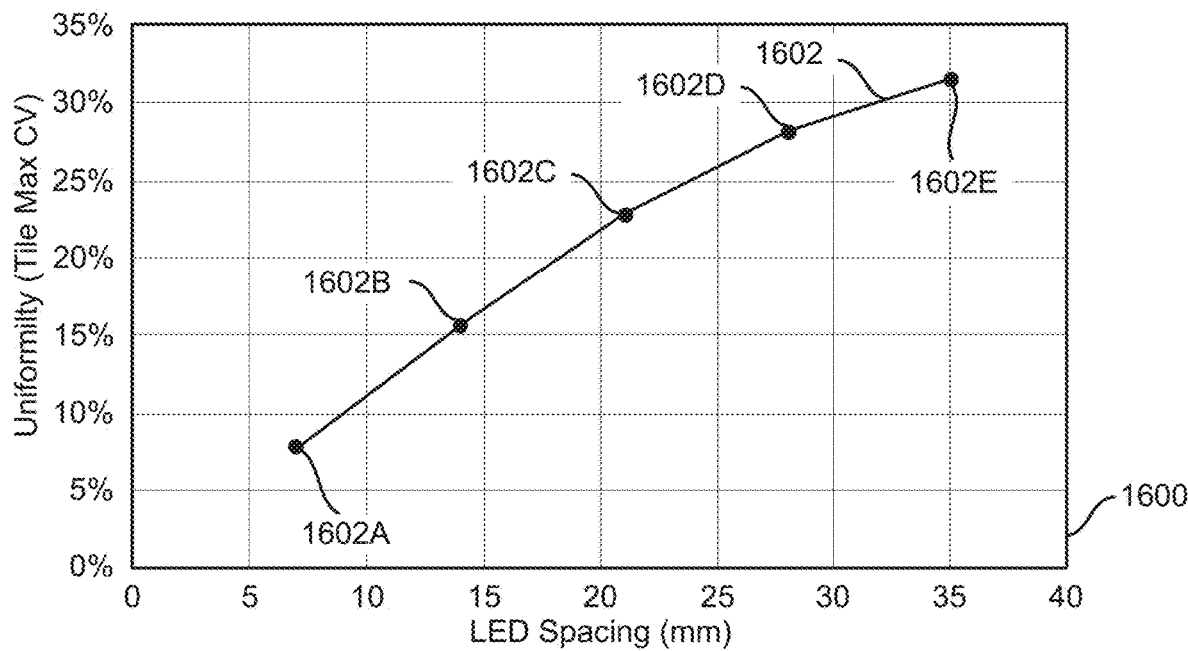
FIGS. 16A-16B show implementations relating to light uniformity.
Figure 16B:
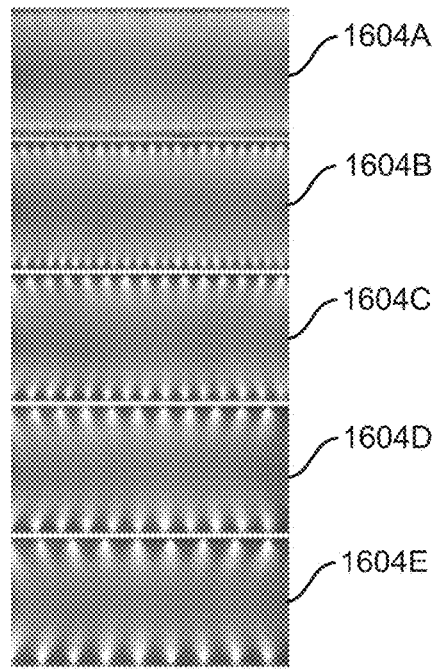

FIGS. 16A-16B show implementations relating to light uniformity. A graph 1600 relates to light uniformity at an illumination surface as a function of light source (e.g., LED) spacing. The light uniformity is indicated against the vertical axis (e.g., in terms of CV of the luminance of the light) where a higher value corresponds to worse (e.g., less) uniformity. The spacing is indicated against the horizontal axis (e.g., in millimeters (mm)). LED spacing is a measure that reflects the density of LEDs; for example, the shorter the LED spacing distance, the greater the LED density. A graph 1602 is presented. For example, the graph 1602 can be based on five data points 1602A-1602E corresponding to different light source spacings and their respective uniformity values. It can be seen that uniformity generally worsens (i.e., CV increases) with greater spacing of the light sources. Similarly, uniformity generally improves (i.e., CV decreases) with smaller spacing of the light sources. The data points 1602A-1602E are based on images 1604A-1604E, respectively, and represent the maximum CV of the luminance among tiles defined at the illumination surface. The CVs of the data points 1602A-1602E are here expressed as the percentage of the standard deviation of the luminance to the mean of the luminance. Each of the data points 1602A-1602E represents the maximum CV detected among the measured tiles for a respective LED spacing. For example, it is seen that the image 1604A has the highest uniformity, and that the image 1604E has the lowest uniformity, of the images 1604A-1604E.

Each of the images 1604A-1604E can have the same size. For example, each of the images 1604A-1604E can have a size of about 300 mm by 138 mm. Uniformity analysis can be performed by defining tiles having one or more shapes and/or sizes. In some implementations, the images 1604A-1604E can be analyzed based on tiles that are rectangular, including, but not limited to, having a size of about 35 mm by 15 mm. For example, the width of the tile (i.e., the size of the tile parallel to the stepping direction) can be selected based at least in part on a spacing between light sources. In some implementations, the height of the tile (i.e., the size of the tile perpendicular to the stepping direction) can be selected based at least in part on a known size and shape of the light cone from an individual light source. For example, the height of the tile can be large enough to capture the most luminous part of the light cone without including too much image content from areas where the light has become more uniform. For example, this can ensure that both relatively bright and areas are included into a single tile, thereby maximizing contrast and ensuring a strong signal when assessing uniformity.

The location(s) of the tile can be defined in relation to any edge of the images 1604A-1604E. For example, the tile can be offset about 4.5 mm from the top edge of the images 1604A-1604E. The tile can be stepped across the image in any direction. For example, the tile can be stepped across at least part of a region that is relatively closer to one or more light sources (e.g., LEDs) than another edge of the image. The tile can be stepped using a predefined distance increment. In some implementations, the predefined distance increment can be about 6 mm. When the tile is wider than the predefined distance increment in the direction of stepping, two or more successive tiles can partially overlap each other. For example, an overlap can reduce or avoid signal aliasing that can otherwise occur due to misalignment of the tile with regard to the pattern of light sources. Any number of tiles can be included in the stepping process. For example, 40 tiles can be captured for each of the images 1604A-1604E.

The image content that is associated with the respective tiles of the stepping process can be analyzed regarding its light uniformity. In some implementations, CV can be determined for each of the tiles. In some implementations, the maximum CV value among the tiles can be identified. For example, the data point 1602A reflects the maximum CV value determined for the tiles of the image 1604A; the data point 1602B reflects the maximum CV value determined for the tiles of the image 1604B; the data point 1602C reflects the maximum CV value determined for the tiles of the image 1604C; the data point 1602D reflects the maximum CV value determined for the tiles of the image 1604D; and the data point 1602E reflects the maximum CV value determined for the tiles of the image 1604E. Other shapes and/or sizes of tiles can be used. Other numbers of tiles can be captured per image.

In some implementations, LED density (e.g., the LED spacing) can be selected toward a leftmost portion of the graph 1602. For example, the LED spacing can be selected so that the CV is less than about 20%, such as less than about 17% or less than about 10%.

Figure 17A:
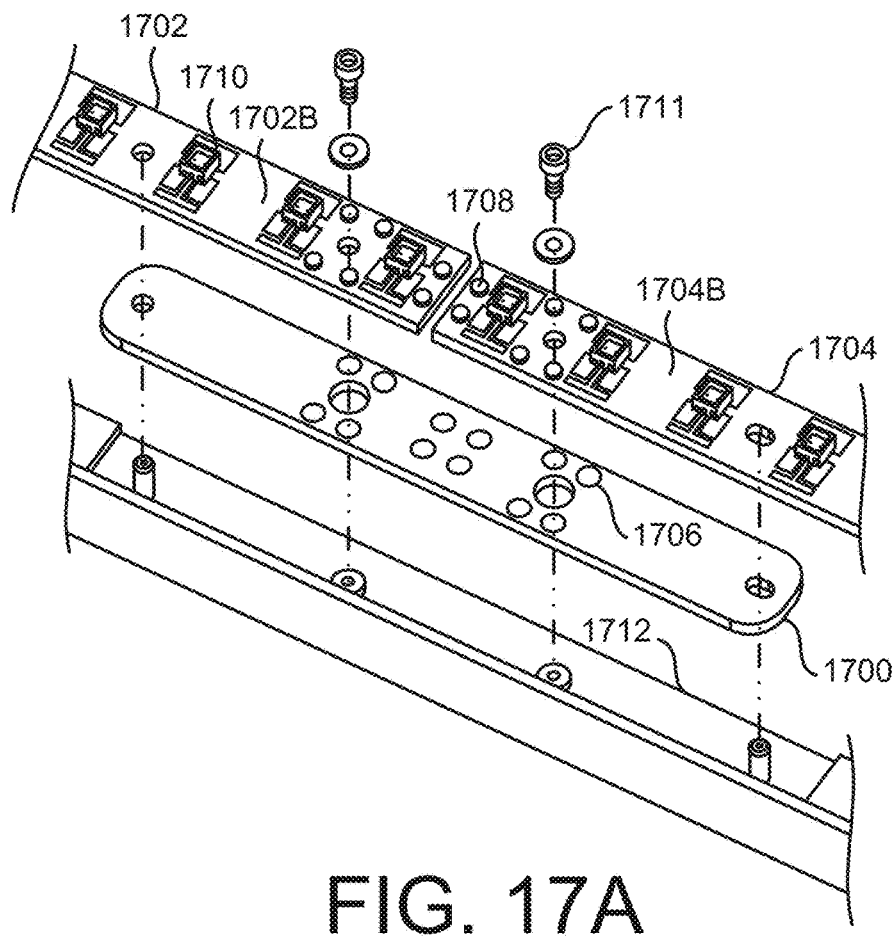
FIGS. 17A-17B show exploded views relating to an implementation of an interconnect for circuit boards.
Figure 17B:
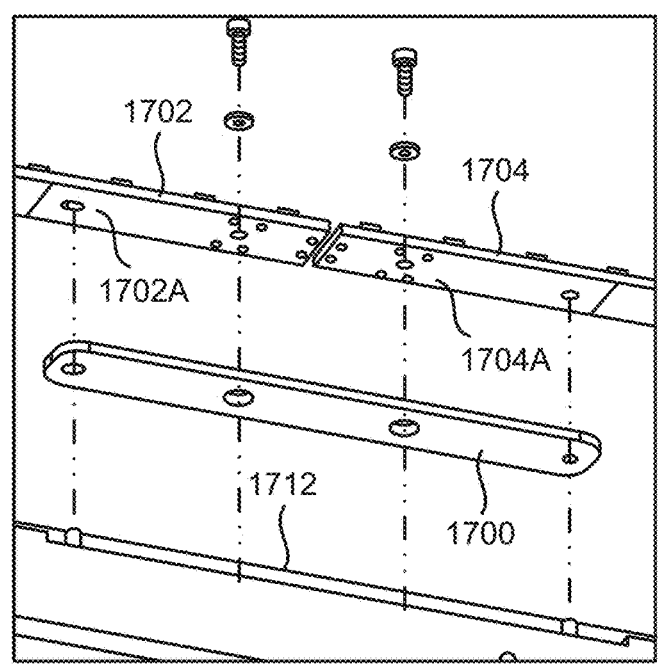

FIGS. 17A-17B show exploded views relating to an implementation of an interconnect 1700 for circuit boards. The interconnect 1700 can be used with one or more of the circuit boards described herein. The interconnect 1700 can be used with a circuit board 1702 and a circuit board 1704. The interconnect 1700 can provide electrical coupling between the circuit board 1702 and a circuit board 1704. In some implementations, the interconnect 1700 can electrically couple the circuit board 1702 and the circuit board 1704 at a side 1702A of the circuit board 1702 and a side 1704A of the circuit board 1704. For example, use of the interconnect 1700 can facilitate a greater density of light sources at the circuit boards 1702 and 1704. The interconnect 1700 can include interconnect targets 1706 made from metal or another conductive material. The interconnect targets 1706 facilitate electrical contact between components of the circuit board 1702 or 1704, or another component. The circuit board 1702 and 1704 include pins 1708 that are configured to contact respective ones of the interconnect targets 1706. In some implementations, the pins 1708 include pogo pins. For example, a distal end of the pin 1708 can extend at an opposite side of the circuit board and be compressed when the circuit board and the interconnect 1700 are brought into contact. The circuit boards 1702 and 1704 include electronic components 1710, including, but not limited to, LEDs, whose functionality is facilitated by the electrical contact provided by the interconnect 1700. In some implementations, at least one of the electronic components 1710 (e.g., LEDs) can be mounted to a side 1702B of the circuit board 1702 and at least another one of the electronic components 1710 can be mounted to a side 1704B of the circuit board 1704, the side 1702B of the circuit board 1702 and the side 1704B are opposite to the side 1702A of the circuit board 1702 and a side 1704A of the circuit board 1704. Fasteners 1711 can be used for attaching the circuit boards 1702 and 1704, and the interconnect 1700, to a frame 1712. The interconnect 1700 can facilitate a more efficient use of horizontal space. For example, space that would otherwise be taken up by the size of a pin and socket style circuit board connector can instead be made available as space for the light sources on the circuit board.

Figure 18:
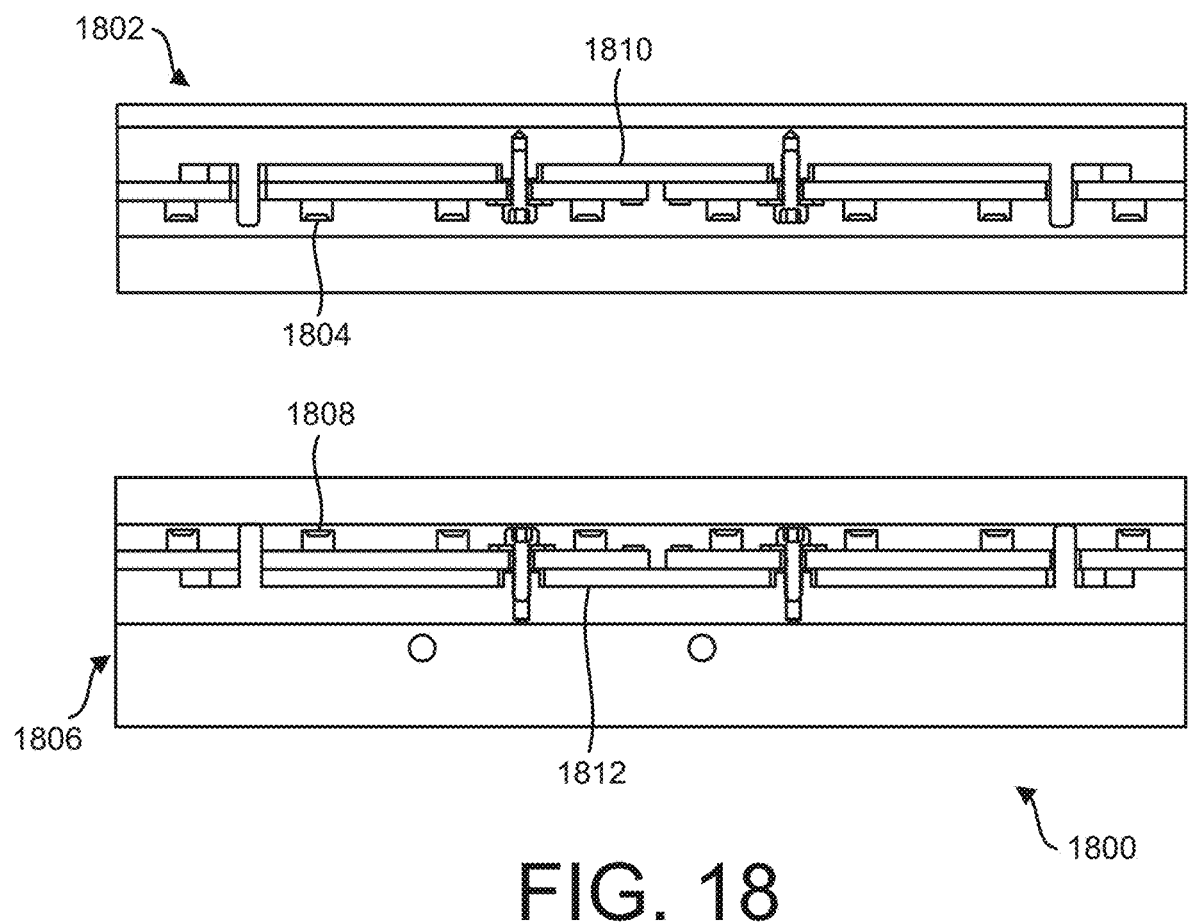
FIG. 18 shows a cross-section view of an implementation of a closure.

FIG. 18 shows a cross-section view of an implementation of a closure 1800. The closure 1800 can be used together with the system 100 and/or one or more components of the closures and apparatuses described herein, such as closure 400 of FIG. 4, closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. A portion 1802 can be associated with a first set of LEDs 1804, and a portion 1806 can be associated with a second set of LEDs 1808. For example, the portion 1802 can be configured for placing the set of LEDs 1804 at a first edge of a lightguide, and the portion 1806 can be configured for placing the set of LEDs 1808 at a second edge of the lightguide opposite the first edge. An interconnect 1810 serves to electrically connect two circuit boards with each other at the portion 1802. An interconnect 1812 serves to electrically connect to circuit boards with each other at the portion 1806. In some implementations, such as the closure 400 in FIG. 4 (e.g., a U-shape), the use of interconnects between board segments can provide various advantages such as, but not limited to, a reduced vertical profile and/or cost savings.

Figure 19:
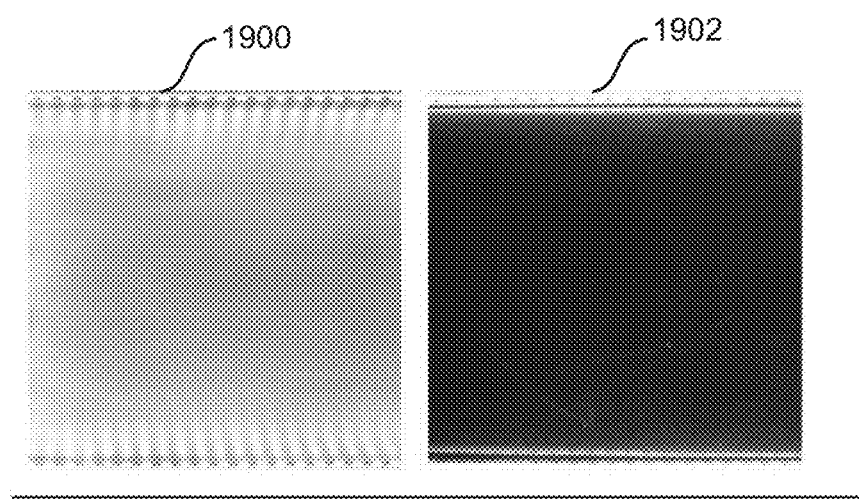
FIG. 19 shows implementations relating to light uniformity.

FIG. 19 shows implementations relating to light uniformity. The following general example relates to light transmission in a first material $n_i$ having a boundary with a second material $n_f$. A lightguide will totally internally reflect any incident light rays that do not violate a critical angle at a boundary between the two materials. Light rays that violate the critical angle will be partially reflected and partially refracted based on the refractive indices of the two materials. A light ray incident from a point having an angle $\phi_i$ with a normal of the boundary, less than the critical angle, will emerge refracted into the material $n_f$ with an angle $\phi_f$. A light ray having an angle $\phi_c$ with a normal of the boundary (i.e., the critical angle) will be refracted along the boundary. A light ray having an angle $\phi_{i'}$ with a normal of the boundary, greater than the critical angle, will be totally internally reflected in the material $n_i$. In some implementations, the material $n_i$ can be a material of the lightguide (e.g., acrylic), and the material $n_f$ can be a material surrounding the lightguide (e.g., air).

The surface of at least one of the materials $n_i$ and $n_f$ can be treated. In some implementations, abrasion can be applied to a surface. For example, abrasion can be performed by way of 1000 grit sanding, 80 grit sanding, or sandblasting with 30 grit media. Other grit levels can be used, including those greater than, smaller than, or in between any of the examples mentioned above. An image 1900 shows an example of sanding with 1000 grit tool. An image 1902 shows an example where no abrasion has been applied. For example, the image 1902 can correspond to a material having a gloss finish at its surface. Abrading a surface of the lightguide can allow incident light rays to be less than the critical angle, thereby allowing some of the light rays to refract and exit the lightguide to become visible to an operator.

Figure 20:
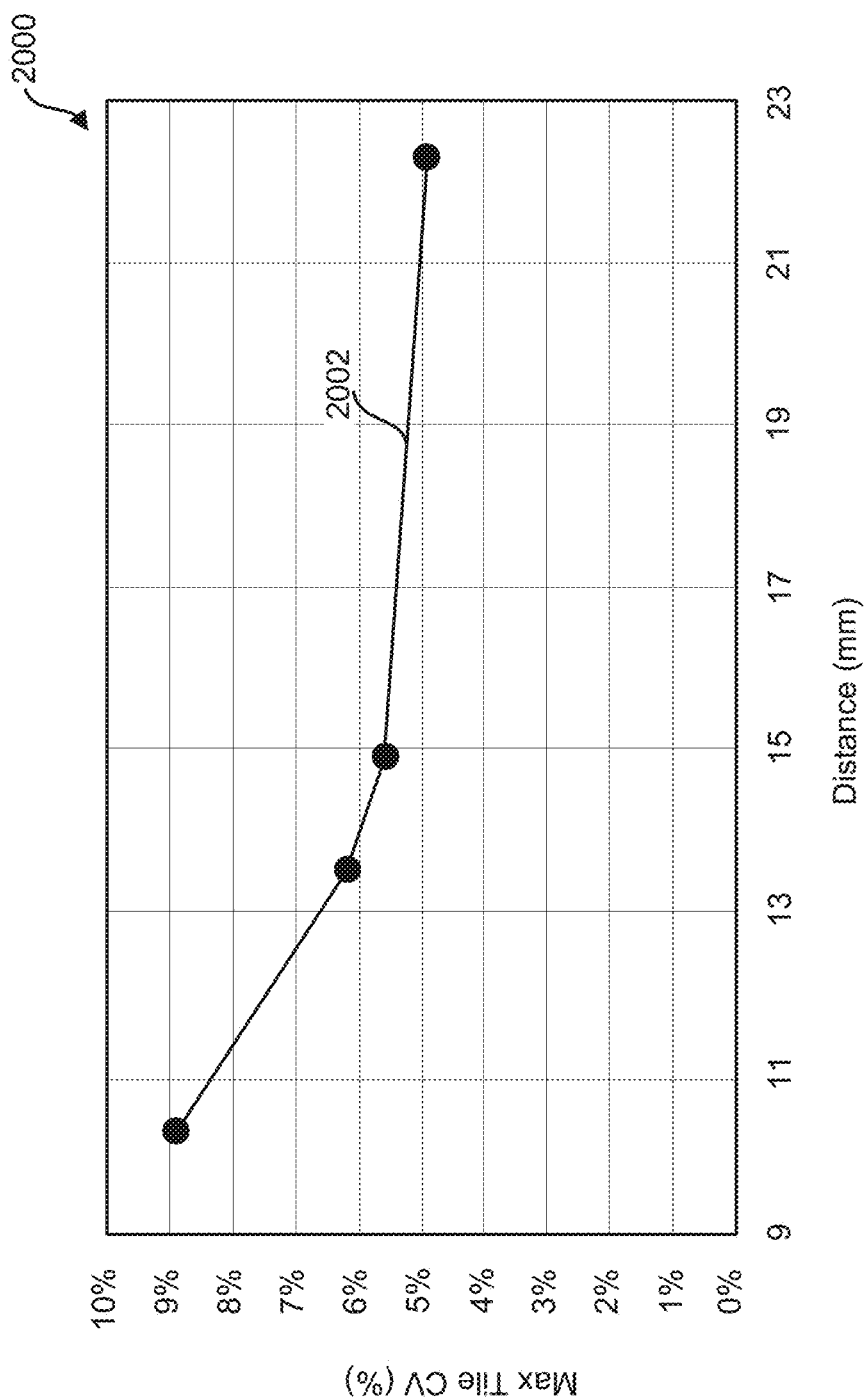
FIG. 20 shows an example relating to light uniformity.

FIG. 20 shows an example relating to light uniformity. Here, a graph 2000 relates to a separation between a lightguide and a diffuser (e.g., a distance from a light extraction surface to the visible surface of a diffuser). For example, the light extraction surface can be one of the primary surfaces of a lightguide. The light uniformity is indicated against the vertical axis (e.g., in terms of CV of the luminance of the light) where a higher value corresponds to worse (e.g., less) uniformity. The distance is indicated against the horizontal axis (e.g., in millimeters (mm)). A graph 2002 is presented. For example, the graph 2002 can be based on four data points corresponding to different distances of a diffuser relative to a primary surface of a lightguide and corresponding uniformity values. The data points represent the maximum CV of the luminance among tiles defined at the illumination surface. It can be seen that uniformity generally worsens (i.e., CV increases) with smaller distances of a diffuser relative to a primary surface of a lightguide. Similarly, uniformity generally improves (i.e., CV decreases) with greater distances of a diffuser relative to a primary surface of a lightguide.

In some implementations, the distance from the light extraction surface to the visible surface of a diffuser can be selected toward a rightmost portion of the graph 2002. For example, the distance can be selected so that the CV is less than about 9%, such as less than about 7% or less than about 6%. As another example, the separation can be greater than about 10 mm. As another example, the separation can be less than about 23 mm.

FIGS. 21A-21C show cross-section views of implementations of closures 2100, 2140, and 2180. The closures 2100, 2140, and 2180 can be used with the system 100 and/or one or more components of the closures and apparatuses described herein, such as closure 400 of FIG. 4, closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2500 of FIG. 25, closure 2600 of FIGS. 26A-26E, lift assembly 2800, closure 2900 of FIG. 29, or closure 3000 of FIG. 30. The closure 2100 includes an LED 2102, a lightguide 2104, a diffuser 2106, and a rear frame 2108. The diffuser 2106 is positioned proximate to a primary surface of the lightguide 2104. The LED 2102 will generate light that enters the lightguide 2104, and light extracted from the lightguide 2104 will enter the diffuser 2106 and thereafter be visible to a user. A light ray 2110 is an example of light from the LED 2102 that exits the lightguide 2104 without reflection and thereafter enters the diffuser 2106. A light ray 2112 is an example of light from the LED 2102 that is reflected against the rear surface of the lightguide 2104 (i.e., the surface farther from the diffuser 2106) and thereafter enters the diffuser 2106. The shown light rays, including, but not limited to, the light rays 2110 and 2112, are only illustrative examples and other light rays generated by the LED 2102 are not shown. A light ray that is partially refracted and partially reflected may be illustrated as only being refracted, or as only being reflected, for simplicity. For example, FIG. 21A does not depict secondary reflections. For example, light rays refracted across a material boundary would normally have a change in angle when crossing that boundary; light rays in this FIG. 21A, on the other hand, are shown as maintaining their vector when crossing a material boundary for simplicity of conveying the principle.

The closure 2100 is an example where both the interior and exterior primary surfaces of the lightguide 2104 are provided with surface treatment (e.g., are abraded). Also, the closure 2100 has a relatively short separation between the diffuser 2106 and the lightguide 2104. The closure 2100 may be associated with relatively low light uniformity and a high CV value. For example, when the exterior primary surface of the lightguide 2104 is abraded, this can cause relatively more of the high intensity light near the LED 2102 to be extracted from the lightguide 2104, and pass through the diffuser 2106 right away, without further internal reflections.

The closure 2140 includes an LED 2142, a lightguide 2144, a diffuser 2146, and a rear frame 2148. The diffuser 2146 is positioned proximate to a primary surface of the lightguide 2144. The LED 2142 will generate light that enters the lightguide 2144, and light extracted from the lightguide 2144 will enter the diffuser 2146 and thereafter be visible to a user. A light ray 2150 is an example of light from the LED 2142 that exits the lightguide 2144 without reflection and may create a hot spot at the diffuser 2146 unless blocked by the frame of the closure 2140. A light ray 2152 is an example of light from the LED 2142 that is reflected against the front surface of the lightguide 2144 (i.e., the surface closer to the diffuser 2146), may undergo one or more additional internal reflections, and may eventually exit the lightguide 2144 at another location (not shown) and enter the diffuser 2146. A light ray 2154 is an example of light from the LED 2142 that is reflected against the rear surface of the lightguide 2144 (i.e., the surface farther from the diffuser 2146) and thereafter enters the diffuser 2146. The shown light rays, including, but not limited to, the light rays 2150, 2152, and 2154, are only illustrative examples and other light rays generated by the LED 2142 are not shown. A light ray that is partially refracted and partially reflected may be illustrated as only being refracted, or as only being reflected, for simplicity. For example, FIG. 21B does not depict secondary reflections. For example, light rays refracted across a material boundary would normally have a change in angle when crossing that boundary; light rays in this FIG. 21B, on the other hand, are shown as maintaining their vector when crossing a material boundary for simplicity of conveying the principle.

The closure 2140 is an example where only the interior primary surface of the lightguide 2144 facing the rear frame 2148 is provided with surface treatment (e.g., is abraded). For example, the opposite primary surface of the lightguide 2144 facing the diffuser 2146 can have a glossy finish. Also, the closure 2140 has a relatively short separation between the diffuser 2146 and the lightguide 2144. The closure 2140 may be associated with greater light uniformity than the closure 2100. For example, when the exterior primary surface of the lightguide 2144 is not abraded, this can cause relatively more of the high intensity light near the LED 2142 to be reflected back toward the interior of the lightguide 2144. As such, the high intensity light originating at the LED 2142 can undergo further reflections within the lightguide 2144 before passing through the diffuser 2146 and being visible to a user, thereby resulting in less hot spots.

The closure 2180 includes an LED 2182, a lightguide 2184, a diffuser 2186, and a rear frame 2188. The diffuser 2186 is positioned proximate to a primary surface of the lightguide 2184. The LED 2182 will generate light that enters the lightguide 2184, and light extracted from the lightguide 2184 will enter the diffuser 2186 and thereafter be visible to a user. A light ray 2190 is an example of light from the LED 2182 that exits the lightguide 2184 without reflection and may have created a hot spot at the diffuser 2186 unless being blocked by the frame of the closure 2180. A light ray 2192 is an example of light from the LED 2182 that is reflected against the front surface of the lightguide 2184 (i.e., the surface closer to the diffuser 2186), may undergo one or more additional internal reflections, and may eventually exit the lightguide 2184 at another location (not shown) and enter the diffuser 2186. A light ray 2194 is an example of light from the LED 2182 that is reflected against the rear surface of the lightguide 2184 (i.e., the surface farther from the diffuser 2186) and thereafter enters the diffuser 2186. The shown light rays, including, but not limited to, the light rays 2190, 2192, and 2194, are only illustrative examples and other light rays generated by the LED 2182 are not shown. A light ray that is partially refracted and partially reflected may be illustrated as only being refracted, or as only being reflected, for simplicity. For example, FIG. 21C does not depict secondary reflections. For example, light rays refracted across a material boundary would normally have a change in angle when crossing that boundary; light rays in this FIG. 21C, on the other hand, are shown as maintaining their vector when crossing a material boundary for simplicity of conveying the principle.

The closure 2180 is an example where only the interior primary surface of the lightguide 2184 is provided with surface treatment (e.g., is abraded), and additional spacing is provided between the lightguide 2184 and the diffuser 2186 compared to the closures 2100 and 2140. For example, the opposite primary surface of the lightguide 2184 can have a glossy finish. The closure 2180 may be associated with greater light uniformity than the closures 2100 and 2140. For example, this can give the light even more space to spread, and thereby increase its uniformity, before passing through the diffuser 2186 and being visible to a user.

Figure 22A:
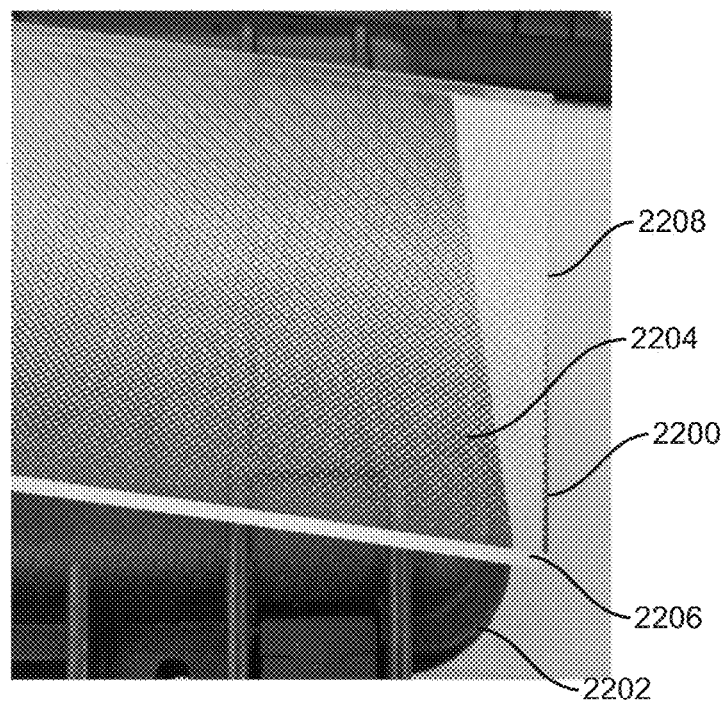
FIGS. 22A-22B show implementations of lightguides.
Figure 22B:
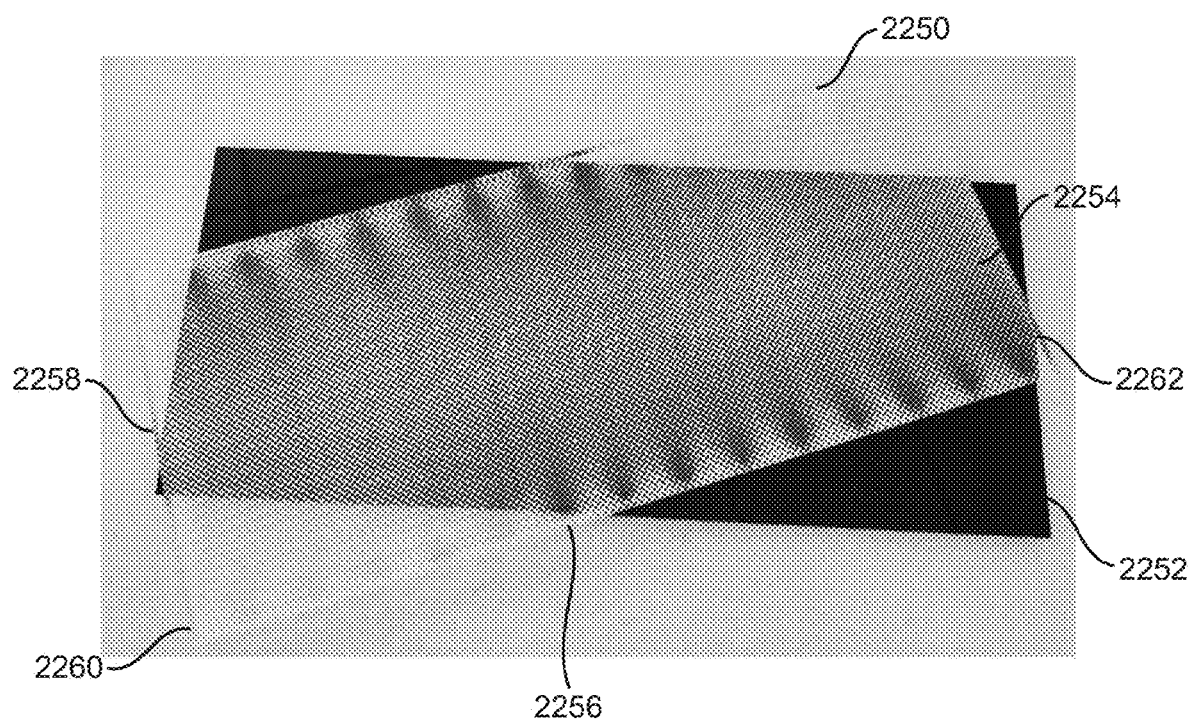

FIGS. 22A-22B show implementations of lightguides 2200 and 2250. The lightguides 2200 and 2250 can be used with the system 100 and/or one or more components of the closures and apparatuses described herein, such as closure 400 of FIG. 4, closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, lift assembly 2800, closure 2900 of FIG. 29, or closure 3000 of FIG. 30. The lightguide 2200 is an at least substantially rectangular substrate that is here shown against a darker background material 2202 for purpose of illustration, though the lightguide 2200 can be any other geometrical configuration, such as a U-shaped lightguide of closure 400 of FIG. 4. The lightguide 2200 can include a substrate that is optically transparent (e.g., a waveguide) and that has a pattern 2204 applied to at least one primary surface thereof. The pattern 2204 can include light-extracting features at one or more surfaces of the lightguide 2200 (e.g., a primary surface thereof). In some implementations, the default finish of the lightguide 2200 can be a gloss surface that contains (i.e., internally reflects) light within the lightguide 2200. The pattern 2204 can be generated by forming one or more types of light-extracting features at a surface of the lightguide 2200. In some implementations, the pattern 2204 can form dots at the surface that extract light. For example, each dot can be a laser etched feature that allows a greater range of incident angle rays to violate the critical angle of the material and exit the lightguide 2200. Each dot can have any of multiple different shapes, including, but not limited to, a circular shape, a square shape, a rectangular shape, an ovular shape, etc. Each dot can have the same or a different size as another dot. In some implementations, a gradient of dot shapes and/or sizes may be used in one or both of the vertical or horizontal axis. The pattern 2204 can be applied using any of multiple techniques. In some implementations, the pattern 2204 is abraded at the primary surface of the lightguide 2200. For example, the pattern 2204 can be etched (e.g., laser etched) at the surface of the lightguide 2200. In some implementations, the pattern 2204 can also or instead include light-blocking dots or other features that serve to block extracted light. For example, light-blocking features of the pattern 2204 can be printed (e.g., by screen printing or inkjet printing) at the surface of the lightguide 2200. As another example, light-blocking features of the pattern 2204 can be part of a film applied to the surface of the lightguide 2200, the film including regions of lower transparency interspersed with regions of higher transparency.

The pattern 2204 in the implementation shown has a gradient in the density of the pattern features. The density gradient can be implemented by way of assigning different sizes to the dots or by increasing a number of dots per unit area of a surface of the lightguide 2200. In some implementations, the pattern gradient (e.g., a gradient of dot size) is such that relatively more light is extracted through the lightguide 2200 far from the light sources (e.g., toward a center of the lightguide 2200) than near the light sources (e.g., at the longest edges of the lightguide 2200). For example, at an edge 2206 of the lightguide 2200 the pattern 2204 can have a relatively low density of dots, and at a middle region 2208 of the lightguide 2200 the pattern 2204 can have a relatively high density of dots. This can provide advantages in light uniformity. For example, in a direction perpendicular to a strip of light sources (e.g., a direction from the edge 2206 toward the middle region 2208) the pattern 2204 can seek to extract relatively more light further away from the light sources, where the light has traveled a predetermined distance from the light sources and has become more uniform based on the density and/or sizing of the dots of the pattern. As another example, in a direction parallel to the strip of light sources (e.g., a direction along the edge 2206) the light extraction is consistently relatively low, reducing any negative influence on light uniformity by strong light sources by reducing the amount of light extracted based on the density and/or sizing of the dots. As light comes into contact with these light extracting dots in the pattern 2204, it will exit the lightguide, thereby decreasing the total available light inside the guide as the light approaches the center of the lightguide 2200. The implementation shown in FIG. 22A depicts one side of a lightguide for explanatory purposes. In some implementations, the gradient can be mirrored vertically for a lightguide having light sources at a top and bottom such that the middle region 2208 is substantially near a vertical axis center of the lightguide. Increasing the density of dots near the center of the lightguide 2200 can serve to extract a higher percentage of the light present in the lightguide, so even though the total amount of light in the lightguide has decreased toward the center of the lightguide 2200, the extracted light intensity may be substantially uniform between edge 2206 and middle region 2208.

The lightguide 2250 is an at least substantially rectangular substrate that is here shown against a darker background material 2252 for purpose of illustration, though the lightguide 2250 can be any other geometrical configuration, such as a U-shaped lightguide of closure 400 of FIG. 4. The lightguide 2250 can include a substrate that is optically transparent (e.g., a waveguide) and that has a pattern 2254 applied to at least one primary surface thereof. The pattern 2254 can include light-extracting features at one or more surfaces of the lightguide 2250 (e.g., a primary surface thereof). In some implementations, the default finish of the lightguide 2250 can be a gloss surface that contains (i.e., internally reflects) light within the lightguide 2250. The pattern 2254 can be generated by forming one or more types of light-extracting feature at a surface of the lightguide 2250. In some implementations, the pattern 2254 can form dots at the surface that extract light. For example, each dot can be a laser etched feature that allows a greater range of incident angle rays to violate the critical angle of the material and exit the lightguide 2250. Each dot can have any of multiple different shapes, including, but not limited to, a circular shape, a square shape, a rectangular shape, an ovular shape, etc. Each dot can have the same or a different size as another dot. In some implementations, a gradient of dot shapes and/or sizes may be used in one or both of the vertical or horizontal axis. The pattern 2254 can be applied using any of multiple techniques. In some implementations, the pattern 2254 is abraded at the primary surface of the lightguide 2250. For example, the pattern 2254 can be etched (e.g., laser etched) at the surface of the lightguide 2250. In some implementations, the pattern 2254 can also or instead include light-blocking dots or other features that serve to block extracted light. For example, light-blocking features of the pattern 2254 can be printed (e.g., by screen printing or inkjet printing) at the surface of the lightguide 2250. As another example, light-blocking features of the pattern 2254 can be part of a film applied to the surface of the lightguide 2250, the film including regions of lower transparency interspersed with regions of higher transparency.

The pattern 2254 in the implementation shown has multiple gradients in the density of the pattern features. One or more density gradient can be implemented by way of assigning different sizes to the dots or by increasing a number of dots per unit area of a surface of the lightguide 2250. In some implementations, a pattern gradient can be applied such that relatively more light is extracted through the lightguide 2250 far from the light sources (e.g., toward a center of the lightguide 2250) than near the light sources (e.g., at the longest edges of the lightguide 2250). A first pattern gradient (e.g., a gradient of dot size) can extend between an edge 2256 of the lightguide 2250 and a middle region 2258 of the lightguide 2200. A second pattern gradient (e.g., a gradient of dot size) can extend between an edge 2260 of the lightguide 2250 and an edge 2262 of the lightguide 2250 that is opposite the edge 2260. One or more of the gradients can provide advantages in light uniformity. For example, in a direction perpendicular to a strip of light sources (e.g., a direction from the edge 2256 toward the middle region 2258) the pattern 2254 can seek to extract relatively more light further away from the light sources, where the light has traveled a predetermined distance from the light sources and has become more uniform based on the density and/or sizing of the dots of the pattern. As another example, in a direction parallel to the strip of light sources (e.g., a direction along the edge 2256) the light extraction can provide decreased dot density at the location of each light source, thereby seeking to reduce any negative influence on light uniformity by strong light sources by reducing the amount of light extracted based on the density and/or sizing of the dots.

Figures 23A, 23B:
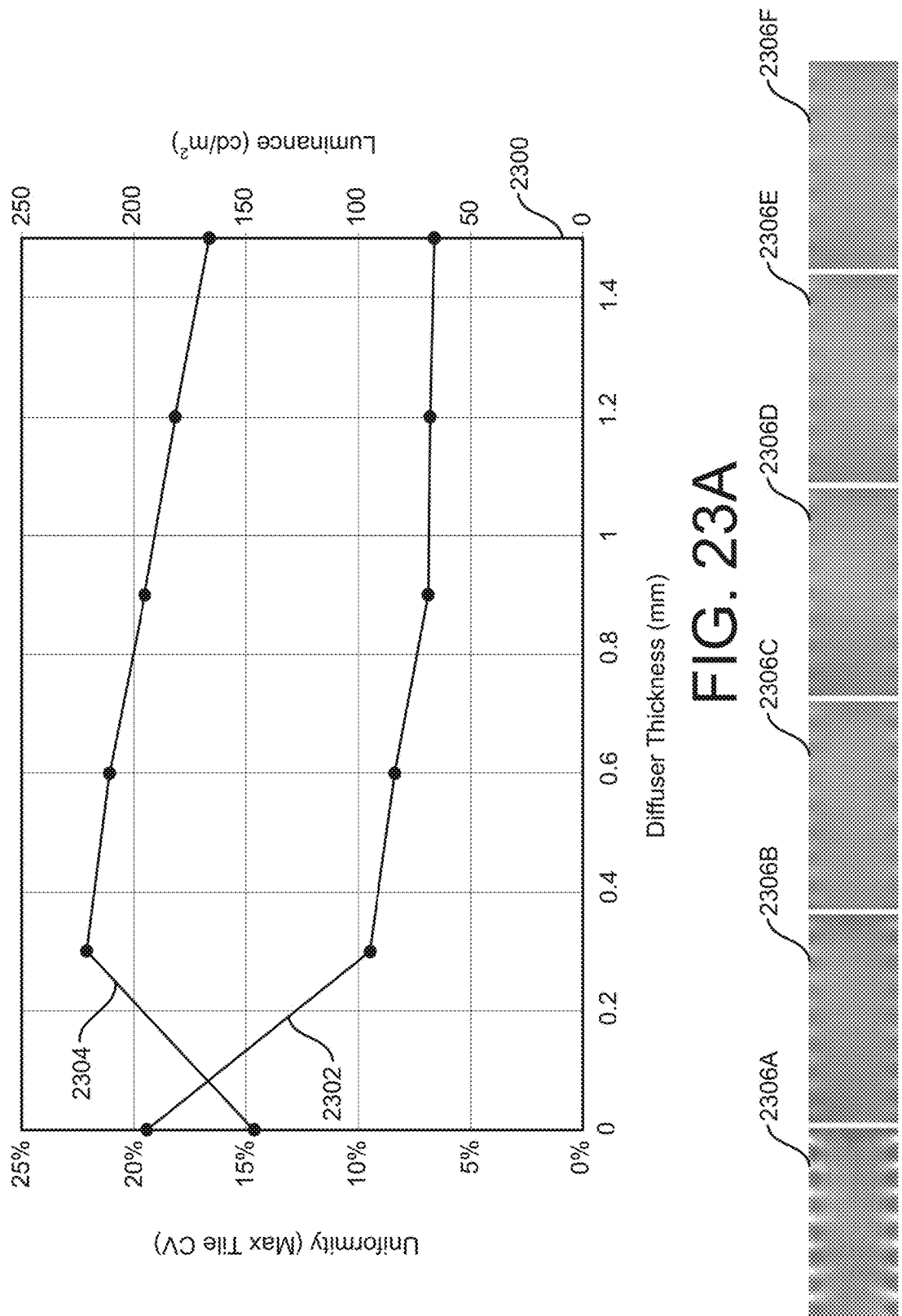
FIGS. 23A-23B show implementations relating to light uniformity.

FIGS. 23A-23B show implementations relating to light uniformity. A graph 2300 relates to light uniformity and luminance, each as a function of diffuser thickness. The light uniformity is indicated against the left vertical axis (e.g., in terms of CV) where a higher value corresponds to worse (e.g., less) uniformity. The luminance is indicated against the right vertical axis (e.g., in units of candela per square meter ($cd/m^2$)) where a higher value corresponds to greater luminance. For example, the luminance can be measured at a center of the illumination surface intended to be viewed by a user. The diffuser thickness is indicated against the horizontal axis (e.g., in millimeters (mm)).

A graph 2302 of light uniformity and a graph 2304 of luminance are presented.

For example, each of the graph 2302 and the graph 2304 can be based on six different diffuser thicknesses. It can be seen that uniformity generally improves (i.e., CV decreases) with greater diffuser thickness. The data points of the graphs 2302 and 2304, from left to right, are based on images 2306A-2306F, respectively, from left to right. For example, it is seen that the image 2306A has the lowest uniformity, and that the image 2306F has the highest uniformity, of the images 2306A-2306F.

In terms of the impact that a diffuser has on light uniformity and luminance, some of the light that contacts an interior face of a diffuser is reflected back towards a lightguide. After reflections and refraction in the lightguide, the light will eventually exit the diffuser somewhere else than where the original ray struck, thereby spreading the light around. Pigments in a diffuser can scatter light so that light that enters the diffuser will not only be refracted upon entry, but will also be redirected multiple times within the diffuser, which aids in spreading the light. The diffuser can increase the luminance away from the light sources, because light that would otherwise escape the lightguide near the light source (e.g., as a hot spot near an LED) is instead reflected and refracted within the system. Eventually, more of those rays of light find their way to regions relatively farther from the light sources (e.g., a center of the lightguide) than would occur without a diffuser. This can, in some cases, lead to an increase in luminance in an area such as the center of the visible surface when a diffuser is present versus when no diffuser is present. The diffuser material can have any opacity and/or transmittance. In some implementations, a light transmittance of about 35% to about 45% can be used. For example, the transmittance can be about 38%. As more opaque diffusers are used, the proportional uniformity gains can decline as compared to the losses of luminance.

In some implementations, diffuser thickness can be selected toward a rightmost portion of the graph 2302 and/or 2304. For example, the diffuser thickness can be selected so that the CV is less than about 12%, such as less than about 10% or less than about 7%. As another example, the diffuser thickness can be selected so that light visible at the diffuser has a luminance greater than about 150 millicandela or greater than about 160 millicandela.

Figure 24A:
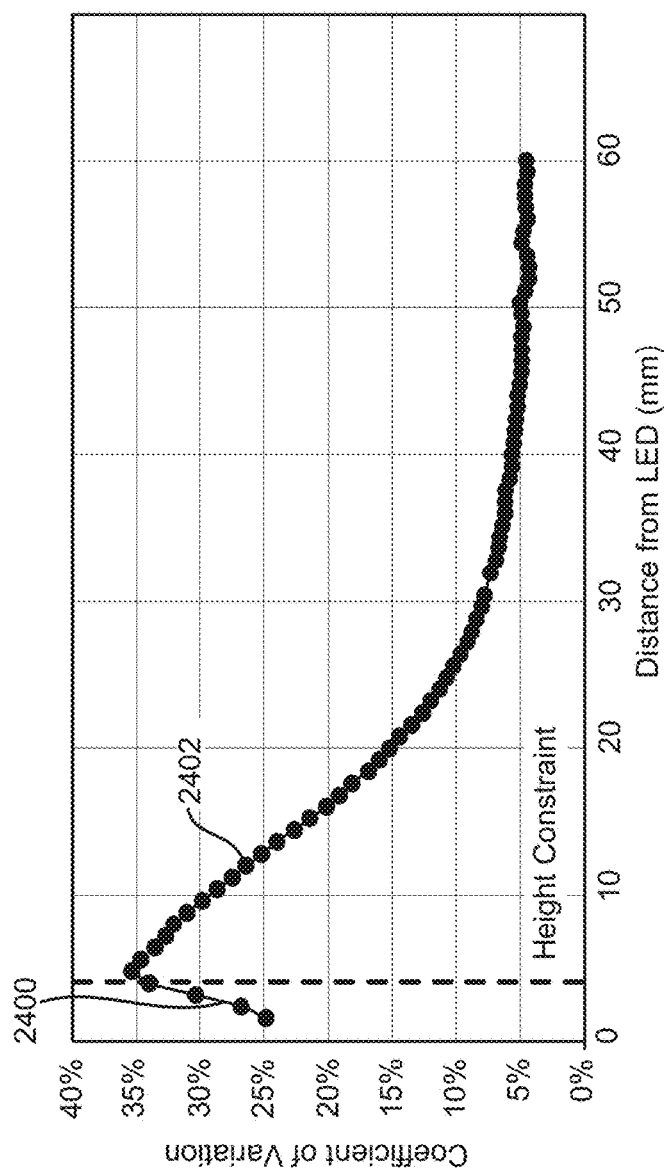
FIGS. 24A-24B show implementations relating to light uniformity.
Figure 24B:
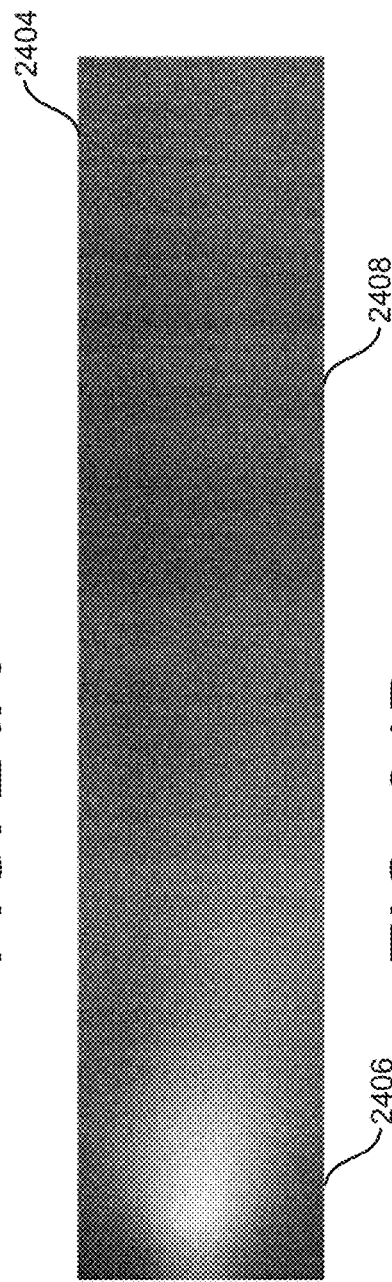

FIGS. 24A-24B show implementations relating to light uniformity. FIG. 25 shows a cross-section view of an implementation of a closure 2500. The closure 2500 can be used with the system 100 and/or one or more components of the closures and apparatuses described herein, such as closure 400 of FIG. 4, closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2600 of FIGS. 26A-26E, lift assembly 2800, closure 2900 of FIG. 29, or closure 3000 of FIG. 30 A graph 2400 relates to light uniformity as a function of a distance 2502 (e.g., a shortest vertical distance) in the closure 2500 between an LED 2504 and a trim edge 2506. The trim edge 2506 may be made of a non-transparent material (e.g., metal or plastic) and can therefore define the visible area of a diffuser 2508 of the closure 2500. The closure 2500 can include a lightguide 2510. The diffuser 2508 is positioned proximate to a primary surface of the lightguide 2510. Referring back to FIG. 24A, the light uniformity is indicated against the vertical axis (e.g., in terms of CV) where a higher value corresponds to worse (e.g., less) uniformity. A vertical distance from the LED along a diffuser is indicated against the horizontal axis in millimeters. The graph 2400 can be based on multiple data points 2402, each associated with a corresponding CV. The data points 2402 can be based on an image 2404 of a surface of a diffuser associated with a position of a single LED. For example, it is seen that a region 2406 of the image 2404 has the lowest uniformity as a defined hot spot and defined dark spots are shown proximate to the LED, and that a region 2408 of the image 2404 has the highest uniformity as the defined hot spot and dark spots dissipate and blend together as the distance from the LED increases. The CV can be calculated based on the luminance of each point along the vertical direction of FIG. 24B at any given distance from the LED (e.g., the direction between 2406 and 2408).

In some implementations, the image 2404 can be analyzed using a tile that is defined to have a height (i.e., the size perpendicular to stepping direction) equal to the vertical dimension of the image 2404. In some implementations, the tile can have a width (i.e., the size parallel to the stepping direction) that is a predefined number of pixels. For example, the tile can have a width of five pixels. The tile can be stepped across at least part of the image 2404 with overlap, or without overlap. In the graph 2400, the vertical axis corresponds to CV for the respective tiles stepped across the image 2404. In some implementations, when the tile stepping is performed in a direction parallel to the direction of light emission, CV may be a better metric for uniformity analysis than another metric. For example, CV may then be a better metric than a metric based on the maximum CV among multiple tiles, such as the one described above with reference to FIGS. 16A-16B.

In terms of the impact of the distance 2502 of the trim edge 2506 on light uniformity, the viewable uniformity can be improved by increasing a vertical length of the trim edge 2506 such that the light spreads out along the viewable surface of the diffuser before becoming visible to the user. In some implementations, the distance 2502 can be constrained due to design specifications. For example, an implementation where the closure 2500 is moveable in the direction of the distance 2502 can cause a constraint motivating a reduction or minimization of the distance 2502.

FIGS. 26A-26E show exploded views of an implementation of a closure 2600. The closure 2600 can be used with the system 100 and/or one or more components of the closures and apparatuses described herein, such as closure 400 of FIG. 4, closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, lift assembly 2800, closure 2900 of FIG. 29, or closure 3000 of FIG. 30. The closure 2600 includes a trim 2602, a frame wall 2604, a lightguide 2606, a diffuser 2608, and a frame 2610. In some implementations, the trim 2602 can be considered a top trim, and the frame 2610 can be considered a bottom frame. In some implementations, the trim 2602 can include a cast element. For example, the trim 2602 can be cast from aluminum or an aluminum alloy. In some implementations, the frame wall 2604 can be formed from sheet metal and punched. For example, the frame wall 2604 can include aluminum or an aluminum alloy. In some implementations, the frame 2610 can include a cast element. For example, the frame 2610 can be cast from aluminum or an aluminum alloy.

Figure 26A:
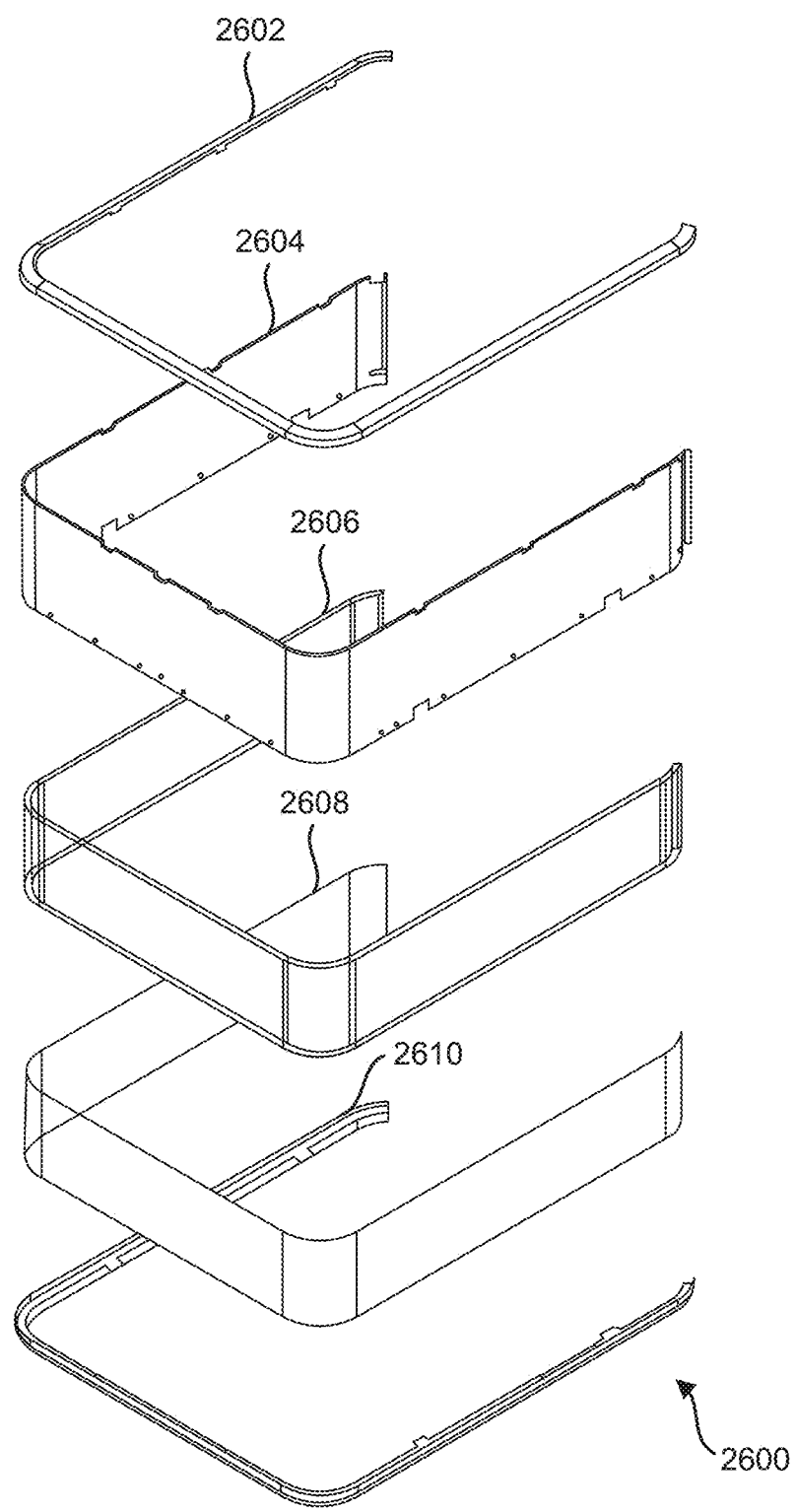
FIGS. 26A-26E show explosion views of an implementation of a closure.
Figure 26B:
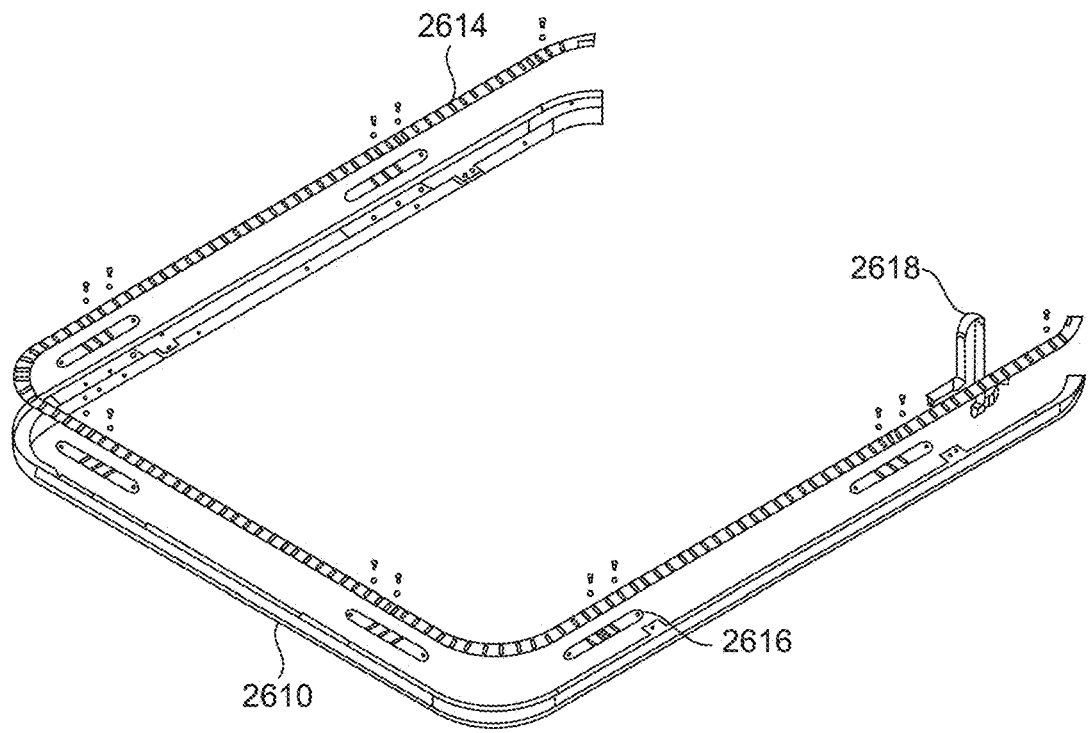
Figure 26C:
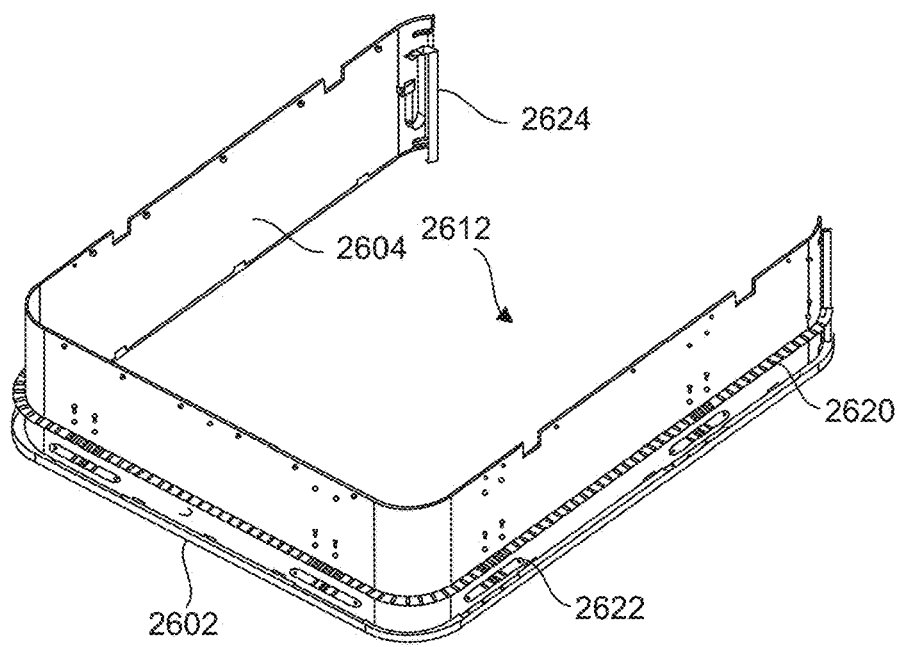
Figure 27:
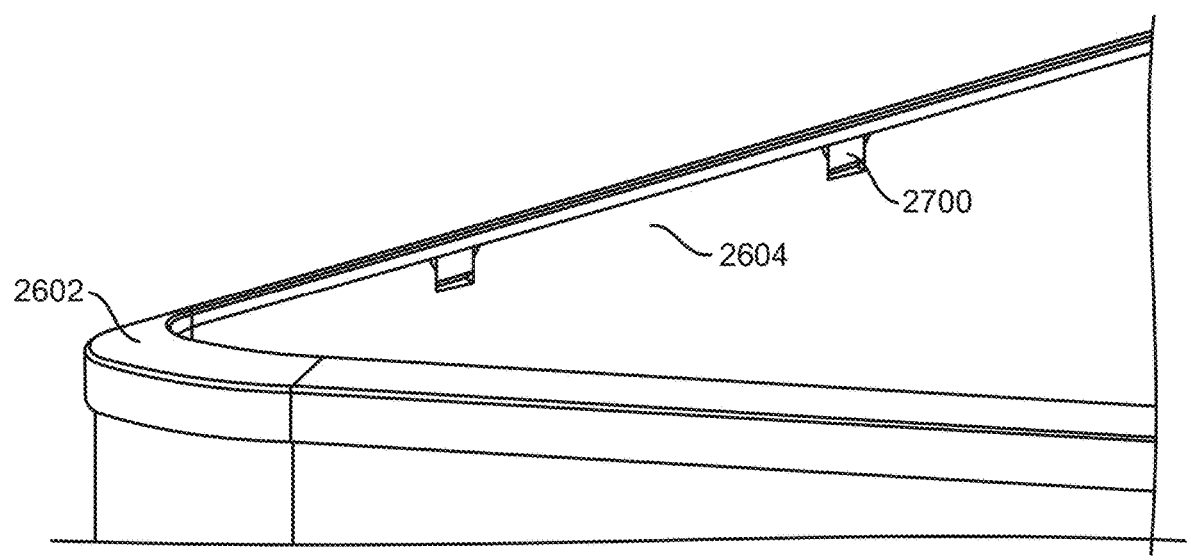
FIG. 27 shows an implementation of a trim of an enclosure.

The trim 2602 and the frame wall 2604 can be attached to each other (e.g., by welding) to form a frame 2612 (shown in another perspective in FIG. 26C). FIG. 27 shows that the trim 2602 can be attached to the frame wall 2604 (e.g., by welding). One or more crenellations 2700 can be provided in the frame wall 2604 to facilitate welding. In some implementations, the crenellations 2700 are periodically spaced from each other. Welding can provide an advantage in implementations where z-height is constrained. For example, welding can reduce or eliminate the use of fasteners between the trim 2602 and the frame wall 2604.

FIG. 26B shows that a circuit board 2614 can be installed to the frame 2610. For example, LEDs can be mounted in a row on one side of the circuit board 2614. In some implementations, the circuit board 2614 can include modular pieces of circuit board that are pairwise joined to each other by interconnects 2616. For example, a straight section of the circuit board 2614 can be joined to a curved section of the circuit board 2614 to form an overall U-shape for the circuit board 2614. A flat flex cable 2618 can be attached to the circuit board 2614. The assembly of circuit boards 2614 and interconnects 2616 can form a single circuit board assembly. In other implementations, the circuit boards 2614 can be a single flex circuit.

FIG. 26C shows that a circuit board 2620 can be installed to the frame 2612. In some implementations, the circuit board 2620 can include modular pieces of circuit board that are pairwise joined to each other by interconnects 2622. For example, a straight section of the circuit board 2620 can be joined to a curved section of the circuit board 2620 to form an overall U-shape for the circuit board 2620. Flat flex cables 2624 can be attached to the circuit board 2620 (e.g., one flat flex cable at each side). The assembly of circuit boards 2620 and interconnects 2622 can form a single circuit board assembly. In other implementations, the circuit boards 2620 can be a single flex circuit. The assembly of the circuit boards 2620, interconnects 2622, frame 2612, and flat flex cable 2624 can be rotated into an inverted orientation, such as shown in FIG. 26D for assembly with other components of the closure 2600.

Figure 26D:
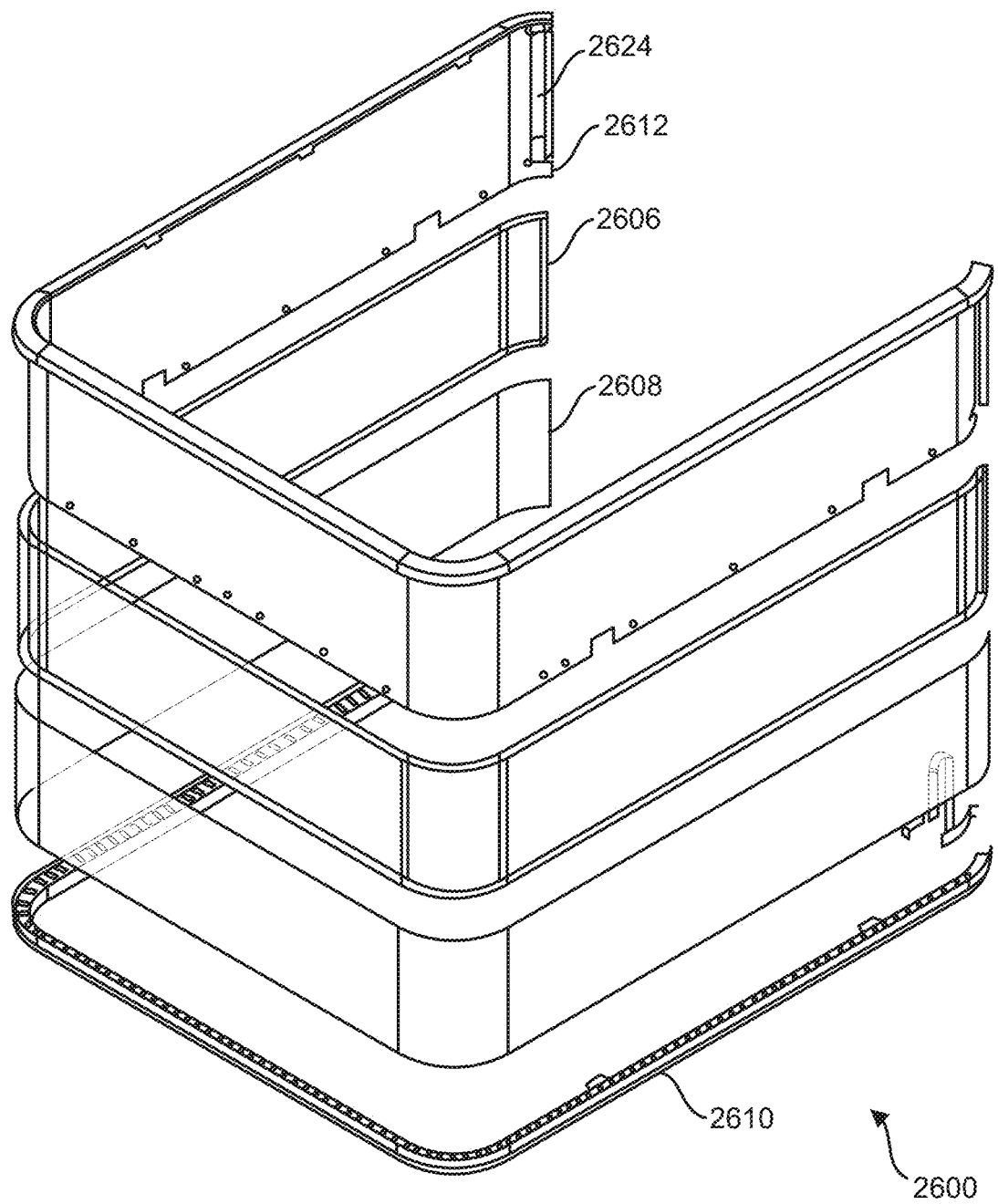

FIG. 26D shows that the frame 2612 (e.g., the combination of the trim 2602 and the frame wall 2604), the lightguide 2606, the diffuser 2608, and the frame 2610 are stacked together. The flex cable 2624 can be electrically connected to the circuit board 2614 (FIG. 26B) and the flex cable 2618 (shown in FIG. 26B) can be electrically connected to the circuit board 2620 such that each flex cable 2618, 2624 can electrically and communicatively couple the circuit boards 2614, 2620, respectively, to a controller or other component for powering and/or controlling the circuit board 2614, 2620.

Figure 26E:
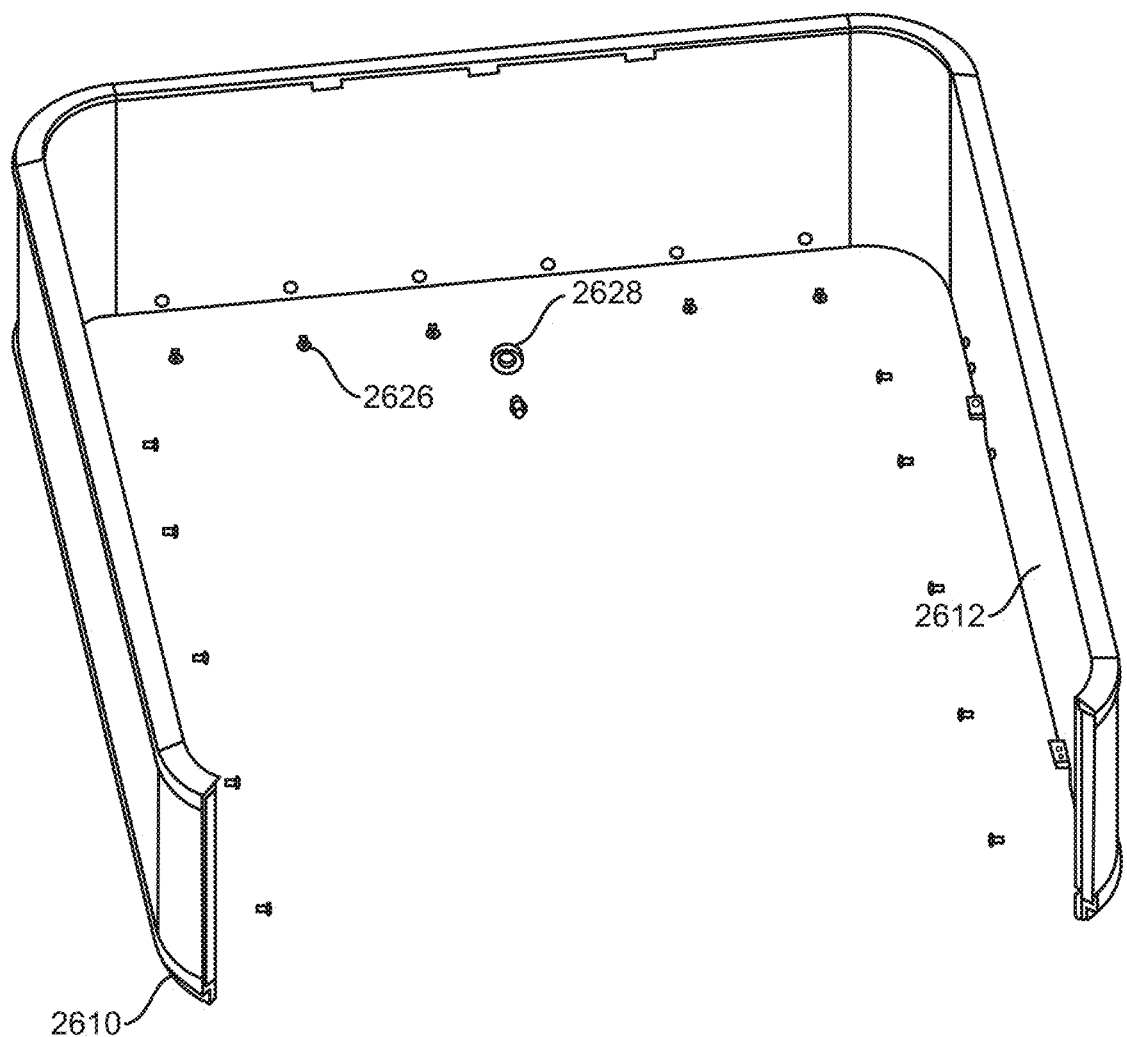

FIG. 26E shows that screws 2626 can be used to attach the frame 2612 to the frame 2610 to form the closure 2600 with the lightguide 2606, the diffuser 2608, circuit boards 2614, 2620 retained together by the frames 2612, 2610. In some implementations, a feature to facilitate movement (e.g., sliding movement) of the closure 2600 can be provided. For example, a roller datum 2628 can be installed at the frame 2612.

The above example of an assembly can provide one or more advantages. In some implementations, the design that allows the screws 2626 to be used at the frame 2610 (e.g., a bottom, or non-visible, frame) can allow the trim 2602 (e.g., a top, or visible, trim) to be at least substantially free of visible fasteners. For example, this can allow the trim 2602 to present a smooth cosmetic surface to a user. The above example of an assembly can be used in forming the closure 400 (FIG. 4) and/or other examples of closures described herein.

Figure 28A:
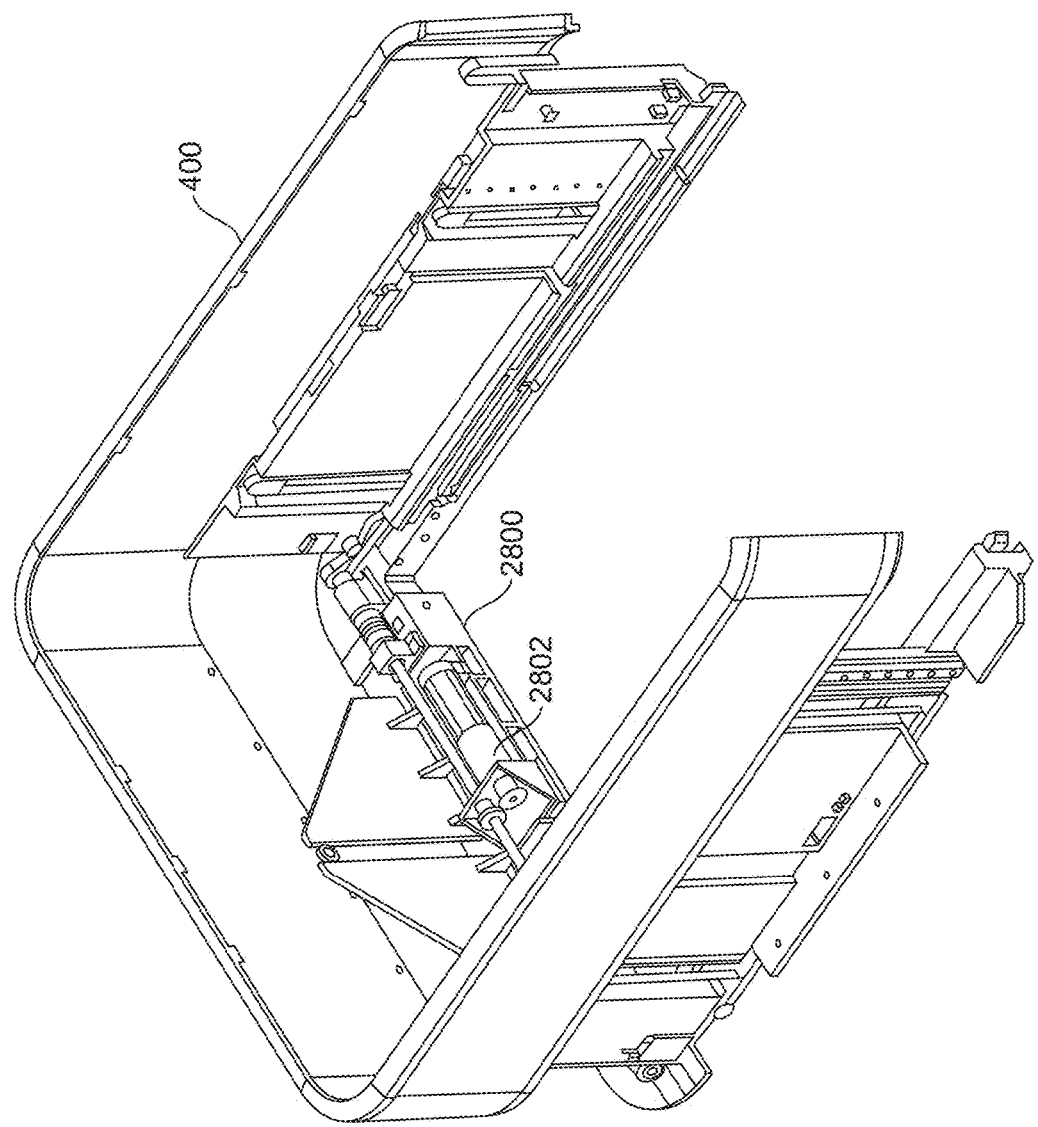
FIGS. 28A-28B show implementations of a lift assembly.
Figure 28B:
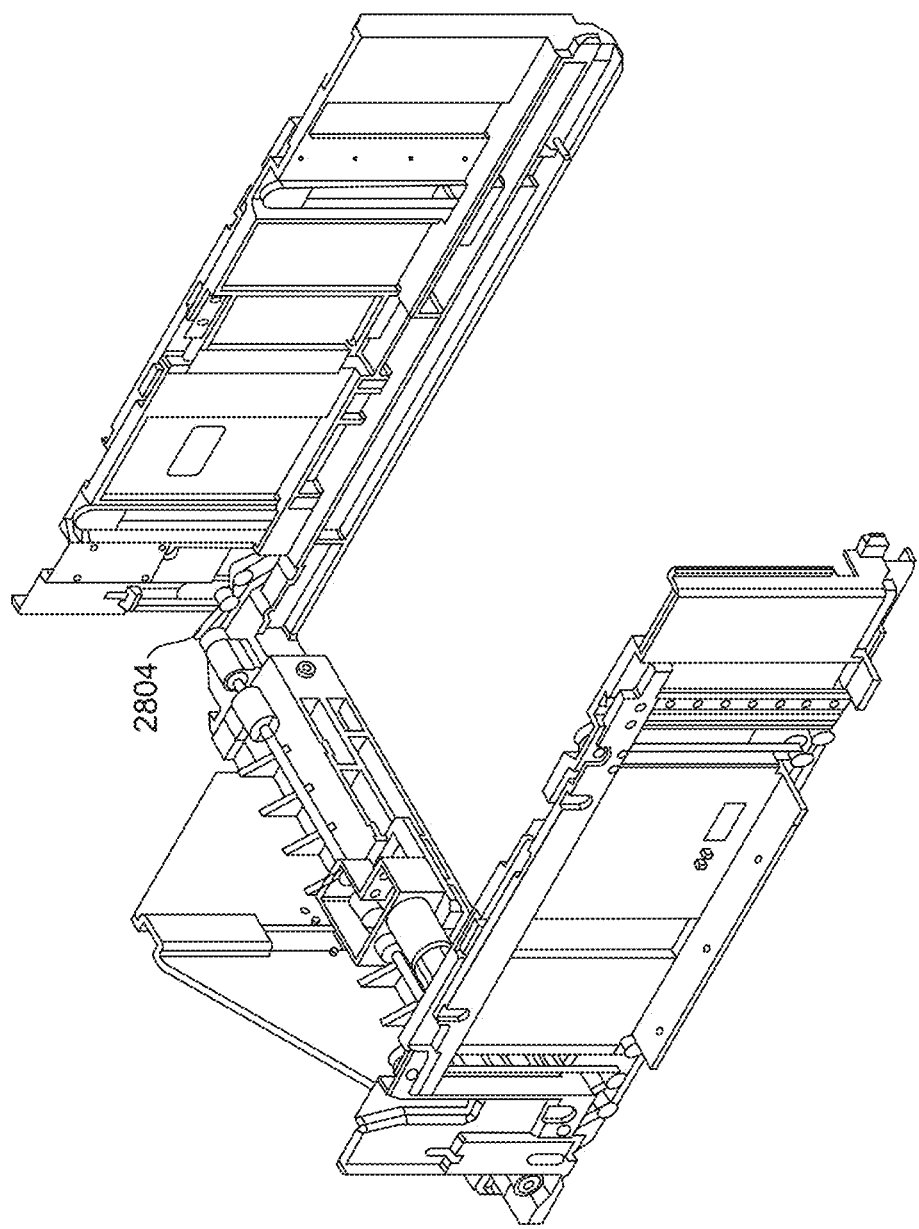

FIGS. 28A-28B show implementation of a lift assembly 2800. Here, the lift assembly 2800 is configured for moving any of the closures, such as closure 400 of FIG. 4 shown as an example, closure 500 of FIGS. 5A-5C, closure 600 of FIG. 6, closure 700 of FIG. 7, apparatus 800 of FIGS. 8A-8B, apparatus 900 of FIGS. 9A-9B, apparatus 1000 of FIGS. 10A-10B, apparatus 1100 of FIGS. 11B-11C, apparatus 1200 of FIG. 12B, apparatus 1300 of FIG. 13, closure 1400 of FIG. 14A, closure 1450 of FIG. 14B, closure 2100 of FIG. 21A, closure 2140 of FIG. 21B, closure 2180 of FIG. 21C, closure 2500 of FIG. 25, closure 2600 of FIGS. 26A-26E, closure 2900 of FIG. 29, or closure 3000 of FIG. 30. For example, the closures can serve as a moveable (e.g., sliding) door of an apparatus (e.g., the system 100 in FIG. 1). The lift assembly 2800 can include a motor assembly 2802 and one or more belts 2804 (shown in FIG. 28B). Shafts, pulleys, and tensioners can be used to facilitate the motor assembly 2802 moving the closure 400 vertically up and/or down responsive to activation of the motor in a first direction or a second direction. That is, if the motor is rotated in the first direction, a gear assembly or other motion transmission assembly can engage and move the one or more belts 2804 in a corresponding first direction such that a lift mount coupled to the one or more belts 2804 translates vertically upward responsive to the rotation of the motor in the first direction. Conversely, if the motor is rotated in the second direction, which is opposite the first direction, the gear assembly or other motion transmission assembly can engage and move the one or more belts 2804 in a corresponding second direction such that the lift mount coupled to the one or more belts 2804 translates vertically downward responsive to the rotation of the motor in the second direction.

FIG. 29 shows an implementation of a closure 2900. The closure 2900 is here shown in cross section and includes a mounting frame 2902 including a portion 2902A and a portion 2902B, a set of LEDs 2904, a set of LEDs 2906, a lightguide 2908, an opening 2910 between the portions 2902A and 2902B of the mounting frame 2902, a circuit board 2912 for the set of LEDs 2904, a circuit board 2914 for the set of LEDs 2906, and a reflector 2916.

The closure 2900 can be used with one or more other examples described elsewhere herein. The components of the closure 2900 can then be similar or identical to corresponding components of other closures described herein. The closure 2900 does not include a diffuser. As such, the closure 2900 illustrates that any or all of the closures described herein can be implemented without a diffuser. For example, the closure 2900 illustrates that the closure 400 in FIG. 4 can be implemented without the diffuser 404. For example, the closure 2900 illustrates that the closure 500 in FIGS. 5A-5C can be implemented without the diffuser 510. For example, the closure 2900 illustrates that the closure 600 in FIG. 6 can be implemented without the diffuser 610. For example, the closure 2900 illustrates that the closure 700 in FIG. 7 can be implemented without the diffuser 706. For example, the closure 2900 illustrates that the closure 1400 in FIG. 14A can be implemented without the diffuser 1406. For example, the closure 2900 illustrates that the closure 1450 in FIG. 14B can be implemented without the diffuser 1464. For example, the closure 2900 illustrates that the closure 2100 in FIG. 21A can be implemented without the diffuser 2106. For example, the closure 2900 illustrates that the closure 2140 in FIG. 21B can be implemented without the diffuser 2146. For example, the closure 2900 illustrates that the closure 2180 in FIG. 21C can be implemented without the diffuser 2186. For example, the closure 2900 illustrates that the closure 2500 in FIG. 25 can be implemented without the diffuser 2508. For example, the closure 2900 illustrates that the closure 2600 in FIGS. 26A-26E can be implemented without the diffuser 2608.

FIG. 30 shows an implementation of a closure 3000. The closure 3000 is here shown in cross section and includes a mounting frame 3002 including a portion 3002A and a portion 3002B, a set of LEDs 3004, a set of LEDs 3006, an opening 3008 between the portions 3002A and 3002B of the mounting frame 3002, a diffuser 3010, a circuit board 3012 for the set of LEDs 3004, a circuit board 3014 for the set of LEDs 3006, and a reflector 3016. The frame 3002 has a gap 3018 between the diffuser 3010 and the reflector 3016.

The closure 3000 can be used with one or more other examples described elsewhere herein. The components of the closure 3000 can then be similar or identical to corresponding components of other closures described herein. The closure 3000 does not include any lightguide. In some implementations, the sets of LEDs 3004 and 3006 can emit light into the gap 3018 of the mounting frame 3002 and illuminate the reflector 3016 which can in turn reflect light toward the diffuser 3010. For example, the gap 3018 can be referred to as an air gap. As such, the closure 3000 illustrates that any or all of the closures described herein can be implemented without a lightguide. For example, the closure 3000 illustrates that the closure 500 in FIGS. 5A-5C can be implemented without the lightguide 508. For example, the closure 3000 illustrates that the closure 600 in FIG. 6 can be implemented without the lightguide 608. For example, the closure 3000 illustrates that the closure 700 in FIG. 7 can be implemented without the lightguide 708. For example, the closure 3000 illustrates that the closure 8 in FIGS. 8A-8B can be implemented without the lightguide 812. For example, the closure 3000 illustrates that the apparatus 900 in FIGS. 9A-9B can be implemented without the lightguide 912. For example, the closure 3000 illustrates that the apparatus 1000 in FIGS. 10A-10B can be implemented without the lightguide 1012. For example, the closure 3000 illustrates that the apparatus 1100 in FIGS. 11A-11C can be implemented without the lightguide 1112. For example, the closure 3000 illustrates that the apparatus 1200 in FIGS. 12A-12B can be implemented without the lightguide 1212. For example, the closure 3000 illustrates that the apparatus 1300 in FIG. 13 can be implemented without the lightguide 1312. For example, the closure 3000 illustrates that the closure 1450 in FIG. 14B can be implemented without the lightguide 1452. For example, the closure 3000 illustrates that the closure 2100 in FIG. 21A can be implemented without the lightguide 2104. For example, the closure 3000 illustrates that the closure 2140 in FIG. 21B can be implemented without the lightguide 2144. For example, the closure 3000 illustrates that the closure 2180 in FIG. 21C can be implemented without the lightguide 2184. For example, the closure 3000 illustrates that the closure 2500 in FIG. 25 can be implemented without the lightguide 2510. For example, the closure 3000 illustrates that the closure 2600 in FIGS. 26A-26E can be implemented without the lightguide 2606.

Figure 31:
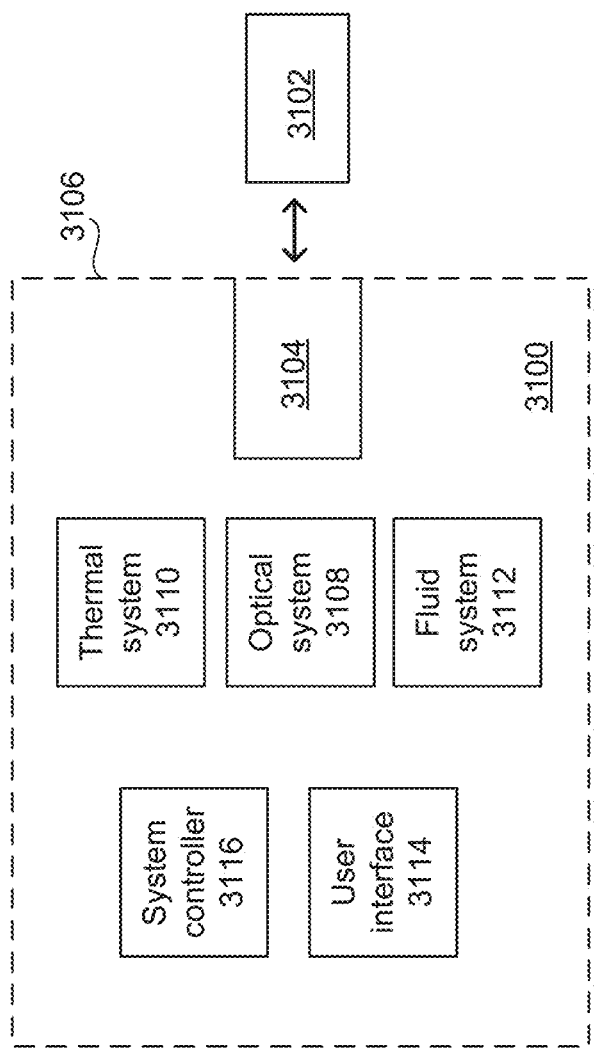
FIG. 31 is a schematic view of an implementation of a system that can be used for biological and/or chemical analysis.

FIG. 31 is a schematic view of an implementation of a system 3100 that can be used for biological and/or chemical analysis. For example, the system 3100 can be an instrument for analyzing nucleic material. Systems and/or techniques described herein can be part of the system 3100 in some implementations. The system 3100 can operate to obtain any information or data that relates to at least one biological and/or chemical substance. In some implementations, a carrier 3102 supplies material to be analyzed. For example, the carrier 3102 can include a cartridge and/or a flowcell or any other component holding the material. In some implementations, the system 3100 has a receptacle 3104 to receive the carrier 3102 at least during the analysis. The receptacle 3104 can form an opening in a housing 3106 of the system 3100. For example, some or all components of the system 3100 can be within the housing 3106.

The system 3100 can include an optical system 3108 for biological and/or chemical analysis of the material(s) of the carrier 3102. The optical system 3108 can perform one or more optical operations, including, but not limited to, illumination and/or imaging of the material(s). For example, the optical system 3108 can include any or all systems described elsewhere herein. As another example, the optical system 3108 can perform any or all operations described elsewhere herein. In some implementations, the optical system 3108 can be the only system in the system 3100. In other implementations, the optical system 3108 can be combined with one or more of the thermal system 3110, fluid system 3112, user interface 3114, and/or system controller 3116 in the system 3100.

The system 3100 can include a thermal system 3110 for providing thermal treatment relating to biological and/or chemical analysis. In some implementations, the thermal system 3110 thermally conditions at least part of the material(s) to be analyzed and/or the carrier 3102, and/or thermally conditions other subsystems of the system 3100. In some implementations, the thermal system 3110 can be the only system in the system 3100. In other implementations, the thermal system 3110 can be combined with one or more of the optical system 3108, fluid system 3112, user interface 3114, and/or system controller 3116 in the system 3100.

The system 3100 can include a fluid system 3112 for managing one or more fluids relating to biological and/or chemical analysis. In some implementations, the fluid(s) can be provided for the carrier 3102 or its material(s). For example, fluid can be added to and/or removed from the material of the carrier 3102. For example, the fluid system 3112 can manipulate fluid(s) enclosed in the carrier 3102. In some implementations, the fluid system 3112 can be the only system in the system 3100. In other implementations, the fluid system 3112 can be combined with one or more of the optical system 3108, thermal system 3110, user interface 3114, and/or system controller 3116 in the system 3100.

The system 3100 includes a user interface 3114 that facilitates input and/or output relating to biological and/or chemical analysis. The user interface can be used to specify one or more parameters for the operation of the system 3100 and/or to output results of biological and/or chemical analysis, to name just a few examples. For example, the user interface 3114 can include one or more display screens (e.g., a touchscreen), an illuminated lightband, a keyboard, and/or a pointing device (e.g., a mouse or a trackpad). In some implementations, the user interface 3114 can be the only system in the system 3100. In other implementations, the user interface 3114 can be combined with one or more of the optical system 3108, thermal system 3110, fluid system 3112, and/or system controller 3116 in the system 3100.

The system 3100 can include a system controller 3116 that can control one or more aspects of the system 3100 for performing biological and/or chemical analysis. The system controller 3116 can control the receptacle 3104, the optical system 3108, the thermal system 3110, the fluid system 3112, and/or the user interface 3114. The system controller 3116 can include at least one processor and at least one storage medium (e.g., a memory) with executable instructions for the processor. In some implementations, the system controller 3116 can be the only system in the system 3100. In other implementations, the system controller 3116 can be combined with one or more of the optical system 3108, thermal system 3110, fluid system 3112, and/or user interface 3114 in the system 3100.

Figure 32:
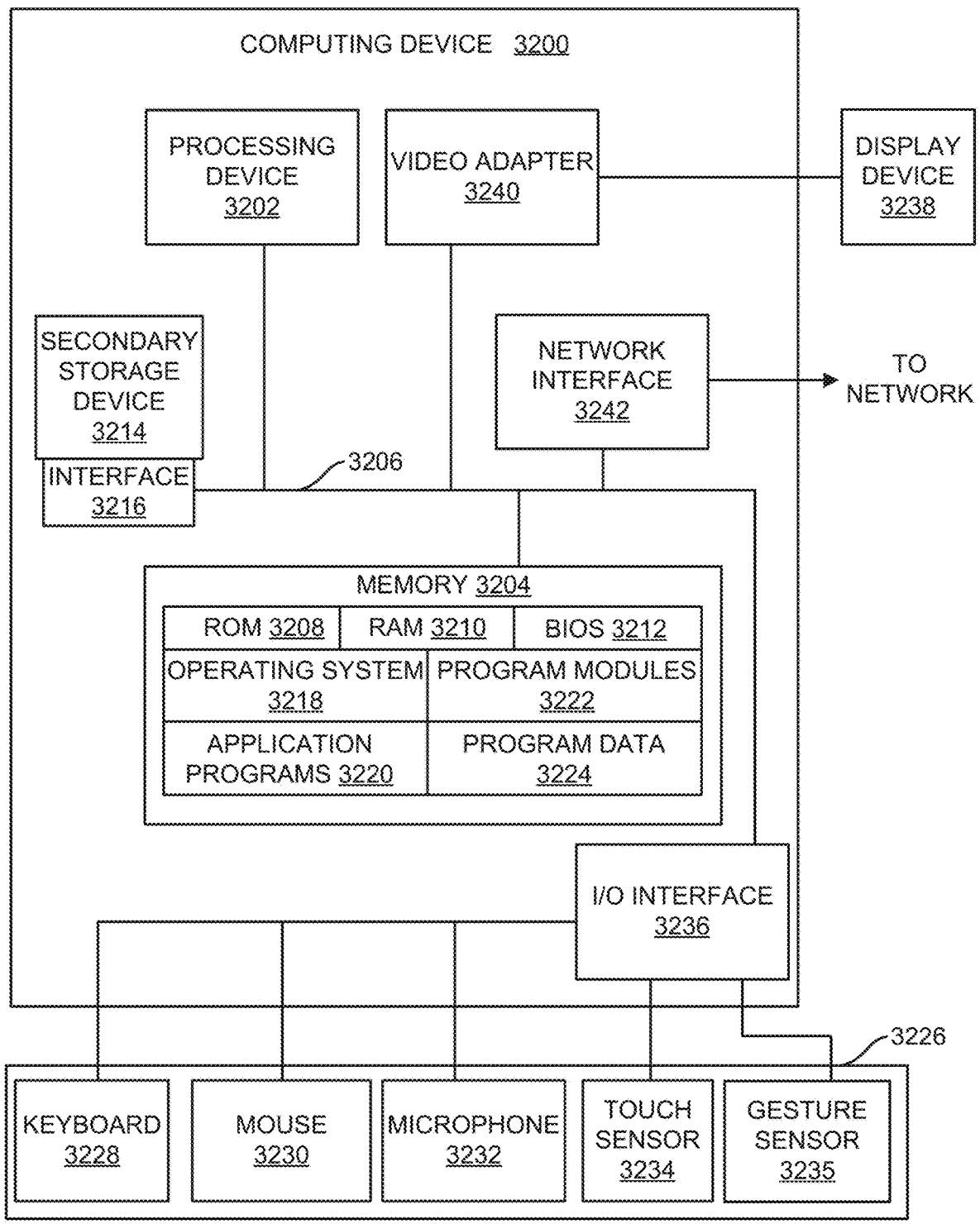
FIG. 32 illustrates an implementation architecture of a computing device 3200 that can be used to implement aspects of the present disclosure.

FIG. 32 illustrates an implementation architecture of a computing device 3200 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 32 can be used to execute the operating system, application programs, and/or software modules (including the software engines) described herein.

The computing device 3200 includes, in some embodiments, at least one processing device 3202 (e.g., a processor), such as a central processing unit (CPU). A variety of processing devices are available from a variety of manufacturers, for example, Intel or Advanced Micro Devices. In this example, the computing device 3200 also includes a system memory 3204, and a system bus 3206 that couples various system components including the system memory 3204 to the processing device 3202. The system bus 3206 is one of any number of types of bus structures that can be used, including, but not limited to, a memory bus, or memory controller; a peripheral bus; and a local bus using any of a variety of bus architectures.

Examples of computing devices that can be implemented using the computing device 3200 include a desktop computer, a laptop computer, a tablet computer, a mobile computing device (such as a smart phone, a touchpad mobile digital device, or other mobile devices), or other devices configured to process digital instructions.

The system memory 3204 includes read only memory 3208 and random access memory 3210. A basic input/output system 3212 containing the basic routines that act to transfer information within computing device 3200, such as during start up, can be stored in the read only memory 3208.

The computing device 3200 also includes a secondary storage device 3214 in some embodiments, such as a hard disk drive, for storing digital data. The secondary storage device 3214 is connected to the system bus 3206 by a secondary storage interface 3216. The secondary storage device 3214 and its associated computer readable media provide nonvolatile and non-transitory storage of computer readable instructions (including application programs and program modules), data structures, and other data for the computing device 3200.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 3214 and/or system memory 3204, including an operating system 3218, one or more application programs 3220, other program modules 3222 (such as the software engines described herein), and program data 3224. The computing device 3200 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 3200 through one or more input devices 3226. Examples of input devices 3226 include a keyboard 3228, mouse 3230, microphone 3232 (e.g., for voice and/or other audio input), touch sensor 3234 (such as a touchpad or touch sensitive display), and gesture sensor 3235 (e.g., for gestural input. In some implementations, the input device(s) 3226 provide detection based on presence, proximity, and/or motion. In some implementations, a user may walk into their home, and this may trigger an input into a processing device. For example, the input device(s) 3226 may then facilitate an automated experience for the user. Other embodiments include other input devices 3226. The input devices can be connected to the processing device 3202 through an input/output interface 3236 that is coupled to the system bus 3206. These input devices 3226 can be connected by any number of input/output interfaces, such as a parallel port, serial port, game port, or a universal serial bus. Wireless communication between input devices 3226 and the input/output interface 3236 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 3238, such as a monitor, liquid crystal display device, projector, or touch sensitive display device, is also connected to the system bus 3206 via an interface, such as a video adapter 3240. In addition to the display device 3238, the computing device 3200 can include various other peripheral devices (not shown), such as speakers or a printer.

The computing device 3200 can be connected to one or more networks through a network interface 3242. The network interface 3242 can provide for wired and/or wireless communication. In some implementations, the network interface 3242 can include one or more antennas for transmitting and/or receiving wireless signals. When used in a local area networking environment or a wide area networking environment (such as the Internet), the network interface 3242 can include an Ethernet interface. Other possible embodiments use other communication devices. For example, some embodiments of the computing device 3200 include a modem for communicating across the network.

The computing device 3200 can include at least some form of computer readable media. Computer readable media includes any available media that can be accessed by the computing device 3200. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 3200.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 32 is also an example of programmable electronics, which may include one or more such computing devices, and when multiple computing devices are included, such computing devices can be coupled together with a suitable data communication network so as to collectively perform the various functions, methods, or operations disclosed herein.

The following Examples illustrate some aspects of the present subject matter.

Example 1: A closure for an apparatus, the closure comprising:
- a plurality of light sources;
- a lightguide to distribute light from the plurality of light sources, the lightguide having a first primary surface opposite a second primary surface, wherein the first primary surface has a first surface treatment, and wherein light emitted from the lightguide indicates a status of the apparatus; and
- a frame supporting the plurality of light sources and the lightguide for selective movement of the closure vertically or horizontally relative to the apparatus.

Example 2: The closure of Example 1, wherein the plurality of light sources comprise light-emitting diodes (LEDs).

Example 3: The closure of Example 2, wherein at least two of the LEDs are mounted in a first row on a first side of a first circuit board.

Example 4: The closure of Example 3, wherein the LEDs include side-emitting LEDs.

Example 5: The closure of Example 3, wherein the LEDs include top-emitting LEDs.

Example 6: The closure of any of Examples 3 to 5, wherein the first circuit board includes a flexible circuit board.

Example 7: The closure of any of Examples 3 to 5, wherein the first circuit board includes a rigid circuit board.

Example 8: The closure of any of Examples 3 to 7, wherein at least two of the LEDs are mounted to a first side of a second circuit board, further comprising an interconnect electrically coupling the first circuit board and the second circuit board at a second side of the first circuit board and a second side of the second circuit board, wherein the first side of the first circuit board and the first side of the second circuit board are opposite the second side of the first circuit board and the second side of the second circuit board.

Example 9: The closure of any of Examples 3 to 7, wherein the LEDs comprise:
- a first set of LEDs positioned to emit light to a first side of the lightguide, the first set of LEDs mounted on the first side of the first circuit board, and
- a second set of LEDs positioned to emit light to a second side of the lightguide opposite the first side, the second set of LEDs mounted in a second row on a first side of a second circuit board.

Example 10: The closure of Example 9, further comprising a first dowel pin extending from the frame and through the first circuit board and abutting the first side of the lightguide, and a second dowel pin extending from the frame and through the second circuit board and abutting the second side of the lightguide.

Example 11: The closure of any of Examples 1 to 10, wherein the first surface treatment comprises the first primary surface being a first abraded surface.

Example 12: The closure of Example 11, wherein the second primary surface has a second surface treatment different from the first surface treatment.

Example 13: The closure of Example 12, wherein the second surface treatment comprises the second primary surface being a glossy surface.

Example 14: The closure of Example 11, wherein the second primary surface has a second surface treatment, wherein the second surface treatment comprises the second primary surface being a second abraded surface.

Example 15: The closure of any of Examples 1 to 14, wherein the first surface treatment comprises a light-extracting feature for the first primary surface.

Example 16: The closure of Example 15, wherein the light-extracting feature comprises dots formed at the first primary surface.

Example 17: The closure of Example 16, wherein the dots have different sizes, further comprising a first gradient of dot size extending between an edge of the first primary surface and a center of the first primary surface.

Example 18: The closure of Example 17, further comprising at least one second gradient of dot size oriented in a direction different from a direction of the first gradient of dot size.

Example 19: The closure of any of Examples 1 to 18, further comprising a diffuser positioned proximate to the second primary surface of the lightguide, the light from the lightguide visible via the diffuser.

Example 20: The closure of Example 19, wherein the diffuser is positioned at a distance from the second primary surface of the lightguide that is greater than about 10 mm.

Example 21: The closure of Example 19, wherein the diffuser is positioned at a distance from the second primary surface of the lightguide that is less than about 23 mm.

Example 22: The closure of any of Examples 1 to 21, wherein the closure has a U-shape.

Example 23: An apparatus comprising:
- a housing having an opening; and
- a closure for selectively moving between an open position to provide access to the opening and a closed position to block access to the opening, the closure comprising:
  - a plurality of light sources;
  - a lightguide to distribute light from the plurality of light sources, the lightguide having a first primary surface opposite a second primary surface, and wherein light emitted from the lightguide indicates a status of the apparatus; and
  - a frame supporting the plurality of light sources and the lightguide.

Example 24: The apparatus of Example 23, wherein the plurality of light sources comprise light-emitting diodes (LEDs).

Example 25: The apparatus of Example 24, wherein the LEDs comprise:
- a first set of LEDs positioned to emit light to a first side of the lightguide, the first set of LEDs mounted in a first row on a first side of a first circuit board, and
- a second set of LEDs positioned to emit light to a second side of the lightguide opposite the first side, the second set of LEDs mounted in a second row on a first side of a second circuit board.

Example 26: The apparatus of Example 25, wherein the first circuit board and the second circuit board are mounted to the frame of the closure.

Example 27: The apparatus of Example 26, the closure further comprising:
- a first dowel pin extending from the frame through the first circuit board and abutting the first side of the lightguide, and a second dowel pin extending from the frame through the second circuit board and abutting the second side of the lightguide.

Example 28: The apparatus of Example 25, wherein the first circuit board is mounted to an inside surface of the housing, wherein the first set of LEDs is proximate to the first side of the lightguide when the closure is in the closed position.

Example 29: The apparatus of Example 28, wherein the second circuit board is mounted to the frame of the closure.

Example 30: The apparatus of Example 28, wherein the second circuit board is mounted to the inside surface of the housing, wherein the second circuit board is proximate to the second side of the lightguide when the closure is in the closed position.

Example 31: The apparatus of any of Examples 23 to 30, further comprising a seal between the closure and the housing.

Example 32: The apparatus of Example 31, wherein the seal comprises an air seal.

Example 33: The apparatus of Example 31, wherein the seal comprises a dust seal.

Example 34: The apparatus of Example 31, wherein the seal comprises an electromagnetic interference containment seal.

Example 35: The apparatus of any of Examples 23 to 34, wherein the first primary surface of the lightguide has a first surface treatment.

Example 36: The apparatus of Example 35, wherein the first surface treatment comprises the first primary surface being a first abraded surface.

Example 37: The apparatus of any of Examples 35 to 36, wherein the second primary surface has a second surface treatment different from the first surface treatment.

Example 38: The apparatus of Example 37, wherein the second surface treatment comprises the second primary surface being a glossy surface.

Example 39: The apparatus of any of Examples 35 to 36, wherein the second primary surface has a second surface treatment, wherein the second surface treatment comprises the second primary surface being a second abraded surface.

Example 40: The apparatus of Example 35, wherein the first surface treatment comprises a light-extracting feature for the first primary surface.

Example 41: The apparatus of Example 40, wherein the light-extracting feature comprises dots formed at the first primary surface.

Example 42: The apparatus of Example 41, further comprising a first gradient of dot size extending between an edge of the first primary surface and a center of the first primary surface.

Example 43: The apparatus of Example 42, further comprising at least one second gradient of dot size oriented in a direction different from a direction of the first gradient of dot size.

Example 44: The apparatus of any of Examples 23 to 43, wherein the apparatus is an instrument for analyzing nucleic material.

Example 45: The apparatus of any of Examples 23 to 44, further comprising a diffuser positioned proximate to the second primary surface of the lightguide, the light from the lightguide visible via the diffuser.

Example 46: The apparatus of Example 45, wherein the diffuser is positioned at a distance from the second primary surface of the lightguide that is greater than about 10 mm.

Example 47: The apparatus of Example 45, wherein the diffuser is positioned at a distance from the second primary surface of the lightguide that is less than about 23 mm.

Example 48: The apparatus of any of Examples 23 to 47, wherein the closure has a U-shape.

Example 49: A closure for an apparatus, the closure comprising:
a set of first light sources;
a substrate having a first primary surface opposite a second primary surface, the set of first light sources positioned proximate to the first primary surface of the substrate;
a first lightguide to distribute light from the set of first light sources, the first lightguide having a first primary surface opposite a second primary surface, the first primary surface of the first lightguide positioned proximate to the second primary surface of the substrate;
a first curved structure extending between the set of first light sources proximate to the first primary surface of the substrate and the first lightguide proximate to the second primary surface of the substrate, wherein light from the first lightguide indicates a status of the apparatus; and
a frame supporting the set of first light sources, the substrate, the first lightguide, and the first curved structure, the frame for selective movement of the closure relative to the apparatus.

Example 50: The closure of Example 49, wherein the first curved structure comprises a second lightguide.

Example 51: The closure of Example 50, wherein the first lightguide and the second lightguide form a continuous lightguide.

Example 52: The closure of Example 49, wherein the first curved structure comprises a curved mirror.

Example 53: The closure of Example 49, further comprising a second lightguide proximate to the first primary surface of the substrate, the second lightguide extending between the set of first light sources and the first curved structure.

Example 54: The closure of Example 49, further comprising:
a second set of light sources positioned proximate to the first primary surface of the substrate; and
a second curved structure extending between the second set of light sources proximate to the first primary surface of the substrate and the first lightguide proximate to the second primary surface of the substrate.

Example 55: The closure of Example 54, wherein the second curved structure comprises a second lightguide.

Example 56: The closure of Example 55, wherein the first lightguide and the second lightguide form a continuous lightguide.

Example 57: The closure of Example 54, wherein the second curved structure comprises a curved mirror.

Example 58: The closure of Example 54, further comprising a second lightguide proximate to the first primary surface of the substrate, the second lightguide extending between the second set of light sources and the second curved structure.

Example 59: The closure of any of Examples 49 to 58, further comprising a diffuser having a first primary surface opposite a second primary surface, the first primary surface of the diffuser positioned proximate to the second primary surface of the first lightguide, wherein the light from the first lightguide is visible via the diffuser.

Example 60: The closure of Example 59, wherein the diffuser is positioned at a distance from the second primary surface of the first lightguide that is greater than about 10 mm.

Example 61: The closure of Example 59, wherein the diffuser is positioned at a distance from the second primary surface of the first lightguide that is less than about 23 mm.

Example 62: The closure of any of Examples 49 to 61, wherein the closure has a U-shape.

Example 63: A closure for an apparatus, the closure comprising:
- a set of light sources;
- a reflector;
- a diffuser to distribute light from the set of light sources, wherein light visible via the diffuser indicates a status of the apparatus; and
- a frame supporting the set of light sources, the reflector, and the diffuser, the frame for selective movement of the closure relative to the apparatus, wherein the frame has a gap between the diffuser and the reflector.

Example 64: The closure of Example 63, wherein the set of light sources comprise light-emitting diodes (LEDs).

Example 65: The closure of Example 64, wherein at least two of the LEDs are mounted in a first row on a first side of a first circuit board.

Example 66: The closure of Example 65, wherein the LEDs include side-emitting LEDs.

Example 67: The closure of Example 65, wherein the LEDs include top-emitting LEDs.

Example 68: The closure of any of Examples 65 to 67, wherein the first circuit board includes a flexible circuit board.

Example 69: The closure of any of Examples 65 to 67, wherein the first circuit board includes a rigid circuit board.

Example 70: The closure of any of Examples 65 to 69, wherein at least two of the LEDs are mounted on a first side of a second circuit board, further comprising an interconnect for electrically coupling a second side of the first circuit board and a second side of the second circuit board, wherein the first side of the first circuit board and the first side of the second circuit board are opposite the second side of the first circuit board and the second side of the second circuit board.

Example 71: The closure of any of Examples 65 to 70, further comprising a lightguide positioned in the gap.

Example 72: The closure of Example 71, wherein the LEDs comprise:
- a first set of LEDs proximate to a first side of the lightguide, and
- a second set of LEDs proximate to a second side of the lightguide opposite the first side, the second set of LEDs mounted in a second row on a first side of a second circuit board.

Example 73: The closure of Example 72, further comprising a first dowel pin extending from the frame and through the first circuit board and abutting the first side of the lightguide, and a second dowel pin extending from the frame and through the second circuit board and abutting the second side of the lightguide.

Example 74: The closure of any of Examples 71 to 73, wherein the lightguide has a first primary surface and a second primary surface, and wherein the first primary surface has a first surface treatment.

Example 75: The closure of Example 74, wherein the first surface treatment comprises the first primary surface being a first abraded surface.

Example 76: The closure of any of Examples 74 to 75, wherein the second primary surface has a second surface treatment different from the first surface treatment.

Example 77: The closure of Example 76, wherein the second surface treatment comprises the second primary surface being a glossy surface.

Example 78: The closure of any of Examples 74 to 75, wherein the second primary surface has a second surface treatment, wherein the second surface treatment comprises the second primary surface being a second abraded surface.

Example 79: The closure of Example 74, wherein the first surface treatment comprises a light-extracting feature for the first primary surface.

Example 80: The closure of Example 79, wherein the light-extracting feature comprises dots formed at the first primary surface.

Example 81: The closure of Example 80, wherein the dots have different sizes, further comprising a first gradient of dot size extending between an edge of the first primary surface and a center of the first primary surface.

Example 82: The closure of Example 81, further comprising at least one second gradient of dot size oriented in a direction different from a direction of the first gradient of dot size.

Example 83: The closure of any of Examples 74 to 82, wherein the diffuser is positioned at a distance from the second primary surface of the lightguide that is greater than about 10 mm.

Example 84: The closure of any of Examples 74 to 82, wherein the diffuser is positioned at a distance from the second primary surface of the lightguide that is less than about 23 mm.

Example 85: The closure of any of Examples 63 to 84, wherein the closure has a U-shape.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An apparatus comprising: a housing having an opening; and a closure for selectively moving, by translating along a single axis, between an open position to provide access through the opening to an interior feature of the apparatus and a closed position to block access through the opening, the closure comprising: a plurality of light sources, including a first set of LEDs positioned to emit light to a first side of a lightguide when the closure is in the closed position and while the closure is translating to the open position, the first set of LEDs mounted in a first row on a first side of a first circuit board; the lightguide being to distribute the light from the plurality of light sources, the lightguide having a first primary surface opposite a second primary surface, and wherein at least a portion of the light is emitted from the lightguide such that the closure indicates a status of an operational characteristics of the interior feature of the apparatus in the closed position; a frame supporting the plurality of light sources and the lightguide; and a first dowel pin extending from the frame through the first circuit board and abutting the first side of the lightguide.

2. The apparatus of claim 1, wherein the first primary surface of the lightguide is a first abraded surface.

3. The apparatus of claim 2, wherein the first abraded surface comprises a light-extracting feature for extracting light through the first primary surface.

4. The apparatus of claim 3, wherein the light-extracting feature comprises dots formed at the first primary surface.

5. The apparatus of claim 4, further comprising a first gradient of dot size extending between an edge of the first primary surface and a center of the first primary surface.

6. The apparatus of claim 5, further comprising at least one second gradient of dot size oriented in a direction different from a direction of the first gradient of dot size.

7. The apparatus of claim 5, wherein the first gradient of dot size is such that relatively more light is extracted through the lightguide at the center of the first primary surface than at an edge of the first primary surface.

8. The apparatus of claim 5, wherein the LEDs further comprise:
a second set of LEDs positioned to emit light to a second side of the lightguide opposite the first side, wherein the first gradient of dot size is mirrored between the first and second set of LEDs.

9. The apparatus of claim 2, wherein the second primary surface is a glossy surface.

10. The apparatus of claim 2, wherein the second primary surface is a second abraded surface.

11. The apparatus of claim 1, wherein the LEDs further comprise:
a second set of LEDs positioned to emit light to a second side of the lightguide opposite the first side, the second set of LEDs mounted in a second row on a first side of a second circuit board.

12. The apparatus of claim 11, wherein the first circuit board is mounted to an inside surface of the housing, wherein the first set of LEDs is proximate to the first side of the lightguide when the closure is in the closed position.

13. The apparatus of claim 12, wherein the second circuit board is mounted to the frame of the closure.

14. The apparatus of claim 12, wherein the second circuit board is mounted to the inside surface of the housing, wherein the second circuit board is proximate to the second side of the lightguide when the closure is in the closed position.

15. The apparatus of claim 11, wherein the first circuit board and the second circuit board are mounted to the frame of the closure.

16. The apparatus of claim 15, the closure further comprising:
a second dowel pin extending from the frame through the second circuit board and abutting the second side of the lightguide.

17. The apparatus of claim 1, further comprising a diffuser positioned proximate to the second primary surface of the lightguide, the light from the lightguide visible via the diffuser.

18. The apparatus of claim 1, wherein the interior feature of the apparatus is a sample receptacle for a sequencer for analysis of nucleic material of a sample.

19. The apparatus of claim 1, wherein the plurality of light sources is arranged so that color gradients are blended across a length and a height of an illumination surface of the lightguide.

20. The apparatus of claim 1, further comprising:
a lift assembly comprising:
a motor; and
a lift mount coupled to the motor and to the closure for translating the closure along the single axis.

* * * * *